United States Patent
Salem et al.

(10) Patent No.: US 11,515,818 B2
(45) Date of Patent: Nov. 29, 2022

(54) COMMON-MODE VOLTAGE REDUCTION OF A SIC BASED DUAL T-TYPE DRIVE SYSTEM

(71) Applicant: KING FAHD UNIVERSITY OF PETROLEUM AND MINERALS, Dhahran (SA)

(72) Inventors: Aboubakr Salem, Dhahran (SA); Mohamed Ali Abido, Dhahran (SA); Mohamed Mamdouh, Dhahran (SA)

(73) Assignees: KING FAHD UNIVERSITY OF PETROLEUM AND MINERALS, Dhahran (SA); King Abdullah City for Atomic & Renewable Energy (K.A.CARE), Riyadh (SA)

( * ) Notice: Subject to any disclaimer, the term of this patent is extended or adjusted under 35 U.S.C. 154(b) by 139 days.

(21) Appl. No.: 17/200,194

(22) Filed: Mar. 12, 2021

(65) Prior Publication Data
US 2022/0085741 A1 Mar. 17, 2022

Related U.S. Application Data

(60) Provisional application No. 62/994,372, filed on Mar. 25, 2020.

(51) Int. Cl.
*H02P 21/00* (2016.01)
*H02P 21/30* (2016.01)
(Continued)

(52) U.S. Cl.
CPC .......... *H02P 21/0017* (2013.01); *H02K 11/33* (2016.01); *H02P 21/141* (2013.01);
(Continued)

(58) Field of Classification Search
CPC .... H02P 21/0017; H02P 21/141; H02P 21/20; H02P 21/30; H02P 27/06; H02P 2207/01; H02K 11/33
See application file for complete search history.

(56) References Cited

U.S. PATENT DOCUMENTS

| 2013/0016549 | A1* | 1/2013 | Kieferndorf | H02M 7/487 363/131 |
| 2014/0002048 | A1* | 1/2014 | Pang | H02M 7/4833 323/304 |

(Continued)

FOREIGN PATENT DOCUMENTS

| WO | WO 2011/160644 A2 | 12/2011 |
| WO | WO 2011/160644 A3 | 12/2011 |

OTHER PUBLICATIONS

Patricio Cortés, et al., "Model Predictive Control of Multilevel Cascaded H-Bridge Inverters", IEEE Transactions on Industrial Electronics, vol. 57, No. 8, Aug. 2010, pp. 2691-2699.

(Continued)

*Primary Examiner* — Bickey Dhakal
*Assistant Examiner* — Bradley R Brown
(74) *Attorney, Agent, or Firm* — Oblon, McClelland, Maier & Neustadt, L.L.P.

(57) ABSTRACT

Reduced computation time for model predictive control (MPC) of a five level dual T-type drive considering the DC link capacitor balancing, the common-mode voltage (CMV) along with torque control of an open-ends induction motor based on determining a reduced set of switching states for the MPC. The reduced set of switching states are determined by considering either CMV reduction (CMVR) or CMV elimination (CMVE). Cost function minimization generates a voltage vector, which is used to produce gating signals for the converter switches. The reduced switching state MPC (Continued)

significantly reduces computation time and improves MPC performance.

19 Claims, 32 Drawing Sheets

(51) Int. Cl.

| | | |
|---|---|---|
| *H02P 21/14* | (2016.01) | |
| *H02P 21/20* | (2016.01) | |
| *H02P 27/06* | (2006.01) | |
| *H02K 11/33* | (2016.01) | |

(52) U.S. Cl.
CPC .............. *H02P 21/20* (2016.02); *H02P 21/30* (2016.02); *H02P 27/06* (2013.01); *H02P 2207/01* (2013.01)

(56) References Cited

U.S. PATENT DOCUMENTS

| | | | |
|---|---|---|---|
| 2015/0194902 A1 | 7/2015 | Tian et al. | |
| 2017/0133845 A1* | 5/2017 | Geyer ................. | H02M 7/5395 |
| 2021/0408935 A1* | 12/2021 | Specht ................... | H02M 7/49 |

OTHER PUBLICATIONS

Sergio Vazquez, et al., "Model Predictive Control for Power Converters and Drives: Advances and Trends", IEEE Transactions on Industrial Electronics, vol. 64, Issue 2, Feb. 2017, pp. 935-947.
A. Salem, et al., "DC Link Capacitor Voltage Balancing of a Dual Three-Level T-Type AC Drive Using Switching State Redundancy", 2017 IEEE International Electric Machines and Drives Conference (IEMDC), May 21-24, 2017, 8 pages.
Fengxiang Wang, et al., "Model Predictive Control for Electrical Drive Systems—An Overview", CES Transactions on Electrical Machines and Systems, vol. 1, No. 3, Sep. 2017, pp. 219-230.
"C2M0080120D, $2^{nd}$-Generation Z-FET® 1200-V, 80-m$\Omega$, Silicon-Carbide (SiC) MOSFET", Wolfspeed, https://www.wolfspeed.com/, https://www.wolfspeed.com/c2m0080120d?gclid= EAlalQobChMlronZ99Ka5wlVBYiGCh0omwr_ EAAYAiAAEgLjBfD_BwE, Jan. 23, 2020, 9 pages.
"Powerful controller board for rapid control prototyping", ASES, DS1103 PPC Controller Board, https://www.ases.co/Products/dSPACE/Single-Board-Hardware/DS1103-PPC-Controller-Board, Jan. 23, 2020, 3 pages.
"CGD15HB62P1, Gate driver board (engineering solution)", 2CH Gatedriver 1200-V SiC MOSFET, Wolfspeed, https://www.wolfspeed.com/cgd15hb62p1, Jan. 23, 2020, 6 pages.
Kun Shen, et al., "Finite Control Set Model Predictive Control with Feedback Correction for Power Converters", CES Transactions on Electrical Machines and Systems, vol. 2, No. 3, Sep. 2018, pp. 312-319.
"Modular DC Electronic Load—63600", Chroma Systems Solutions, https://www.chromausa.com/product/modular-dc-electronic-load-63600/, Jan. 27, 2020, 5 pages.
"LV 25-P—Voltage Transducer, 10 mA, +/−15V, PCB", Newark an Avnet Company, LEM, https://www.newark.com/lem/lv-25-p/voltage-transducer-15v-10ma-0/dp/01P0390, Jan. 23, 2020, 3 pages.
"LA 55-P—Current Transducer, LA Series, 50A, −70A to 70A, 0.9%, Closed Loop Output, 12 Vdc to 15 Vdc", Element 14, LEM, https://in.element14.com/lem/la-55-p/current-transducer-50a/dp/1617405, Jan. 23, 2020, 2 pages.
Aboubakr Salem, et al., "T-Type Multilevel Converter Topologies: A Comprehensive Review", Arabian Journal for Science and Engineering, Aug. 2018, 23 pages.

\* cited by examiner

COMMON-MODE VOLTAGE REDUCTION OF A SIC BASED DUAL T-TYPE DRIVE SYSTEM

CROSS-REFERENCE TO RELATED APPLICATIONS

This application is based on, and claims the benefit of priority to, provisional application No. 62/994,372, filed Mar. 25, 2020, the entire contents of which are incorporated herein by reference.

STATEMENT REGARDING PRIOR DISCLOSURE BY THE INVENTORS

Aspects of this technology are described in an article "Capacitor Balancing and Common-Mode Voltage Reduction of a SiC Based Dual T-Type Drive System Using Model Predictive Control" published in IEEE Transactions on Power Electronics, Vol. 35, Issue 3, 10704-10711, on Jul. 31, 2019, which is incorporated herein by reference in its entirety.

STATEMENT OF ACKNOWLEDGEMENT

The inventors acknowledge the support provided by the Center of Energy and Geo-Processing (CeGP), King Fand University of Petroleum and Minerals, through funded Project No. GTEC1701, and funding support provided by King Abdullah City for Atomic and Renewable Energy (K.A.C-ARE).

BACKGROUND

Technical Field

The present disclosure is directed to methods and systems for predictive torque control and capacitor balancing of a silicon-carbide (SiC) based dual T-type drive system using a reduced set of switching states for model predictive control.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

T-type multilevel converters (MLCs) are conventionally used as reduced switching element topologies for diode clamped converters (DCC). Compared to two-level (2L) voltage source converters (VSCs), the T-type MLC performs with lower harmonic contents, which is essential in any industrial drive application. (See Norambuena, Margarita, Samir Kouro, Sibylle Dieckerhoff, and Jose Rodriguez. "Reduced Multilevel Converter: A Novel Multilevel Converter With a Reduced Number of Active Switches." *IEEE Transactions on Industrial Electronics* 65, no. 5 (2018): 3636-3645, incorporated herein by reference in its entirety). Furthermore, compared to conventional DCCs, the T-type multilevel converter reduces the converter losses by 30-40% at a certain switching frequency range (up to 12 kHz). (See M. Schweizer; J. W. Kolar, "Design and implementation of a highly efficient three-level T-type converter for low-voltage applications," *IEEE Trans. Power Electron*, vol. 28, no. 2, pp. 899-907. 2013; A. Salem, F. De Belie, et. al., Evaluation of a dual-T-type converter supplying an open-end winding induction machine." In *Industrial Electronics Society, IECON* 2013-39*th Annual Conference of the IEEE*, pp. 749-754. IEEE, 2013; Salem, A., M. F. Elsied, Joachim Druant, Frederik De Belie, Amrane Oukaour, Hamied Gualous, and Jan Melkebeek. "An advanced multilevel converter topology with reduced switching elements." In *Industrial Electronics Society, IECON* 2014-40*th Annual Conference of the IEEE*, pp. 1201-1207. IEEE, 2014; and M. Elsied, A. Salem, A. Oukaour, H. Gualous, H. Chaoui, T. Youssef, F. De Belie, J. Melkebeek, and O. Mohammed. "Efficient power-electronic converters for electric vehicle applications." In 12*th IEEE Vehicle Power and Propulsion Conference (VPPC)*, pp. 978-983. 2015, each incorporated herein by reference in their entirety).

Model predictive control (MPC) is a method of process control that is used while satisfying a set of constraints. MPC is based on iterative, finite-horizon optimization of a plant model, such as power system balancing models. At time t the current plant state is sampled and a cost minimizing control strategy is computed (via a numerical minimization algorithm) for a relatively short time horizon in the future: [t, t+T]. Specifically, an online or on-the-fly calculation is used to explore state trajectories that emanate from the current state and find (via the solution of Euler-Lagrange equations) a cost-minimizing control strategy until time t+T. After the first step of the control strategy is implemented, the plant state is sampled again and the calculations are repeated starting from the new current state, yielding a new control and new predicted state path. The prediction horizon keeps being shifted forward. The advantage of MPC is that it allows a current timeslot to be optimized, while taking into account the future time evolution of the system. This is achieved by optimizing a finite time-horizon, but only implementing the current timeslot and then optimizing again repeatedly. Additionally, MPC can anticipate future events and take control actions accordingly. Proportional integral derivative (PID) controllers do not have this predictive ability.

Model predictive control has been used to drive power converters. (See F. Wang, X. Mei, J. Rodriguez, and R. Kennel, "Model Predictive Control for Electrical Drive Systems—An Overview," *Ces Trans. Electr. Mach. Syst.*, vol. 1, no. 3, pp. 219-230, 2017; S. Vazquez, J. Rodriguez, M. Rivera, L. G. Franquelo, and M. Norambuena, "Model Predictive Control for Power Converters and Drives: Advances and Trends," *IEEE Trans. Ind. Electron.*, vol. 64, no. 2, pp. 935-947, 2017; and S. Vazquez, J. I. Leon, L. G. Franquelo, J. Rodriguez, H. a. Young, A. Marquez, and P. Zanchetta, "Model predictive control: A review of its applications in power electronics," *IEEE Ind. Electron. Mag.*, vol. 8, no. 1, pp. 16-31, 2014; and Salem, A., Mamdouh, M., Abido, M. A., "Predictive Torque Control and Capacitor Balancing of a SiC-Based Dual T-Type Drive System" published in IEEE Transactions on Power Electronics, Vol. 35, Issue 3, 10704-10711, on Jul. 31, 2019 each incorporated herein by reference in their entirety).

In particular, finite control set MPC (FCS-MPC) may be adapted to a power converter and represents a potential alternative to sophisticated pulse width modulation techniques required for complex power converters. In FCS-MPC, the converter voltage vectors (VVs) are tested individually in a predefined cost function. The voltage vector that minimizes the cost function will be selected as the optimal one and applied on the next control sample. The cost function normally consists of summations of predicted deviations of the controlled variables compared with their reference values. Therefore, not only torque and flux can be controlled in electrical motor drives, but also capacitor balancing and common-mode voltage (CMV) mitigation of multilevel converters can be realized in the same cost-function. (See Dzung, Phan Quoc, Nguyen Dinh Tuyen, Nguyen The Tien, and Nguyen Chan Viet. "Model predictive current control for T-type NPC inverter using new on-line inductance estimation method." In *Region 10 Conference (TENCON)*, 2016 *IEEE*, pp. 316-321. IEEE, 2016; and Barros, J. Dionisio, J. Fernando A. Silva, and Élvio G A Jesus. "Fast-predictive optimal control of NPC multilevel converters." *IEEE Transactions on Industrial Electronics* 60, no. 2 (2013): 619-627, each incorporated herein by reference in their entirety).

Three-level (3L) T-type capacitor voltage balancing has been investigated using pulse-width modulation (PWM) techniques. (See Choi, Ui-Min, June-Seok Lee, and Kyo-Beum Lee. "New modulation strategy to balance the neutral-point voltage for three-level neutral-clamped inverter systems." *IEEE Transactions on Energy Conversion* 29, no. 1 (2014): 91-100; Choi, Ui-Min, Frede Blaabj erg, and Kyo-Beum Lee. "Method to minimize the low-frequency neutral-point voltage oscillations with time-offset injection for neutral-point-clamped inverters." *IEEE Transactions on Industry Applications* 51, no. 2 (2015): 1678-1691; Ding, Ran, Jun Mei, Jianfeng Zhao, Zhihong Zhao, and Jie Tian. "A simplified balance factor based midpoint voltage deviation eliminating method for T-type three-level inverter." In *Smart Grid and Clean Energy Technologies (ICSGCE)*, 2016 *International Conference on*, pp. 328-333. IEEE, 2016; and Choi, Ui-Min, Hyun-Hee Lee, and Kyo-Beum Lee. "Simple neutral-point voltage control for three-level inverters using a discontinuous pulse width modulation." *IEEE Trans. Energy Conyers* 28, no. 2 (2013): 434-443, each incorporated herein by reference in their entirety). However, the extension of these techniques to five-level (5L) converters (dual three-level) has some technical limitations in terms of computation and execution times.

5L nested DCC capacitor balancing has been studied using MPC. (See Dekka, Appa Rao, and Mehdi Narimani. "Capacitor Voltage Balancing and Current Control of a Five-Level Nested Neutral Point Clamped Converter." *IEEE Transactions on Power Electronics* (2018); and Li, Junjie, and Jianguo Jiang. "Active Capacitor Voltage-Balancing Methods Based on the Dynamic Model for a Five-Level Nested Neutral-Point Piloted Converter." *IEEE Transactions on Power Electronics* 33, no. 8 (2018): 6567-6581, each incorporated herein by reference in their entirety).

Prior work by some of the inventors of the present disclosure investigated capacitor balancing for the dual T-type topology using switching state redundancy based on an off-line study. (See A. Salem, T. Youssef, F. De Belie, J. Melkebeek, O. Mohammed, and M. Abido. "DC link capacitor voltage balancing of a dual three-level T-Type AC drive using switching state redundancy." In 10*th Biennial International Electric Machines and Drives Conference*. 2017, incorporated herein by reference in its entirety).

Another related important problem in AC drives is the common mode voltage (CMV). The CMV affects the bearings of the induction motor (IM) and may reduce its lifetime. (See Salem et al. (2017); and Julian, Alexander L., Giovanna Oriti, and Thomas A. Lipo. "Elimination of common-mode voltage in three-phase sinusoidal power converters." *IEEE Transactions on Power Electronics* 14, no. 5 (1999): 982-989, each incorporated herein by reference in their entirety). Two well-known approaches have been used to address this problem, i.e., CMV reduction (CMVR) and CMV elimination (CMVE). The CMVE method was based on selecting the voltage vectors (VVs) that produce zero CMV. This technique reduced the number of possible voltage vectors for the drive system control. On the other hand, the CMVR decreased the CMV value by PWM techniques or by using an MPC technique. (See A. Salem, and M. A. Abido. "T-Type Multilevel Converter Topologies: A Comprehensive Review." *Arabian Journal for Science and Engineering* (2018): 1-23, incorporated herein by reference in its entirety).

CMVR using PWM techniques for different types of converters has been a topic of research. A synchronous optimal PWM technique was used to reduce the CMV of a modular multi-level converter (MLC) connected to an open ends induction motor (OEIM). (See E. Amarendra, and A. Rathore. "Optimal pulse width modulation for common-mode voltage elimination scheme of medium-voltage modular multilevel converter-fed open-end stator winding induction motor drives." *IEEE Transactions on Industrial Electronics* 64, no. 1 (2017): 848-856, incorporated herein by reference in its entirety). However, this MLC topology had the drawback of having separate capacitors for each switching module (half H-bridge topology) which increased the power circuit complexity.

In Zhang et al., a carrier based PWM was used to reduce the CMV of a 2L matrix converter. (See Zhang, Jianxin, Mei Su, Wenjing Xiong, Yao Sun, Xiaochao Hou, and Xing Li. "Carrier-based modulation strategy of indirect matrix converters for common-mode voltage reduction." In *Future Energy Electronics Conference and ECCE Asia (IFEEC 2017-ECCE Asia)*, 2017 *IEEE 3rd International*, pp. 534-538. IEEE, 2017, incorporated herein by reference in its entirety). However, due to protection issues, the matrix converter is not widely used in industrial drive applications.

Another research work introduced the CMVR and capacitor balancing of a single 3L T-type MLC using a finite control set (FCS) MPC, where 19 switching states were used to mitigate the CMV. The MPC code consumed 100 μs, which was too high for 3L converters. (See Xing, Xiangyang, Alian Chen, Zicheng Zhang, Jie Chen, and Chenghui Zhang. "Model predictive control method to reduce common-mode voltage and balance the neutral-point voltage in three-level T-type inverter." In *Applied Power Electronics Conference and Exposition (APEC)*, 2016 *IEEE*, pp. 3453-3458. IEEE, 2016, incorporated herein by reference in its entirety).

A switching function model is a mathematical representation for the voltage source converters that provides a view of the converter switching states (SS). (See Holmes, D. G., Lipo, T. A., "Pulse Width Modulation for Power Converters: Principles and Practice," Book, USA: *Wiley-IEEE Press, John Willy and Sons*, Inc., October 2003, incorporated herein by reference in its entirety).

Silicon Carbide (SiC) MOSFETs have been used in power electronic converters, which lowers energy consumption during turning on/off transitions as well as lowering turn-on resistance as compared to conventional silicon IGBT switches. However, the fast on/off transitions affect the ringing of the converter output voltage if the electromagnetic interference (EMI) is not considered during the converter design. Therefore, the use of the SiC MOSFETs in complicated power circuits, as the case in 5L converters, needs further development.

Although CMVE reduces the eddy currents in bearings, none of the prior research has thoroughly addressed the impact of CMVE on core losses. CMVE has a negative impact on core losses due to the harmonic increase in the absence of some voltage vectors used in the CMVE technique. (See Salem, A., A. Abdallh, Paavo Rasilo, Frederik De Belie, M. N. Ibrahim, Luc Dupre, and Jan Melkebeek. "The effect of common-mode voltage elimination on the iron loss in machine core laminations of multilevel drives." *IEEE Transactions on Magnetics* 51, no. 11 (2015): 1-4, incorporated herein by reference in its entirety).

Accordingly, it is one object of the present disclosure to provide methods and systems for common mode voltage reduction (CMVR) in an induction motor driven by a 5-level converter in order achieve better drive system performance and lower harmonic content. A reduced switching state MPC incorporates CMVE/CMVR, DC link capacitor balancing and machine torque control. Use of the reduced switching state MPC of the present disclosure significantly reduces the computation time and improves the MPC performance.

SUMMARY

In an exemplary embodiment, a method is described for reducing computation time for model predictive control (MPC) of a 5 level dual T-type multilevel converter connected to a three-phase open ends induction motor (OEIM), each multilevel converter including two capacitors and a plurality of plurality of silicon carbide MOSFET semiconductor switches, comprising determining a set of switching states of the plurality of silicon carbide MOSFET semiconductor switches, identifying a reduced set of switching states from the set of switching states, storing the reduced set, calculating a first set of cost functions which include motor fluxes, motor torques, common mode voltage and capacitor voltages for each switching state of the reduced set of switching states, summing the first set of cost functions to generate a first set of summed cost functions, minimizing the first set of summed cost functions, identifying a voltage vector which minimizes the first set of summed cost functions, generating a plurality of gating signals for the plurality of silicon carbide semiconductor switches using the voltage vector, applying the plurality of gating signals to the plurality of SiC semiconductor switches to operate the OEIM with decreased motor flux ripples, decreased motor torque ripples and balanced capacitor voltages, wherein calculating the first set of cost functions with the reduced set of switching states reduces the computation time for model predictive control of the converter switches.

In another exemplary embodiment, a system for reducing computation time for model predictive control (MPC) of a 5 level dual T-type multilevel converter connected to a three-phase open ends induction motor (OEIM) having first, second and third phase paths connected between a first end and a second end is described, comprising a first three-level T-type converter connected to the first end of the OEIM and a second three-level T-type converter connected to the second end of the OEIM, a first voltage source block connected to the first converter and a second voltage source block connected to the second converter, each voltage source block including a first capacitor in series with a second capacitor, wherein each voltage source block has a positive connector, a negative connector and a common connector, wherein each three-level T-type converter includes first, second and third phase legs, including first and second series connected switches, wherein the first switch is connected to the common connector and the second switch is connected to a terminal of one of the phase paths, a third switch connected between the positive connector and the terminal of the one of the phase paths and a fourth switch connected to the negative connector and the terminal of the one of the phase paths, wherein each switch is a SiC MOSFET semiconductor switch in parallel with a diode, wherein the diodes of the first and second series connected switches are antiparallel to each other, and wherein the diodes of the third and fourth switches are parallel to each other, a plurality of sensors configured for measuring system parameters, and a control system having circuitry connected to the switches of each three-level T-type converter and the plurality of sensors, the control system having circuitry and program instructions stored within that, when executed by one or more processors, cause the one or more processors to determine a reduced set of switching states which lower the computation time for model predictive control of the converter switches.

In another exemplary embodiment, a non-transitory computer readable medium having instructions stored therein that, when executed by one or more processor, cause the one or more processors to perform a method a non-transitory computer readable medium having instructions stored therein that, when executed by one or more processors, cause the one or more processors to perform a method for reducing computation time for model predictive control (MPC) of a 5 level dual T-type multilevel converter connected to a three-phase open ends induction motor (OEIM), each multilevel converter including two capacitors and a plurality of plurality of silicon carbide (SiC) MOSFET semiconductor switches, comprising determining a set of switching states of the plurality of switches, selecting a reduced set of switching states from the set of switching states, calculating a set of cost functions which include motor fluxes, motor torques, common mode voltage and capacitor voltages for each switching state of the reduced set of switching states, summing the set of cost functions to generate a first set of summed cost functions, minimizing the first set of summed cost functions, identifying a voltage vector which minimizes the first set of summed cost functions, generating a plurality of gating signals for the plurality of silicon carbide semiconductor switches using the voltage vector, applying the plurality of gating signals to the plurality of SiC semiconductor switches to operate the OEIM with reduced motor flux ripples, motor torque ripples and balanced capacitor voltages, wherein calculating the set of cost functions with the reduced set of switching states decreases the computation time for model predictive control of the converter switches.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
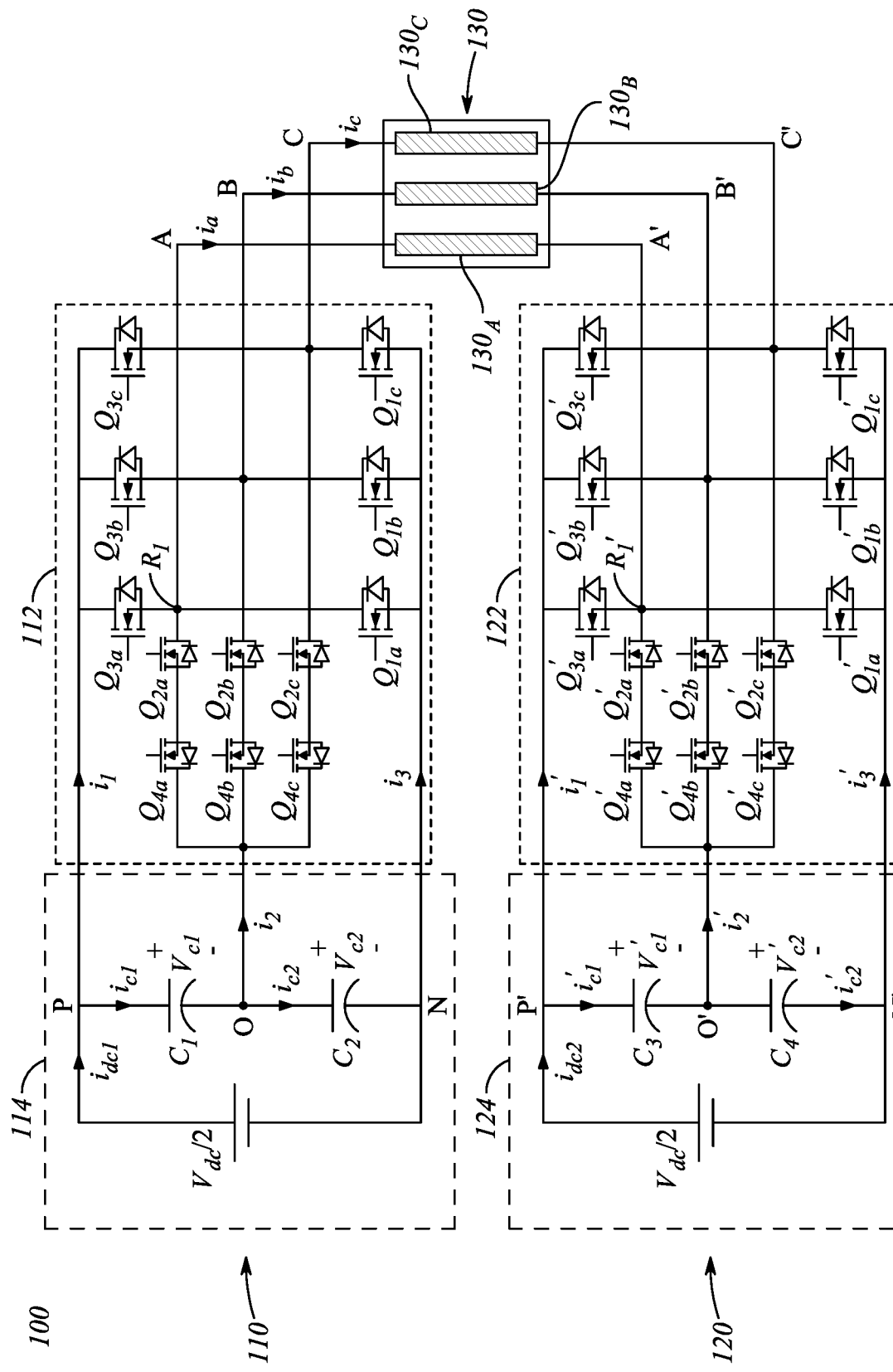
FIG. 1 illustrates a wiring diagram of a dual T-type 5L converter connected to a three-phase OEIM.
Figure 2:
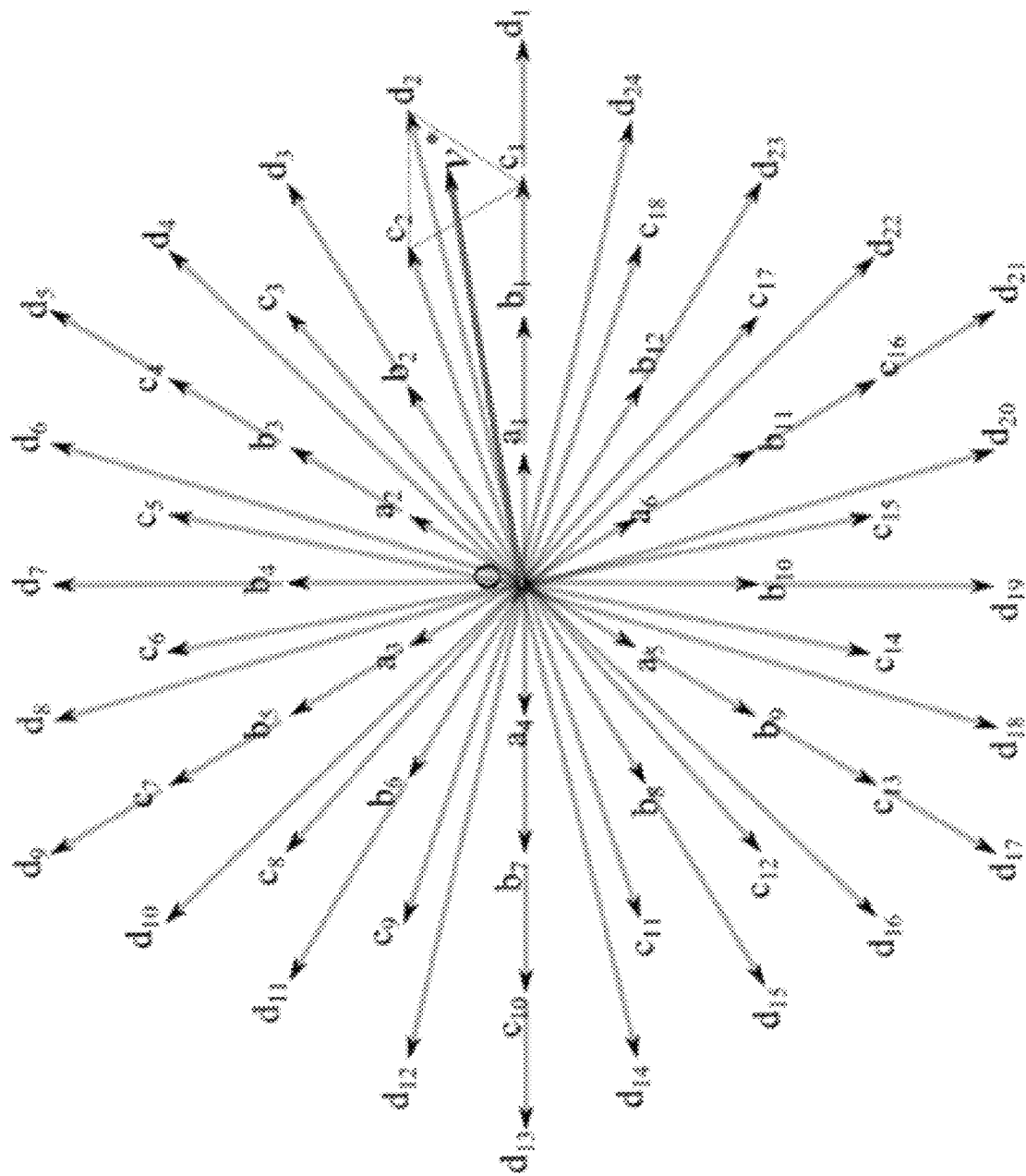
FIG. 2 illustrates a vector diagram of the dual T-type MLC.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of the present disclosure are directed to a method for reducing computation time for model predictive control (MPC) of a 5 level dual T-type multilevel converter connected to a three-phase open ends induction motor (OEIM), a system for reducing computation time for model predictive control (MPC) of a 5 level dual T-type multilevel converter connected to a three-phase open ends induction motor (OEIM) having first, second and third parallel phase paths connected between a first end and a second end and a non-transitory computer readable medium having instructions stored therein that, when executed by one or more processors, cause the one or more processors to perform a method for reducing computation time for model predictive control (MPC) of a 5 level dual T-type multilevel converter connected to a three-phase open ends induction motor (OEIM).

Aspects of the present disclosure describe reduced switching state model predictive control (MPC) which incorporates CMVE/CMVR, DC link capacitor balancing and machine torque control. The reduced switching state MPC is applied to the generation of gating signals for the switches of a 5-level converter. The 5-level converter is connected to an open ends induction motor (OEIM). The 5-level converter of the present disclosure is a dual three-level T-type multilevel converter topology.

In order to perform an MPC for the 5-level converter of the present disclosure, 729 switching states must be considered in the MPC code in order to determine an optimum cost function solution. However, it was observed that the execution time using 729 switching states was 5.5 ms, which proved to not be suitable for driving the 5-level converter. Therefore, aspects of the present disclosure describe a reduced switching state MPC.

Aspects of the present disclosure incorporate CMV reduction (CMVR) and CMV elimination (CMVE) into a reduced switching state MPC. The CMVE method selects voltage vectors (VVs) which produce zero CMV, which reduces the number of possible voltage vectors for the drive system control. The CMVR method selects switching states which reduce the CMV.

In an aspect of the present disclosure, the 5-level (5L) converter is a dual T-type converter connected to an OEIM which is coupled to a DC generator as a mechanical load. A fast MPC technique with reduced switching states is described which provides torque control, capacitor balancing, and CMVR/CMVE for the dual T-type 5L converter. The effectiveness of the reduced switching state MPC was assessed in terms of torque and flux ripples, capacitor voltage deviation, and harmonic analysis of the generated voltage and current. A laboratory prototype was constructed using silicon carbide (SiC) MOSFETs. A comprehensive comparison was made between using CMVR and using CMVE in the dual T-type converter. The results reveal that the CMVR is more effective in reducing flux and torque ripples and balancing the capacitor voltages. Experimental results showed close agreement with simulated results.

Figure 10:
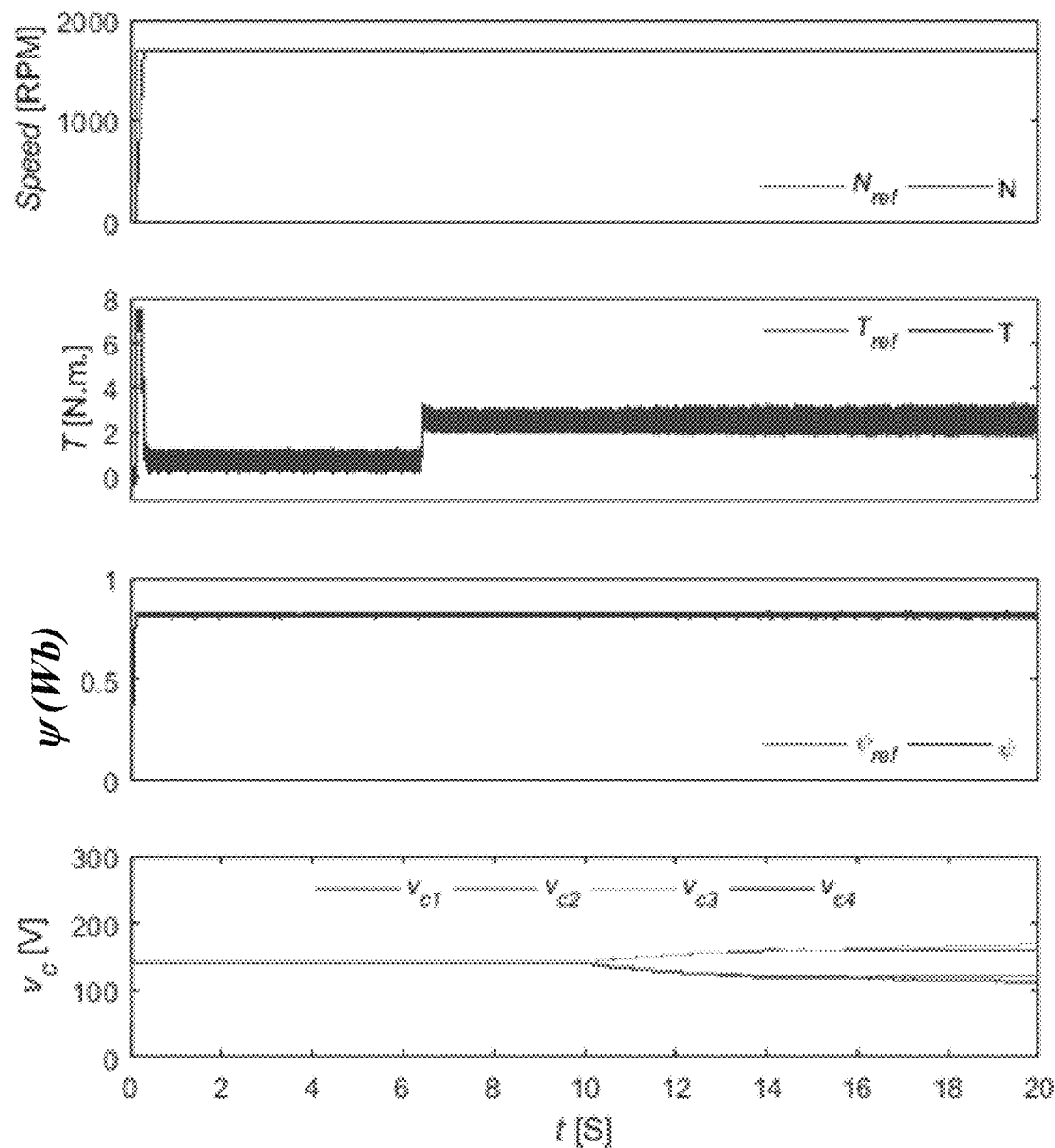
FIG. 10 illustrates a simulation of the motor speed, torque, flux and capacitor voltages while disabling capacitor balancing at t=10 S.

FIG. 1 shows the power circuit of a dual T-type 5L converter 100 connected to a three-phase open-ends induction motor (OEIM) 130. The T-type 5L converter includes two 3L T-type converters, (112, 122). Each converter is connected to a DC link (114 or 124) with three connections, positive voltage (P), negative voltage (N) and neutral or common voltage (O). The OEIM 130 has three inductive phase paths ($130_A$, $130_B$, $130_C$) each phase path having a first end connected to converter 112 and a second end connected to converter 122. Each inductor $130_A$, $130_B$, $130_C$ carries a different phase of the current provided by the converters. Each three-level (3L) T-type converter (112, 122) consists of twelve semiconductor switches that can be classified as horizontal controllable switches ($Q_{2x}$ and $Q_{4x}$; x is a, b or c) and vertical controllable switches ($Q_{1x}$ and $Q_{3x}$). Each converter (112, 122) is connected to two capacitors in a T-type configuration. Converter 112 is connected across points P-N, and converter 122 is connected across points P'-N' of their respective DC links (114, 124). Capacitors $C_1$ and $C_2$ provide voltages $V_{c1}$ and $V_{c2}$ and are in parallel with voltage supply $V_{dc/2}$. The voltages $V_{c1}$ and $V_{c2}$ may be provided by a source block 1033 as shown in FIG. 10. The common point "O" between capacitors $C_1$ and $C_2$ connects to a three-phase circuit (thus a T-type), each leg consisting of switches $Q_{4x}$ and $Q_{2x}$, (x=a, b, c), in series. The bypass diode of $Q_{4x}$ is arranged in opposite polarity (anti-parallel) to the bypass diode of $Q_{2x}$. Each switch $Q_{4x}$ and $Q_{2x}$ may be activated so as to control conduction through each leg. Controllable switches $Q_{3x}$ and $Q_{1x}$ may be activated to control the polarity of the output voltage to each phase (A, B, C) of the OEIM 130. For example, if $Q_{3a}$ is ON and $Q_{1a}$ is OFF, the voltage at point $R_1$ is $V_{dc}/2$. Similarly, converter 122 is operated to provide either positive or negative current to phases A', B' and C' at voltage levels $V_{dc}/2$. The voltage across each leg of the OEIM may be 0, $V_{dc}/2$ or $V_{dc}$ depending on the state of the switches Q. Some of the switching control patterns are shown in Tables I to III below.

Aspects of the present disclosure describe mathematical modeling of the switching function of the dual T-type converter. The switching function model is a mathematical representation for the voltage source converters that aims to obtain a clear view of the converter output voltage based on all possible switching states. The modes of operation of the dual T-type converter are summarized in Table I. Assume $m_X$ is the switching function which connects phase X to P, N or O (FIG. 1), where X is A, B or C for converter 112, while converter 122 has the same symbols with a prime. This switch function can be 1, −1 or 0 as shown in Table I. The phase voltages for each T-type converter can be described by $$v_{XO} = 0.25 m_X V_{dc}, \quad v_{X'O'} = 0.25 m'_X V_{dc} \quad (1)$$

Applying KVL, the voltage across AA' can be described by:

$$v_{AA'} = A_{AO} + v_{OO'} - v_{A'O'} \quad (2)$$

For a balanced load, the summation of the three-phase voltages equals zero. The voltage $v_{OO'}$ can be described by:

$$-v_{OO'} = 1/3(v_{AO} + v_{BO} + v_{CO} - v_{A'O'} - v_{B'O'} - v_{C'O'}) \quad (3)$$

By substituting (1) and (3) into (2), the phase voltage $v_{AA'}$ can be expressed as:

$$v_{AA'} = \frac{V_{dc}}{6}\left(m_A - m_{A'} - \frac{1}{2}(m_B - m_{B'} + m_C - m_{C'})\right) \quad (4)$$

The voltages $v_{BB'}$ and $v_{CC'}$ can be derived in the same way. By applying the switching function possibilities to (4) (for AA', BB', CC'), the phase-voltage can attain 17 different phase voltage levels.

TABLE I

MODES OF OPERATION OF A DUAL T-TYPE: PHASE AA'

| Converter-1 | $m_A$ | point | Converter-2 | $m_A'$ | point |
|---|---|---|---|---|---|
| $Q_{3a}, Q_{4a}$ | 1 | P | $Q_{3a'}, Q_{4a'}$ | 1 | P' |
| $Q_{2a}, Q_{4a}$ | 0 | O | $Q_{2a'}, Q_{4a'}$ | 0 | O' |
| $Q_{1a}, Q_{2a}$ | −1 | N | $Q_{1a'}, Q_{2a'}$ | −1 | N' |

The possible connections for phase A of one of the T-type converters (112, 122) are described in Table II. Similarly, the possible connections for phase $V_{AA'}$ for the dual T-type converter topology are described in Table II. The possible switching states for a 3L T-type converter may be calculated by $m^3$, where m is the number of voltage levels (P, N, O) in the connected DC link (114, 124), which gives 27 states in this case.

TABLE II

POSSIBLE CONNECTIONS FOR PHASE A OF THE 3-LEVEL T-TYPE

| Level | $Q_{1a}$ | $Q_{2a}$ | $Q_{3a}$ | Q4a | $V_{AO}$ |
|---|---|---|---|---|---|
| P | 0 | 0 | 1 | 1 | $+V_{dc}/2$ |
| O | 0 | 1 | 0 | 1 | 0 |
| N | 1 | 1 | 0 | 0 | $-V_{dc}/2$ |

TABLE III

POSSIBLE CONNECTIONS FOR PHASE A OF THE DUAL T-TYPE

| Converter I | Converter II | Points | $V_{AA'}$ |
|---|---|---|---|
| $Q_{3a}, Q_{4a}$ | $Q_{1a'}, Q_{2a'}$ | P-N' | $+V_{dc}$ |
| $Q_{3a}, Q_{4a}$ | $Q_{2a'}, Q_{4a'}$ | P-O' | $+V_{dc}/2$ |
| $Q_{2a}, Q_{4a}$ | $Q_{1a'}, Q_{2a'}$ | O-N' | |
| $Q_{3a}, Q_{4a}$ | $Q_{3a'}, Q_{4a'}$ | P-P' | 0 |
| $Q_{2a}, Q_{4a}$ | $Q_{2a'}, Q_{4a'}$ | O-O' | |
| $Q_{1a}, Q_{2a}$ | $Q_{1a'}, Q_{2a'}$ | N-N' | |
| $Q_{2a}, Q_{4a}$ | $Q_{3a'}, Q_{4a'}$ | O-P' | $-V_{dc}/2$ |
| $Q_{1a}, Q_{2a}$ | $Q_{2a'}, Q_{4a'}$ | N-O' | |
| $Q_{1a}, Q_{2a}$ | $Q_{3a'}, Q_{4a'}$ | N-P' | $-V_{dc}$ |

Figure 5A:
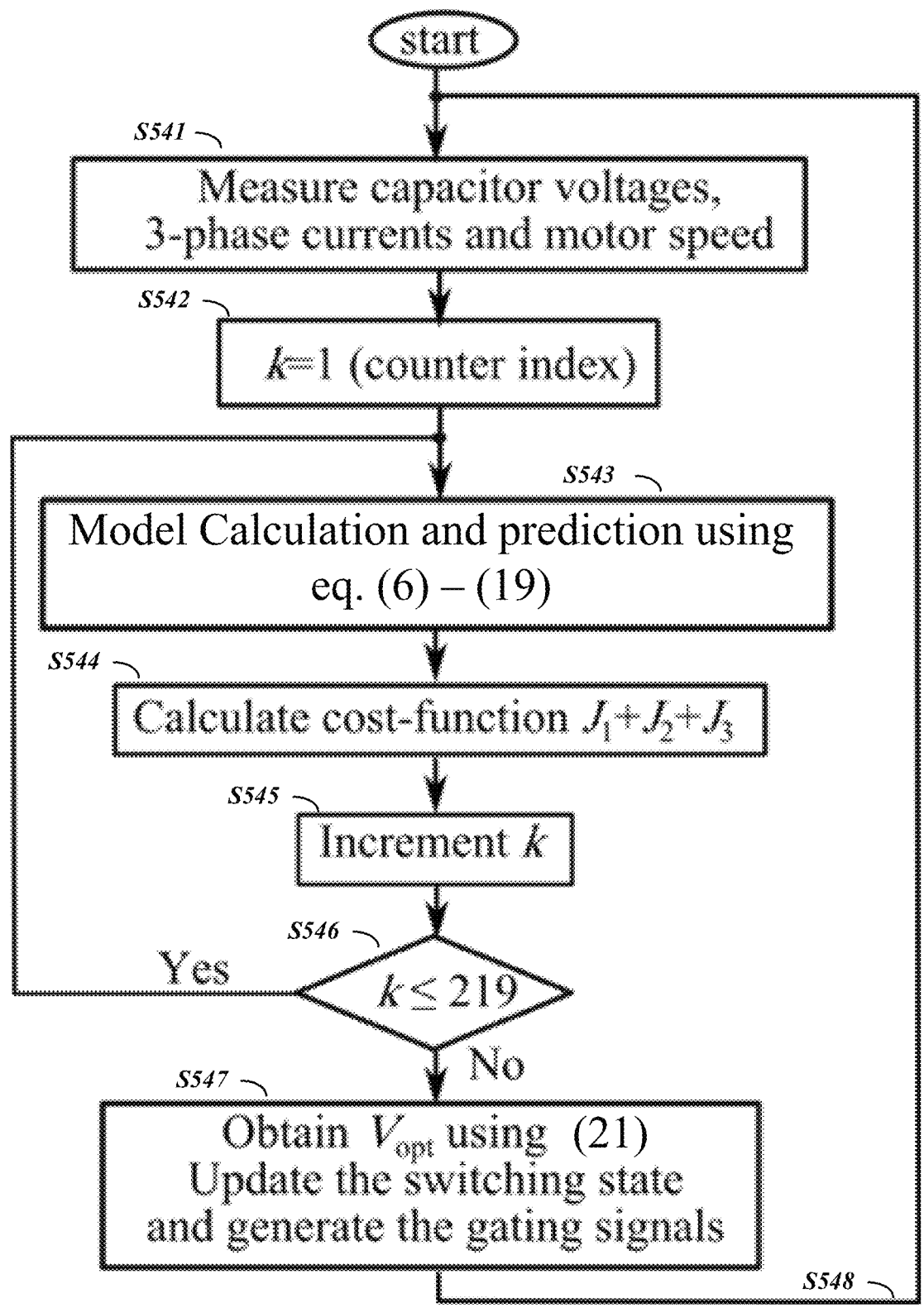
FIG. 5A is a flow-chart illustrating the reduced switching state MPC process.

However, this relation is not applicable to the dual converter configuration (5L) as the DC links are isolated. The total number of switching states for the dual T-type converter is $27^2 = 729$ switching states. By applying these 729 states, the vector diagram of this converter can be described by the hexagon as shown in FIG. 5A. (5L vector diagram). It consists of 61 vectors, i.e. O, $a_1$-$a_6$, $b_1$-$b_{12}$, $c_1$-$c_{18}$, and $d_1$-$d_{24}$. The summary of the 729 switching states and their corresponding voltage vectors is listed in Table IV. More details about the switching states of this converter can be found in Salem et al. (See Salem Mohamed; Salem, Aboubakr. "Design and analysis of five-level T-type power converters for rotating field drives." PhD diss., Ghent University, 2015, incorporated herein by reference in its entirety.

TABLE IV

CLASSIFICATION OF THE 729 SS ACCORDING TO GROUP EFFECT

| Vectors | O | $a_1$-$a_6$ | $b_1$-$b_{12}$ | $c_1$-$c_{18}$ | $d_1$-$d_{24}$ | Total |
|---|---|---|---|---|---|---|
| No effect | 45 | — | 132 | — | 24 | 201 |
| High effect | — | 216 | 84 | 156 | 24 | 480 |
| Medium effect | — | — | 48 | — | — | 48 |
| States/vector | 45 | 216 | 264 | 156 | 48 | 729 |

The switching state selection of the operating voltage vector affects the capacitor charging state as well as the generated CMV value.

As the switching state affects the capacitor charging condition, an intensive study for all of the 729 states effect on the DC link capacitors was performed. A summary is shown in Table IV. The group effect is described as follows: assume the voltage imbalance is $\Delta V_c = V_{c1} - V_{c2}$ for Converter 112 and $\Delta V'_c = V'_{c1} - V'_{c2}$ for Converter 122. According to the imbalance value, the switching state effects can be classified as follows:

A. High effect group, in which $\Delta V_c$ or $\Delta V'_c$ tends to $V_{dc}/2$.

B. Medium effect group, in which $\Delta V_c$ or $\Delta V'_c$ tends to $V_{dc}/4$.

C. No effect group, in which $\Delta V_c$ or $\Delta V'_c$ tends to zero.

The use of the high and medium effect groups of Table IV can change the capacitor balancing state. Hence, the higher number of these two groups switching states (528 (i.e., 480+48) out of 729 states) gives high flexibility in the selection decision for balancing the four capacitor voltages. It may be observed that for each voltage vector, a set of redundant switching states have the same effect on the capacitor balancing. By refining these redundant switching states, a set of 219 switching states, out of the 528, may be selected to represent all of the 61 voltage vectors and include both the high and medium effect switching set of 219 switching states, out of the 528, which represent all of the 61 voltage vectors and include both the high and medium effect switching state groups. Therefore, 219 out of 729 switching states are sufficient to perform the capacitor balancing and reduce the MPC execution time.

Common mode voltage (CMV) is a relatively high frequency voltage that appears between the two isolated ground systems. In AC drives, this voltage appears between the machine neutral point and the connected inverter DC link midpoint. For the dual T-type 3L configuration, this voltage is the difference between the dual converter two mid-points (O, O'). The CMV cannot be eliminated by using two level (2L) inverter switching states, because of the third harmonic component that exists within all the voltage vectors of the 2L inverter. However, in MLCs, there are some voltage vectors which can produce zero CMV (ZCMV). If a converter is controlled to operate with these vectors, the CMV will not appear in the drive system.

The CMV for the dual T-type MLC can be calculated as:

$$v_{CM1} = 1/3(v_{AO} + v_{BO} + v_{CO})$$

$$v_{CM2} = 1/3(v_{A'O'} + v_{B'O'} + v_{C'O'})$$

$$v_{CM} = v_{CM1} - v_{CM2} \quad (5)$$

A study of the different 729 switching states was performed in order to reflect how each state and voltage vector contributes to the CMV. A summary is listed in Table IV. It may be observed that:

A set of 42 voltage vectors, out of 61, can produce CMV with different values.

The zero vector "O" can produce CMV with different values and can produce ZCMV.

A set of 18 voltage vectors, out of 61, produce only ZCMV.

Figure 3:
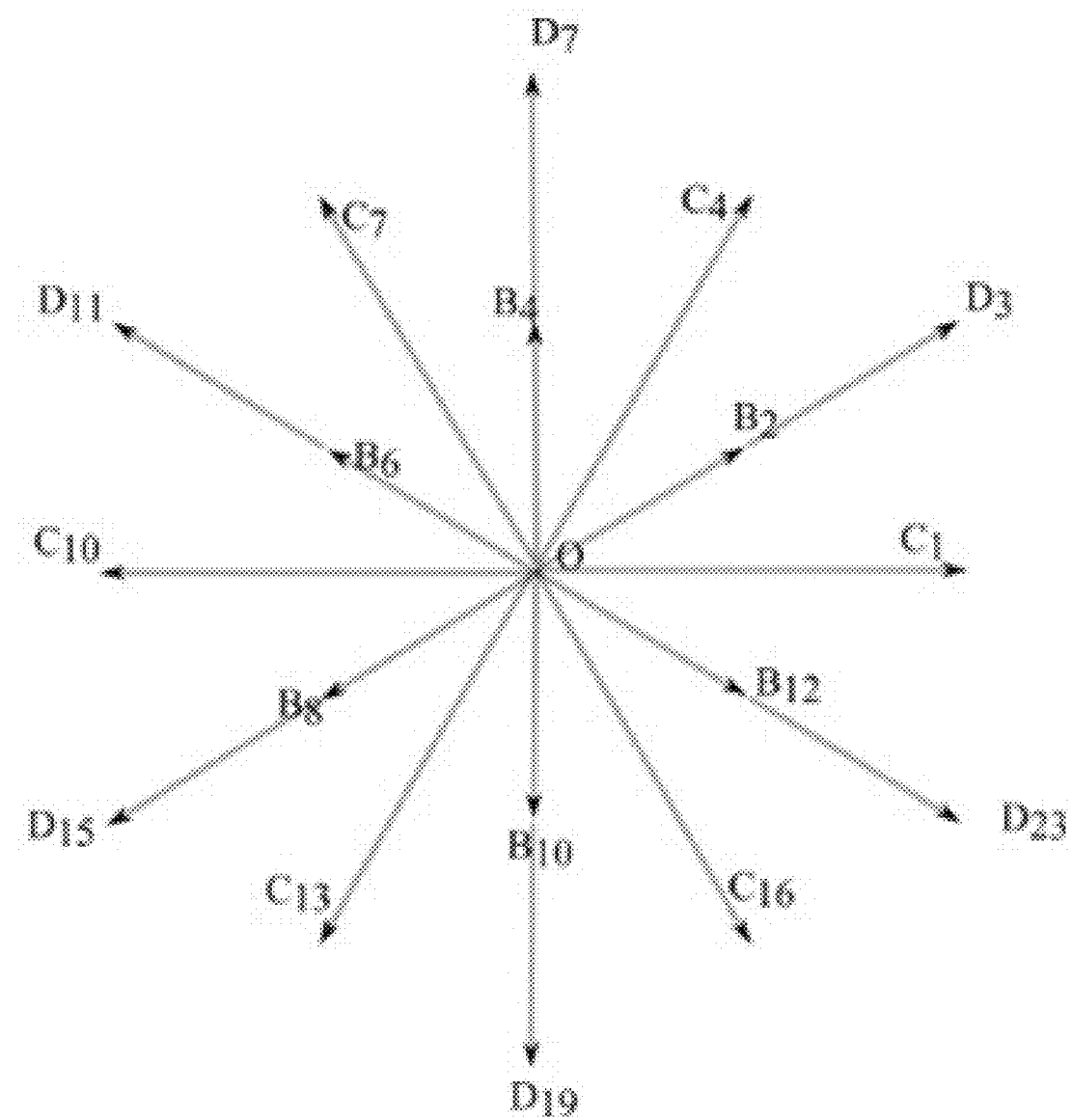
FIG. 3 is a ZCMV vector diagram illustrating the voltage vectors of the dual T-type MLC.

Hence, the CMV in dual T-type configuration is not voltage vector dependent like other DCCs. However, it is considered switching state dependent. For instance, vector "O" can be represented by 45 switching states. Only 27 switching states produce ZCMV and the other 18 switching states produce CMV. A part of the voltage vectors produces ZCMV for all of switching states. These ZCMV are described in Table V and a vector diagram is shown in FIG. 3. It can be observed that only 19 voltage vectors can produce ZCMV while 42 voltage vectors cannot (i.e., 61−19=42). The absence of the highest voltage vectors, the d's vectors, will affect the output voltage level, which requires extra DC link voltage.

TABLE V

| CLASSIFICATION OF THE 729 SS ACCORDING TO CMV EFFECT | | | | | |
|---|---|---|---|---|---|
| Vectors | O | $a_1$-$a_6$ | $b_1$-$b_{12}$ | $c_1$-$c_{18}$ | $d_1$-$d_{24}$ | Total |
| SS Total | 45 | 216 | 264 | 156 | 48 | 729 |
| CMV SS | 18 | 216 | 192 | 132 | 30 | 588 |
| ZCMV SS | 27 | 0 | 72 | 24 | 18 | 141 |
| ZCMV VV | O | — | $B_s$: s is even | $c_1, c_4, c_7,$ $c_{10}, c_{13}, c_{16}$ | $d_3, d_7, d_{11},$ $d_{15}, d_{19}, d_{23}$ | 19 |

Figure 4:
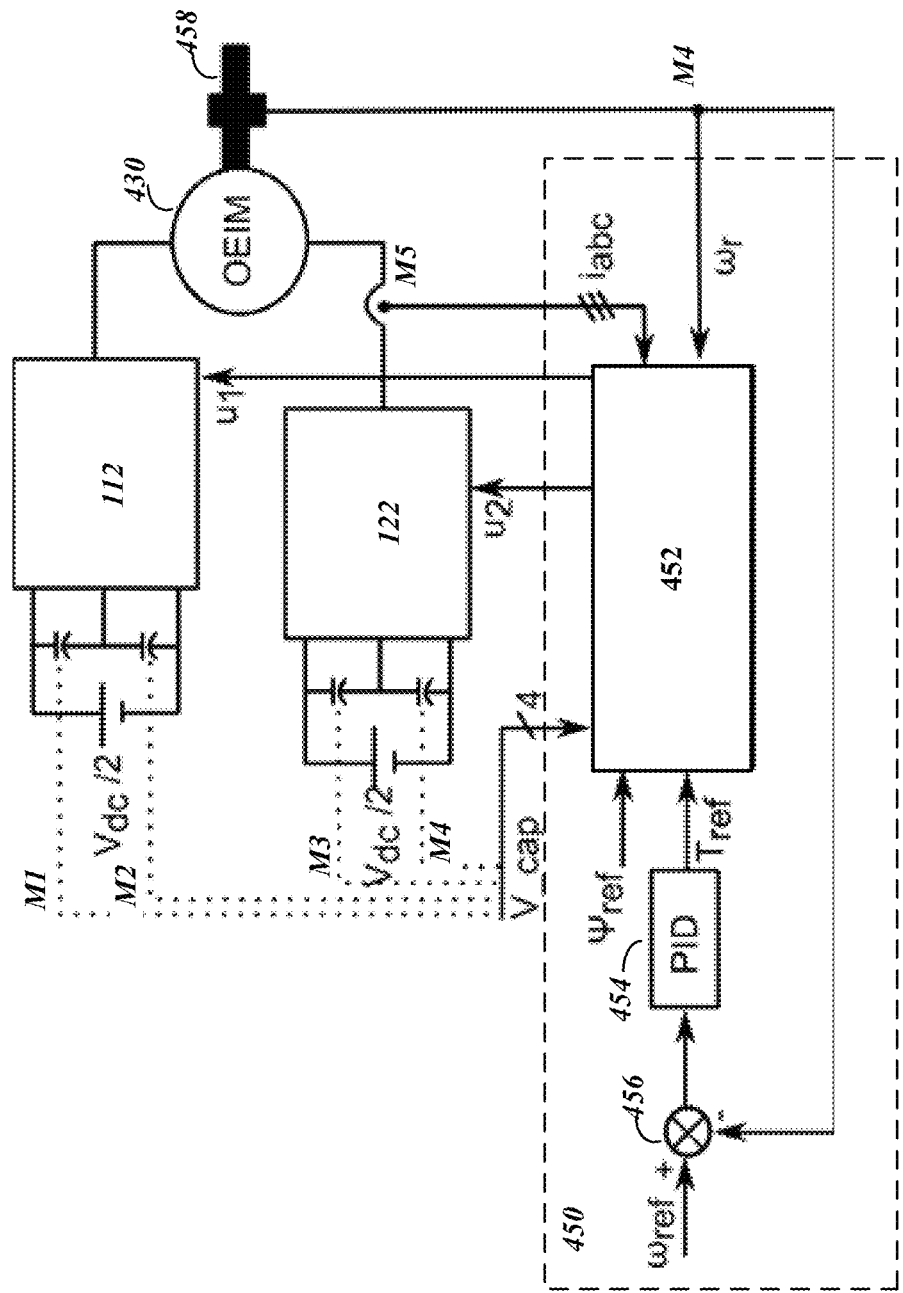
FIG. 4 is a block diagram of predictive torque control.

FIG. 4 illustrates a block diagram of the Torque Predictive Control (TPC) of the induction motor drive. The OEIM 430 is connected to a machine shaft 458. The torque reference is generated from an outer speed control loop via a proportional integral (PI) controller 454. The flux reference ($\psi_{ref}$) is assumed to be constant. Transducers M1-M4 provide continuous measurements of the capacitor voltages, transducer M5 measures the phase currents, $i_a$, $i_b$, $i_c$, shaft encoder M6 measures the angular speed, $\omega_r$, of the machine shaft 458. The CPU 452 includes a processor module having a machine model which is used for predicting the future torque and flux based on the measured and estimated values. Finally, the cost function steps of the present disclosure utilize the reference and predicted quantities to generate the optimal gating signal for the next control sample, which will be applied to the converters. The mathematical models required for the estimation and prediction steps are explained below.

The dynamic model of an induction motor can be expressed using different representations depending on the reference frame used. (See G. Ubaldo, W. Pereira, C. Oliveira, A. Castro, and M. Aguiar. "Weighting Factors Optimization of Predictive Torque Control of Induction Motor by Multi-objective Genetic Algorithm." *IEEE Transactions on Power Electronics* (2018), incorporated herein by reference in its entirety). Considering stator reference frame with stator current ($i_s$) and rotor flux ($\Psi$) as the state variables, the dynamic equations can be expressed using complex vector notation as follow:

$$\dot{x} = Ax + Bu; \text{ where} \quad (6)$$

$$A = \begin{bmatrix} \frac{-1}{\tau_\sigma} & 0 & \frac{k_r}{R_\sigma \tau_\sigma \tau_r} & \frac{k_r}{R_\sigma \tau_\sigma} \omega_r \\ 0 & \frac{-1}{\tau_\sigma} & -\frac{k_r}{R_\sigma \tau_\sigma} \omega_r & \frac{k_r}{R_\sigma \tau_\sigma \tau_r} \\ \frac{L_m}{\tau_r} & 0 & \frac{-1}{\tau_r} & -\omega_r \\ 0 & \frac{L_m}{\tau_r} & \omega_r & \frac{-1}{\tau_r} \end{bmatrix}, \text{ and}$$

$$B = \begin{bmatrix} \frac{1}{R_\sigma \tau_\sigma} & 0 \\ 0 & \frac{1}{R_\sigma \tau_\sigma} \\ 0 & 0 \\ 0 & 0 \end{bmatrix}$$

where $x = [i_s \ \psi_r]^T$ are the state variables, $u = u_s$ is the stator voltage vector, $i_s$ is the stator current, $\psi_r$ is rotor flux, $R_s$ and $R_r$ are stator and rotor resistances, $L_s$, $L_r$ and $L_m$ are stator, rotor, and mutual inductances, respectively. (See Rojas and J. Rodriguez, "Multiobjective Fuzzy Predictive Torque Control of an Induction Motor Drive," Int. Power Electron. Drive Syst. Technol. Conf., no. February, pp. 3-4, 2015, incorporated herein by reference in its entirety). Further, $\omega_r$ is electrical rotor speed, $k_r = L_m/L_r$ is the rotor coupling factor, $R_\sigma = R_s + k_r^2 R_r$ represents the equivalent resistance, $L_\sigma = L_s(1 - L_m^2/L_r)$ is the transient inductance of the machine, $\tau_r = L_r/R_r$ is the rotor time-constant and $\tau_\sigma = L_\sigma/R_\sigma$ is the stator transient time constant.

The electromagnetic torque can be calculated as:

$$T = 3/2\, n_p(\psi_s \times i_s) \tag{7}$$

where $n_p$ is the number of pole pairs and $\psi_s$ is the stator flux.

The prediction step in MPC requires the knowledge of the discrete model of the induction motor. Several discretization methods are available, but for the sake of simplicity, an Euler discretization method is used. In mathematics and computational science, the Euler method is a first-order numerical procedure for solving ordinary differential equations (ODEs) with a given initial value. In control engineering, a state-space representation is a mathematical model of a physical system as a set of input, output and state variables related by first-order differential equations or difference equations. State variables are variables whose values evolve through time in a way that depends on the values they have at any given time and also depends on the externally imposed values of input variables. The values of the output variables depend on the values of the state variables.

The "state space" is the Euclidean space in which the variables on the axes are the state variables. The state of the system can be represented as a vector within that space.

The discrete state space model for the circuit of FIG. 1 of the present disclosure can be expressed using:

$$x^{k+1} = A_d x^k + B_d u^k \tag{8}$$
$$A_d = I + P_s A$$
$$B_d = P_s B$$

where I is the identity matrix, $P_s$ is the sampling time, $A_d$ and $B_d$ represent the discrete values of coefficients A and B.

Using the switching function model of the dual T-type converter, the applied stator voltage can be calculated as $$u_s = u_{s\alpha\beta} = V_{dc}/2(CS_{abc}^{Conv-1} - CS_{abc}^{Conv-2}) \tag{9}$$

where $V_{dc}$ is the summation of the capacitor voltages, $S_{abc}^{Conv-1}$ and $S_{abc}^{Conv-2}$ are the switching functions for each of the dual converters (112, 122, FIG. 1), $u_{s\alpha\beta}$ is the stationary reference frame terminal voltages using the Clarke transformation, and CL represents the Clarke transformation factor:

$$CL = \frac{2}{3}\begin{bmatrix} 0 & -\frac{\sqrt{3}}{2} & \frac{\sqrt{3}}{2} \\ 1 & -\frac{1}{2} & -\frac{1}{2} \end{bmatrix} \tag{10}$$

The rotor flux can be estimated from the rotor dynamics of the induction motor expressed in the rotor reference frame as follows:

$$\psi_r + \tau_r d\psi_r/dt = L_m i_s \tag{11}$$

After using Euler discretization, equation (11) can be expressed as:

$$\psi_r^k = \frac{L_r}{L_r + P_s R_r}\psi_r^{k-1} + \frac{L_m P_s R_r}{L_r + P_s R_r}i_s^k \tag{12}$$

Knowing the rotor flux and using current measurement, Eq. (8) can be used to predict rotor flux one-step ahead. Then stator flux can be calculated at the k+1 sample from:

$$\psi_s^{k+1} = k_r \psi_r^{k+1} + L_\sigma i_s^{k+1} \tag{13}$$

The variables in (8) and (13) are expressed in the stator reference frame, thus a transformation is needed. In order to compensate for the time delay caused by calculation process, the variables at sample k+2 can be calculated using the variables at instant k+1 as follows:

$$x^{k+2} = A_d x^{k+1} + B_d u^{k+1} \tag{14}$$
$$\psi_s^{k+2} = k_r \psi_r^{k+2} + L_\sigma i_s^{k+2}$$
$$T^{k+2} = \frac{3}{2}n_p(\psi_s^{k+2} \times i_s^{k+2})$$

For a capacitor, x:

$$dv_{Cx}/dt = i_{cx}/C_x \tag{15}$$

Using Euler discretization, the predicted capacitor voltage can be expressed as:

$$v_{Cx}^{K+1} = v_{Cx}^K + i_{Cx}^{K+1}\cdot P_s/C_x \tag{16}$$

The capacitor current can be obtained as a function of the three-phase currents and the switching states. Firstly, the capacitor currents can be expressed as a function of the currents $i_1$, $i_2$, and $i_3$ (See FIG. 1) as follows:

$$i_{C1} = i_{dc1} - i_1$$
$$i_{C2} = i_{C1} - i_2 = i_{dc} - i_1 - i_2$$
$$i'_{C1} = i_{dc2} - i'_1$$
$$i'_{C2} = i'_{C1} - i'_2 = i_{dc2} - i'_1 - i'_2 \tag{17}$$

The objective of the controller is to maintain equal energy among the capacitors. Hence, the DC link currents are $i_{dc1} = i_{dc2} = 0$. (See Yaramasu, Venkata, Bin Wu, and Jin Chen. "Model-predictive control of grid-tied four-level diode-clamped inverters for high-power wind energy conversion systems." IEEE transactions on power electronics 29, no. 6 (2014): 2861-2873, incorporated herein by reference in its entirety). Referring to FIG. 1 and equation (17), the capacitor currents can be written as:

$$i_{C1} = -i_1$$
$$i_{C2} = -i_1 - i_2$$
$$i'_{C1} = -i'_1$$
$$i'_{C2} = -i'_1 - i'_2 \tag{18}$$

The currents $i_1$, $i_2$, $i'_1$ and $i'_2$ can be expressed as a function of the three-phase currents by means of switching states as follows:

$$i_{1,2} = m_A i_a + m_B i_b + m_C i_c$$
$$i'_{1,2} = -m_A i_a - m_B i_b - m_C i_c \tag{19}$$

where $m_A$, $m_B$ and $m_C$ are the switching functions. Similarly, the second horizon prediction can be performed similar to that of the flux and torque horizon predictions. The predicted currents can be obtained by the first relation in Wang et al. (See: F. Wang, X. Mei, J. Rodriguez, and R. Kennel, "Model Predictive Control for Electrical Drive Systems—An Overview," Ces Trans. Electr. Mach. Syst., vol. 1, no. 3, pp. 219-230, 2017, incorporated herein by reference in its entirety).

As mentioned above, the idea of the FCS-MPC is to calculate the model cost-function for all switching states (729 in the dual T-type case). However, this huge number of switching states needs a long execution time for calculation (around 5.5 milliseconds using dSPACE 1103), which negatively affects the performance of the drive system. In the present disclosure, two procedures are described and compared as follows.

Procedure 1: Use CMVR and the selected 219 switching states for capacitor balancing.

Procedure 2: Use the CMVE switching states and assess the performance of capacitor balancing using a selected 115 CMVE switching states only.

In Procedure 1, the target is to apply the capacitor balancing and the CMVR in the cost function using the selected 219 switching states. As a result, the cost function will include flux, torque, CMV and capacitor voltage deviations as:

$$J_1 = \frac{|T^{ref} - T^{k+2}|}{T_{rated}} + K_\psi \frac{|\|\psi_s^{ref}\| - \|\psi_s^{k+2}\||}{\|\psi_s\|_{rated}} \quad (20)$$

$$J_2 = K_{dc}(|v_{C1}^{k+1} - v_{C2}^{k+1}| + |v_{C3}^{k+1} - v_{C4}^{k+1}|)$$

$$J_3 = K_{cm}|v_{CM}|$$

$$J = J_1 + J_2 + J_3$$

where $T^{ref}$ and $\psi_s^{ref}$ are the reference torque and stator flux respectively, $T_{rated}$ is the rated torque (maximum torque the motor can bear) and $\|\psi_{rated}\|$ is the rated stator flux magnitude (maximum flux the stator can bear) and $K_\psi$, $K_{dc}$, and $K_{CM}$ are the flux, capacitor voltage and CMV weighting factors respectively. These weighting factors determine the relative influence of flux, capacitor voltages and CMV errors in the cost function. During the design process, these factors should be carefully tuned in order to obtain good performance. The optimum vector is the minimum of the cost functions calculated by:

$$V_{opt} = \arg\min_{\{V_1 \ldots V_{219}\}} J(V_s^{k+1}) \quad (21)$$

A flow-chart for the reduced switching state MPC calculations of the present disclosure is shown in FIG. 5A. The reduced switching state MPC code is performed based on the following steps. At step S541, the capacitor voltages, three-phase currents and the motor speed are received from transducers M1-M6 (see FIG. 4). At step S543, the flux and torque are estimated and then predicted for each of the 219 switching states. At step S544, the cost function J of equation (20) is calculated. At S545, k is incremented. Step S546 determines whether the cost function for all the switching states has been calculated. If not, the loop returns to S543 to calculate the next cost function. When all 219 cost functions have been calculated, the voltage vector giving the minimum cost function is determined using equation (21). This voltage vector is denoted as the optimum voltage vector. Experimental results determined that the execution time for these calculations is 140 μS using a dSPACE 1103 digital controller (750, FIG. 7), which is fast enough to operate 5L MLCs, but still slightly high.

In Procedure 2, the CMV analysis reflected that only 19 voltage vectors (one for the zero vector and 18 voltage vectors which produce only ZCMV) can produce ZCMV, as listed in Table V. These voltage vectors can be achieved by 141 switching states, and can be optimized to 115 switching states as only one state for vector O is needed to be used for both achieving capacitor balancing and common mode voltage elimination (CMVE). Hence, the switching number of switching states is reduced to 115.

Applying these switching states to equations (20), while omitting the $J_3$ term, yields an optimum vector which is calculated as:

$$V_{opt} = \arg\min_{\{V_1 \ldots V_{115}\}} J(V_s^{k+1}) \quad (22)$$

Experimental results show the execution time for the ZCMV calculations is 71 microseconds using dSPACE 1103 digital controller which is fast enough to operate the 5L MLC.

Figure 5B:
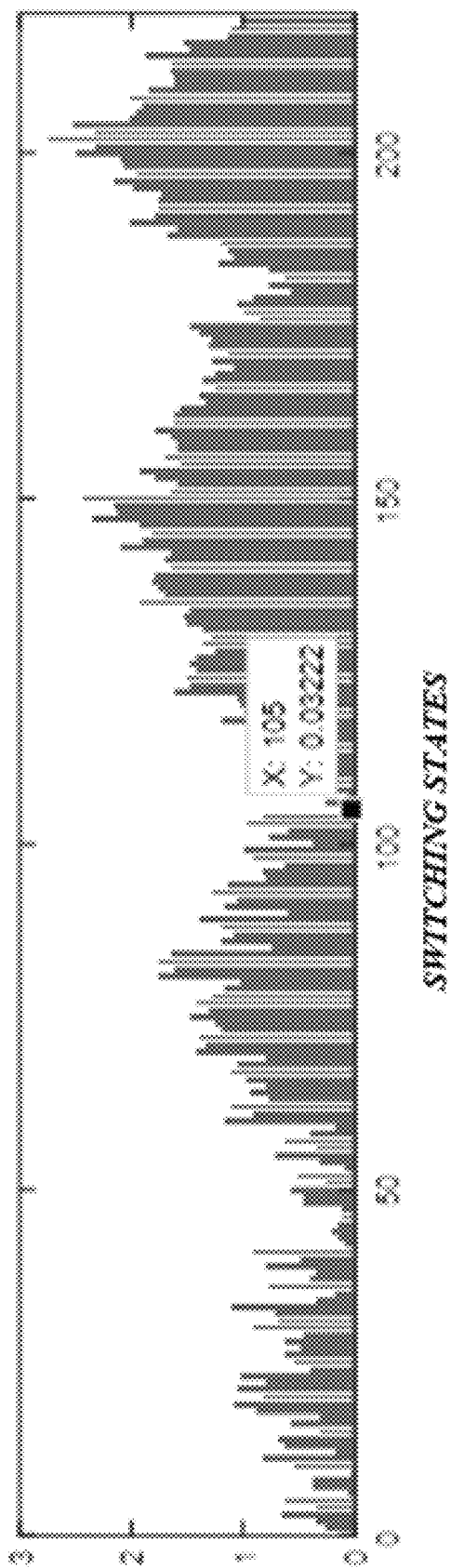
FIG. 5B is a graph of cost function values versus switching states.

In a non-limiting example, the cost function evaluation for one of the switching states is performed. Assume a load torque of 2.75 N.m, a speed of 1700 RPM, a flux of 0.8715 Wb and weighting factors of 4, 0.1 and 0.1 for flux, capacitor balancing and CMV. By testing the cost function for the 219 switching states, at a randomly selected instant, the cost function values are represented as shown in FIG. 5B, in which the minimum cost function value is 0.032 at switching state index 105, which represents switching state NPO for converter 1, an N'N'P' switching state for converter 2 and attains the voltage vector $c_2$.

The Silicon Carbide (SiC) semiconductor technology is generally preferred in the power electronic converter as it decreases the converter switching losses. However, using SiC MOSFETs in 5L MLCs faces some difficulties due to EMI. Due to large commutation paths in the MLCs printed circuit boards (PCBs) compared to 2L converter circuits, the stray inductance increases and hence ringing (voltage overshoots at the instant of level transition) appears. The voltage overshoot results from the energy stored in the stray inductance $L_s$, $E_s = L_s i^2/2$ through the current path. This voltage overshoot is added to the DC link voltage and becomes larger than the diode blocking voltage of the switches. Until now, T-type modules were produced for only one-phase in order to avoid EMI problems. (See Fair-Child Application Note: Renewable energy solutions: energy efficient components for PV solar systems, incorporated herein by reference in its entirety).

Figure 6A:
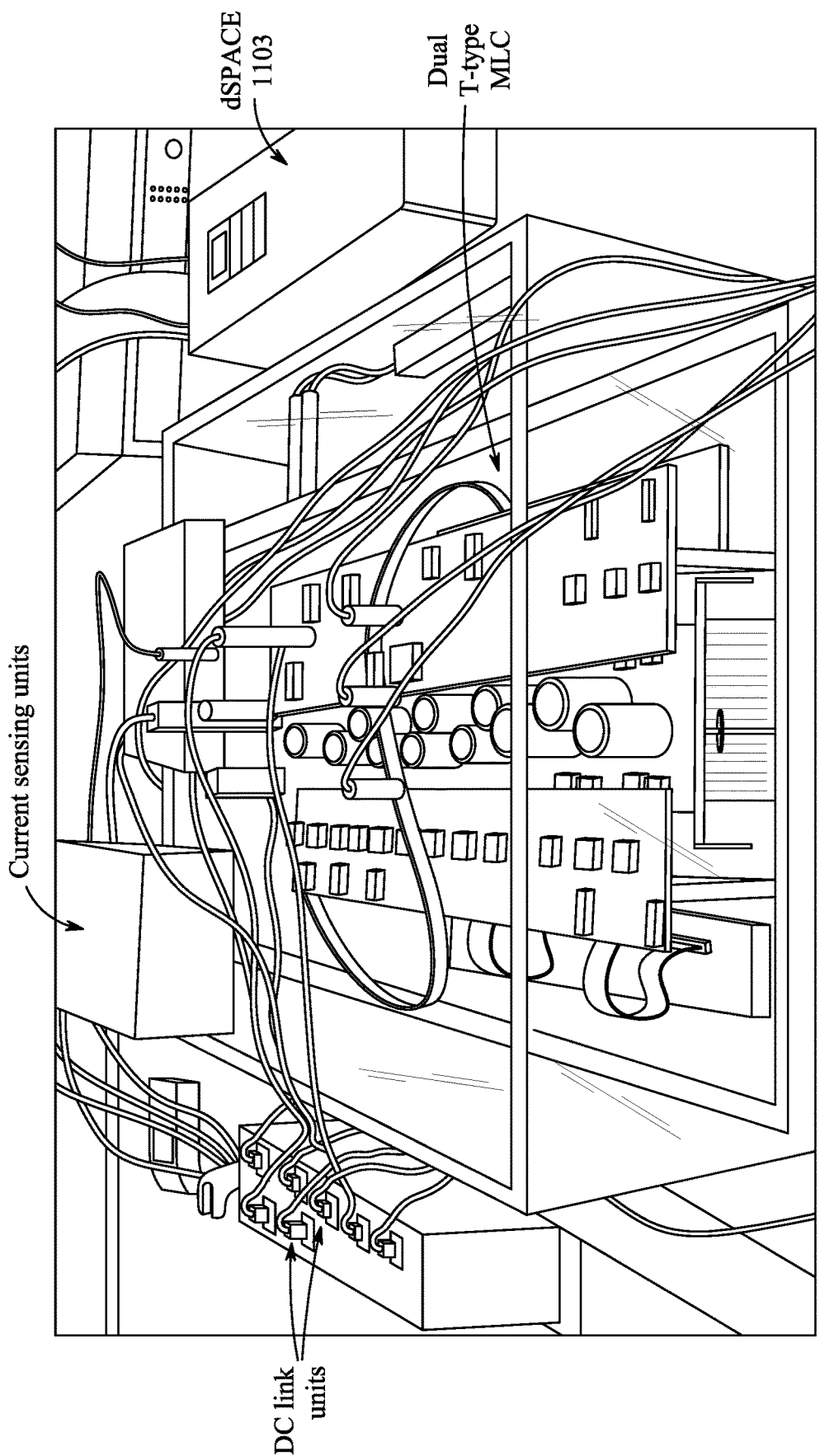
FIGS. 6A-6C illustrate a T-type MLC A) dual T-type laboratory prototype B) double layers PCB layout, and C) Gate to source pulses vs. dSPACE pulses.
Figure 6B:
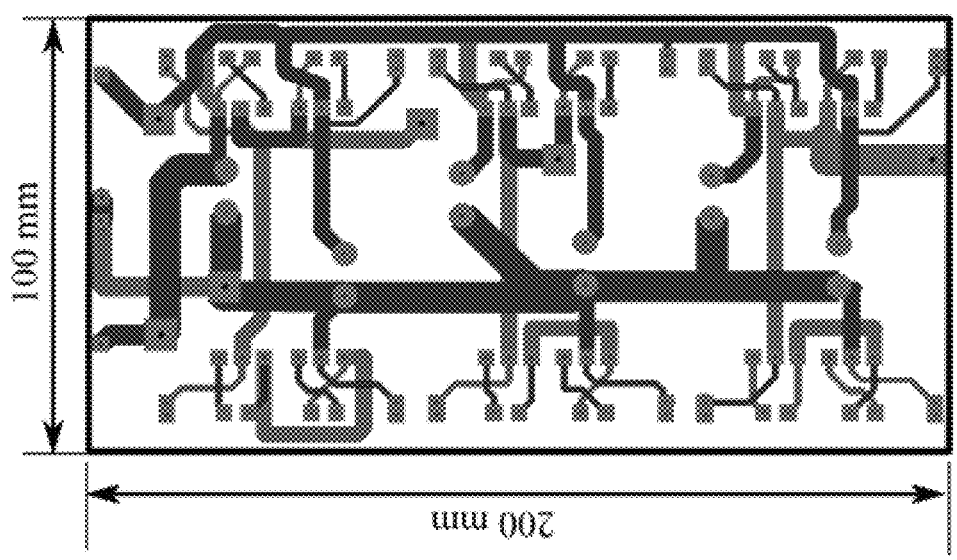
Figure 6C:
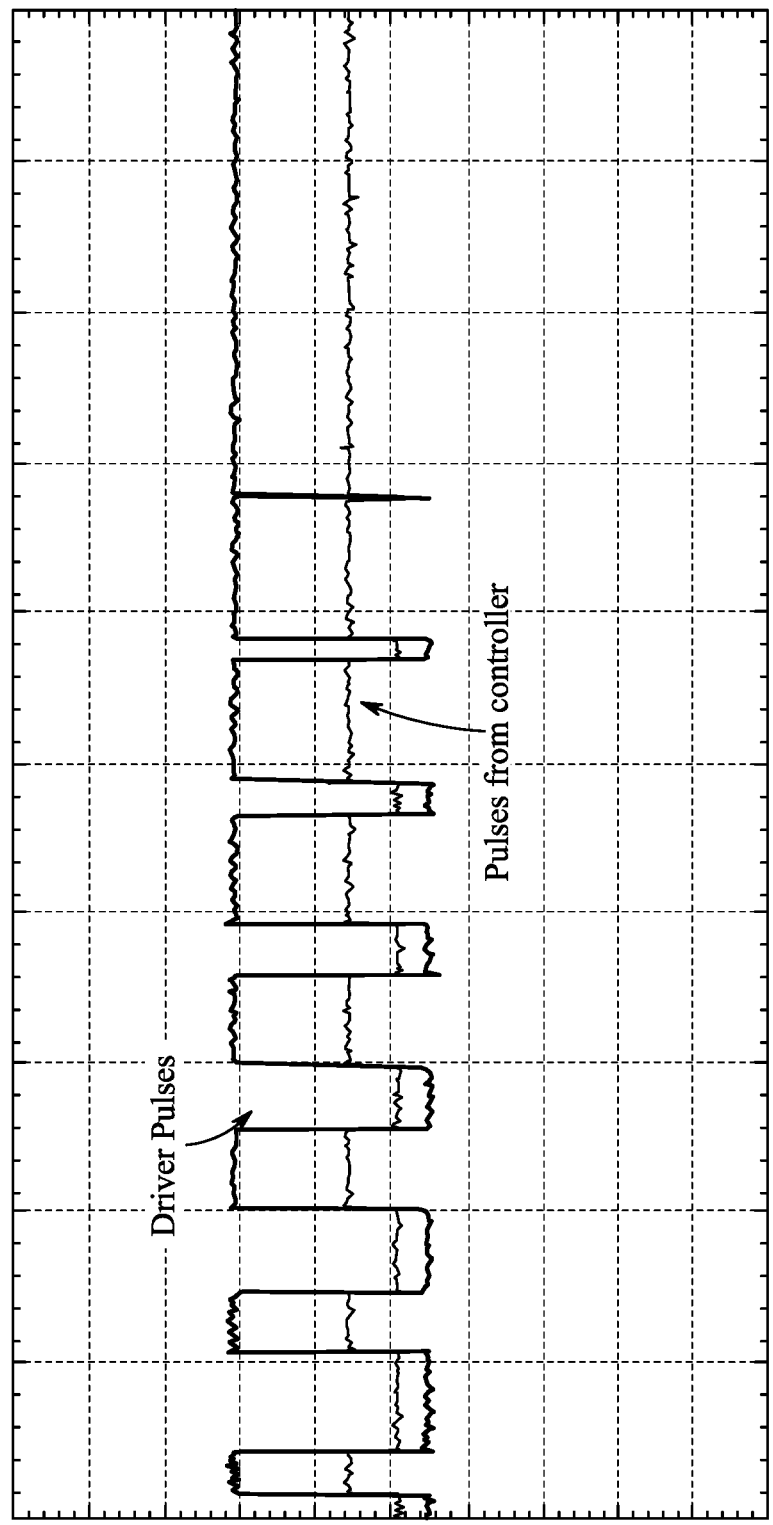

In the experimental test setup of the present disclosure, a three-phase T-type converter was designed and implemented on one PCB. The prototype for the dual 3L T-type MLC is shown in FIGS. 6A, 6B. The tracks were kept as short as possible and electrolytic capacitors were installed on the PCB. Some designs have used film capacitors in order to reduce the electromagnetic interference (EMI) and prevent ringing (voltage spikes) during switching transitions. (See Shi, Yanjun, Yuxiang Shi, Lu Wang, Ren Xie, and Hui Li. "A 50 kW high power density paralleled-five-level PV converter based on SiC T-type MOSFET modules." In Energy Conversion Congress and Exposition (ECCE), 2016 IEEE, pp. 1-8. IEEE, 2016, incorporated herein by reference in its entirety). However, film capacitors are more expensive. In the dual three-phase T-type converter of the present disclosure, electrolytic capacitors are used. The distance between the driver and the discrete switches is kept small (around 4 centimeters for the gate current loop) to avoid the EMI problem. The gate to source pulses for one SiC MOSFET are shown in FIG. 6C. The absence of spikes in the pulses indicates that the driver circuits and their wiring connections are well designed.

Figure 7:
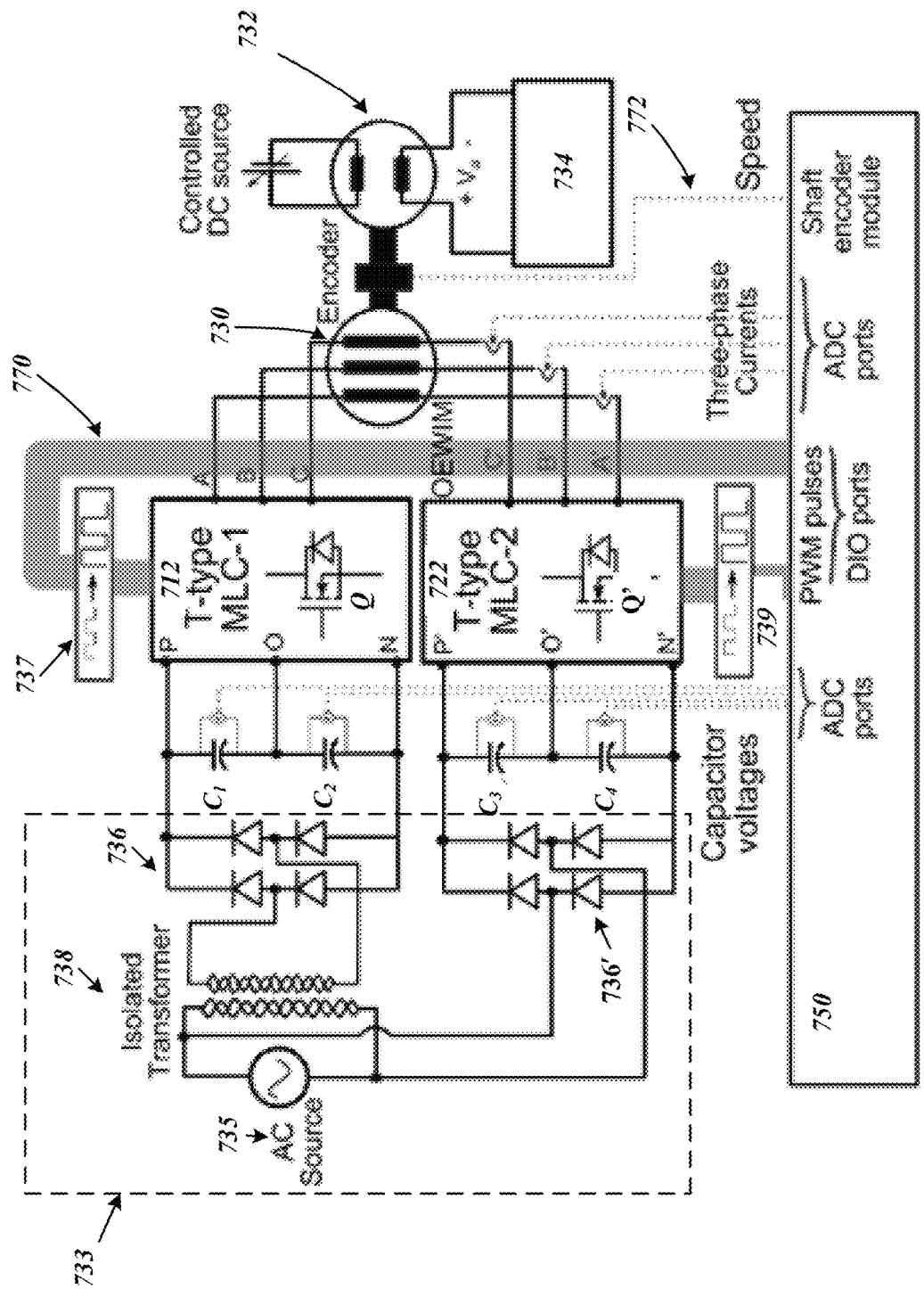
FIG. 7 is a block diagram for the experimental setup.

The experimental T-type converter was implemented using SiC discrete switches metal-oxide semiconductor field-effect transistor (MOSFET). The converter power circuit board (PCB) is designed based on short traces between driver and discrete switches and short power traces. As shown in FIG. 7 the gating pulses are connected to the converters using twisted ribbon cables 770 in order to avoid EMI effects in the wiring. In a non-limiting example, the gate driver circuit is the CGD15HB62P1 which is used to drive the C2M0080120D SiC discrete MOSFETs. (See: CGD15HB62P1, Gate Driver board and C2M0080120D, SiC MOSFET, Wolfspeed, a CREE company, 3028 East Cornwallis Road, Research Triangle Park, N.C., U.S.A.) The converter is interfaced to a dSPACE 1103 PPC digital controller board (See: DS1103 PPC Controller Board, ASES, Unit 8, 5-7 Wiltshire Street, Minto, NSW2566, Australia) through a dead-band circuit. Voltage and current sensors (M1-M6 of FIG. 4) are used to feedback the voltage and current signals to the digital controller. In a non-limiting example, the voltage and current sensors can be LEM modules (See: LA 55-P current transducer, element14, D Block, 11$^{th}$ Floor, IBC Knowledge Park, 4/1, Bannerghatta Main Rd, Bhavani Nagar, Suddagunte Palya, Bangalore, Karnataka 560029, India and LV 25-P, voltage transducer, Newark, 33190 Collection Center Drive, Chicago, Ill., U.S.A.).

In principle, operating a T-type SiC based MLC with a high switching frequency is possible. However, the switching frequency of the experimental prototype of the present disclosure is limited by the MPC computation time, which is 70 µs for one of the procedures (corresponding to a maximum frequency of 14.3 kHz) using 1103 dSPACE digital controller.

The experimental test-setup shown in FIG. 7 consists of dual three-level (3L) T-type converters (712, 722) connected to an OEIM 730, which is mechanically coupled to a DC machine 732. The DC machine is loaded by a programmable load 734 to adjust the required induction motor torque command. The dual converters are supplied from two single-phase rectifiers (736, 736'). Each rectifier is connected to two cascaded capacitors ($C_1$ and $C_2$ or $C_3$ and $C_4$) in order to attain the DC link mid-points O and O'. An AC source 1035 is connected to one isolated transformer 1038 to prevent zero-sequence current in the drive system. The AC source 735, transformer 738 and rectifiers 736, 736' generate the DC voltages $V_{dc}/2$ of FIG. 1, FIG. 4 and FIG. 7. The gating pulses are connected to the converter using twisted ribbon cables 770 in order to reduce the EMI effects in wiring. The voltage and current sensors (M1-M6 of FIG. 4) are used to feedback the voltage and current signals to the digital controller. The three-phase currents, the capacitor voltages and the shaft encoder measured signals are transferred to dSPACE ports using coaxial cables 772. The gate driver circuits (737, 739) are used to drive the SiC discrete MOSFETs (Q, Q', FIG. 1). In FIG. 7, the digital controller 750 represents the computing system 450 shown in FIG. 4.

A simulation of the circuit of FIG. 7 was implemented using Matlab™\Simulink® software. The experimental test was performed using the test-setup seen in FIG. 7. The available programmable load can only work when generated voltage is obtained from the DC machine 734 and the programmable load command can be applied. Hence, the simulation corresponds to the experimental tests after an extended period.

To test the drive system, the following experiment sequence was carried out. Firstly, the flux command was applied at the instant t=0 and reached to its rated value at t=0.1 S, then the speed command was applied. This pre-excitation process helped to reduce the starting current. Furthermore, in order to investigate the drive system performance under the different circumstances, i.e. capacitor balancing, CMVR, and CMVE, two test cases were performed:

A. Case 1: The test was implemented without capacitor voltage balancing. The CMV is considered in the drive system.
B. Case 2: The test was implemented with capacitor voltage balancing and with CMVR as in Procedure 1.
C. Case 3: The test was implemented with capacitor voltage balancing and with CMVE as in Procedure 2.

Case 1 (ignoring capacitor balancing) involved two different tests.

i. The capacitor balancing technique was ignored at the start of drive operation (at t=0).
ii. The effect of deactivating the capacitor balancing process at steady state was inspected.

Figure 8:
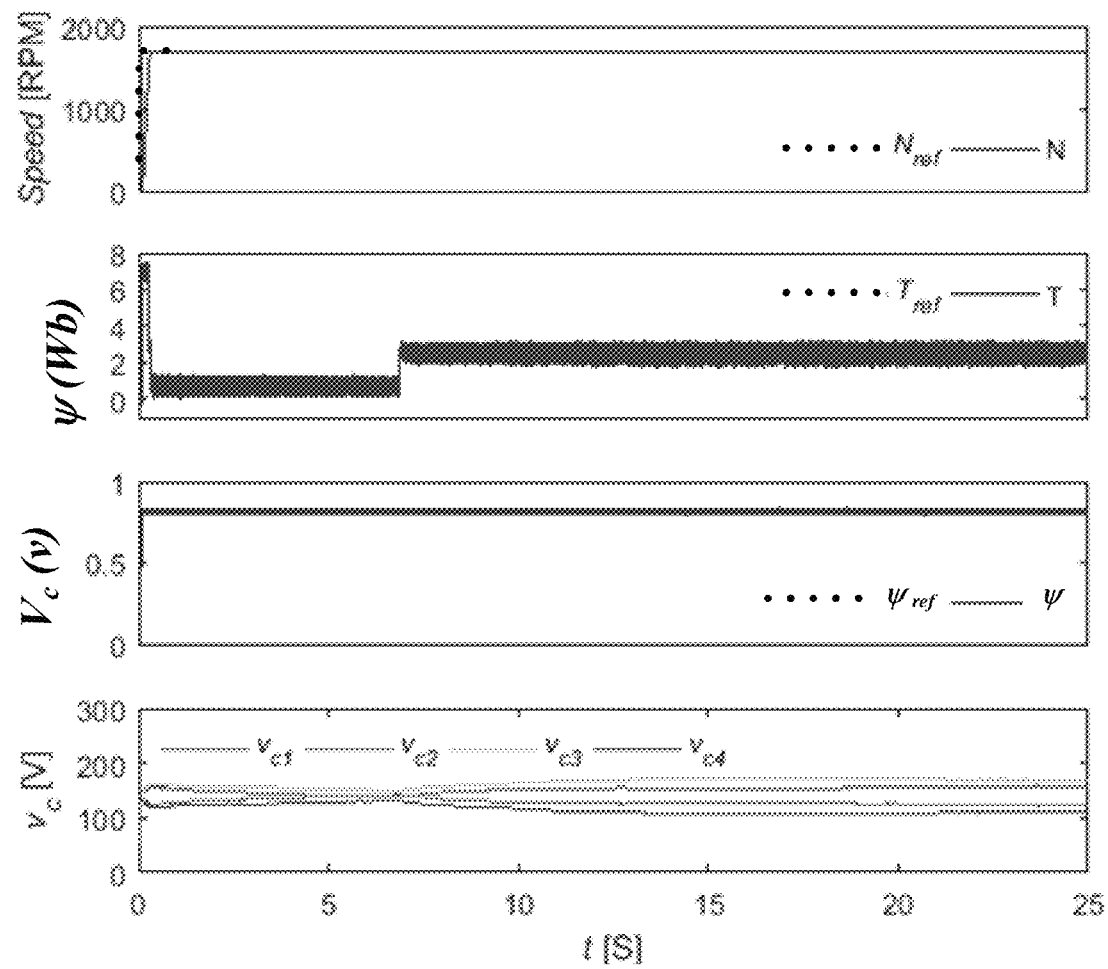
FIG. 8 illustrates a simulation of motor speed, torque, flux and capacitor voltages without considering capacitor balancing.

The Case 1(i) simulated test results for motor speed, torque, flux and capacitor voltages without considering capacitor balancing are shown in FIG. 8, where the machine torque follows the reference torque with peak-peak ripples of 1.594 N.m. (63.76% of reference torque). In addition, the flux ripples reached 44 mWb (5.39% of reference flux). The capacitor voltage deviation reached 28 V (20% of the capacitor reference voltage).

Figure 9:
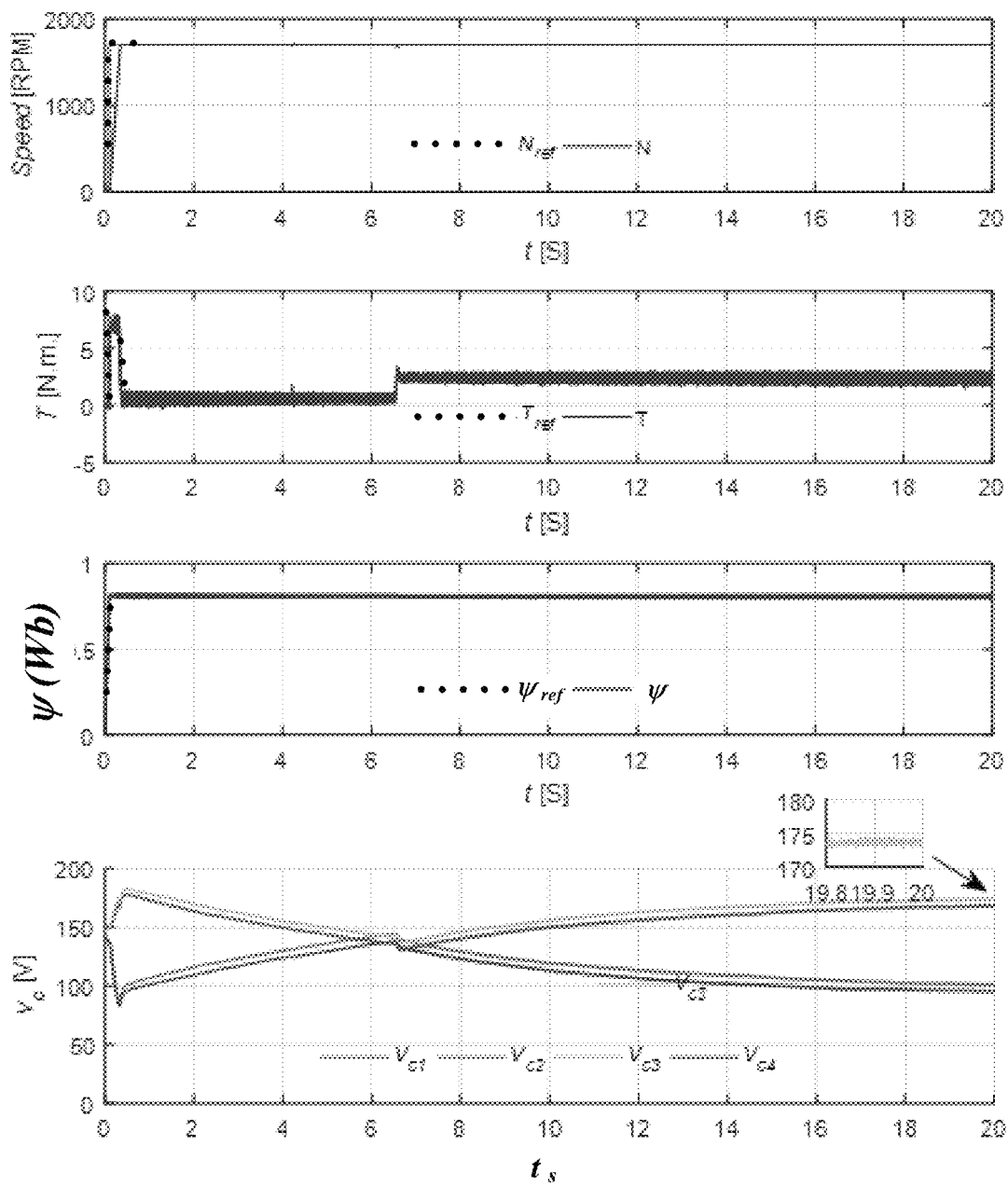
FIG. 9 illustrates the experimental results for the motor speed, torque, flux and capacitor voltages without considering capacitor balancing.

The corresponding experimental results for Case 1(i) are shown in FIG. 9. Similar trend for torque and flux ripples may be observed in the experimental test. The torque and flux ripples are 2.07 N.m. (82.9% of reference torque) and 51 mWb (6.25% of the reference flux) respectively. The capacitor voltage deviation reached 25 V (17.86%) in the experimental test.

Figure 11:
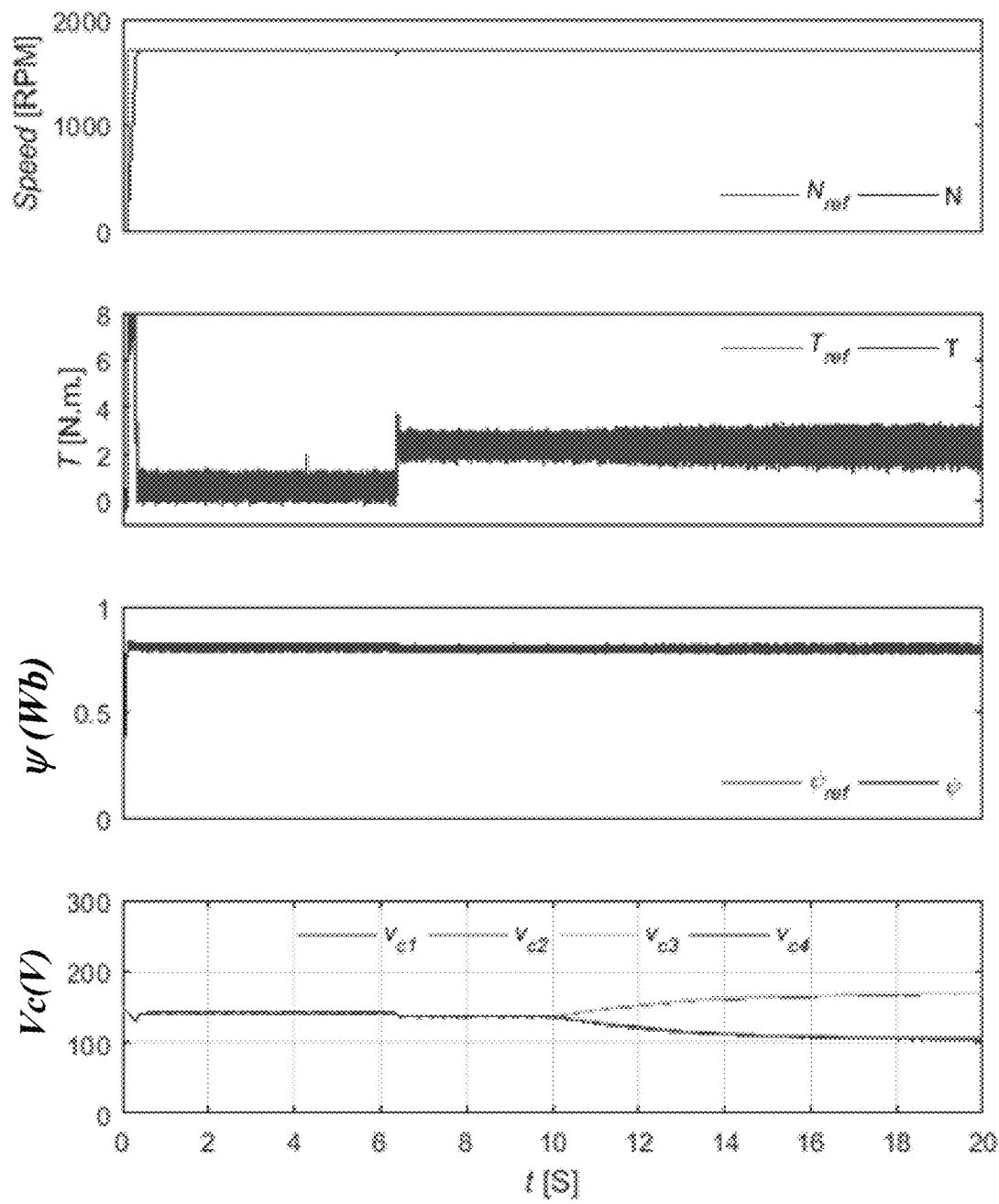
FIG. 11 illustrates the experimental results for motor speed, torque, flux and capacitor voltages while disabling capacitor balancing at t=10 S.

For Case 1(ii), deactivating the capacitor balancing during steady state was implemented. FIG. 10 and FIG. 11 show the simulated and experimental results respectively. The capacitor disabling instant is 10 s.

Comparing the steady-state torque and flux ripples for the intervals before and after the disabling instant, the torque ripples increased from 0.525 to 1.427 N.m. for the simulation results in FIG. 10. Correspondingly, for simulation results as well, the flux ripples increased from 16 to 40 mWb. As shown in FIG. 11, the torque ripples increased from 0.86 to 1.93 N.m. and the flux ripples increased from 26 to 51 mWb, respectively.

Figure 12A:
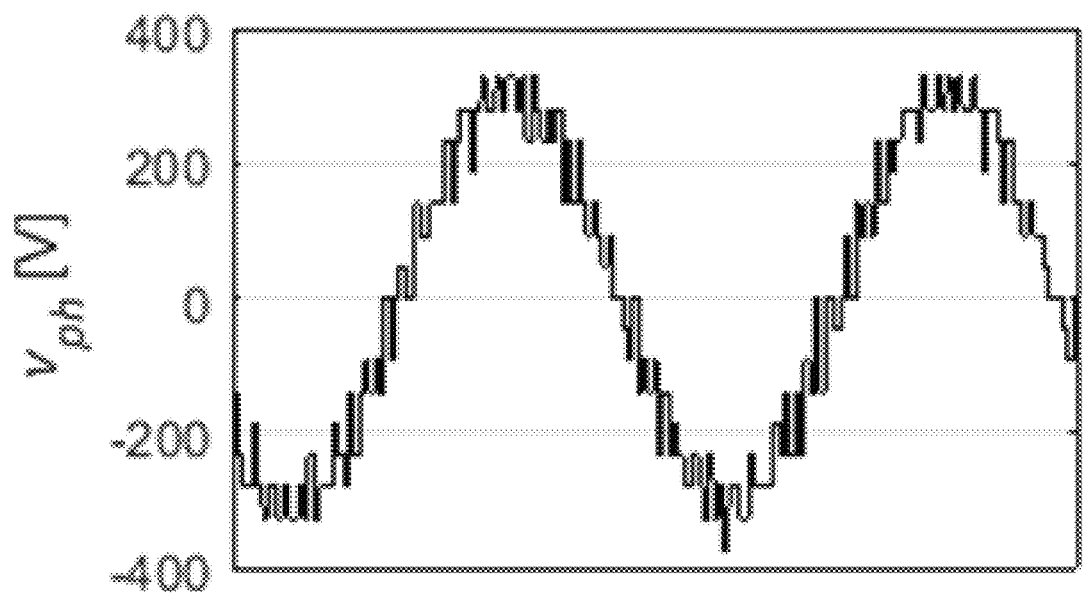
FIGS. 12A-12D illustrate a simulation of the phase voltage and current for balanced and unbalanced cases.
Figure 12B:
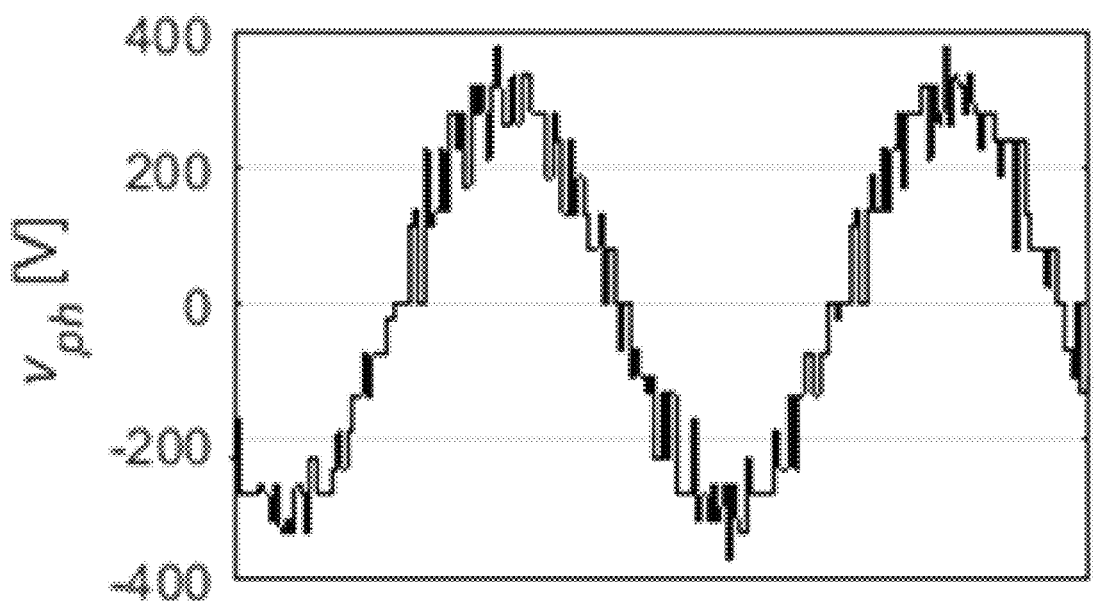
Figure 12C:
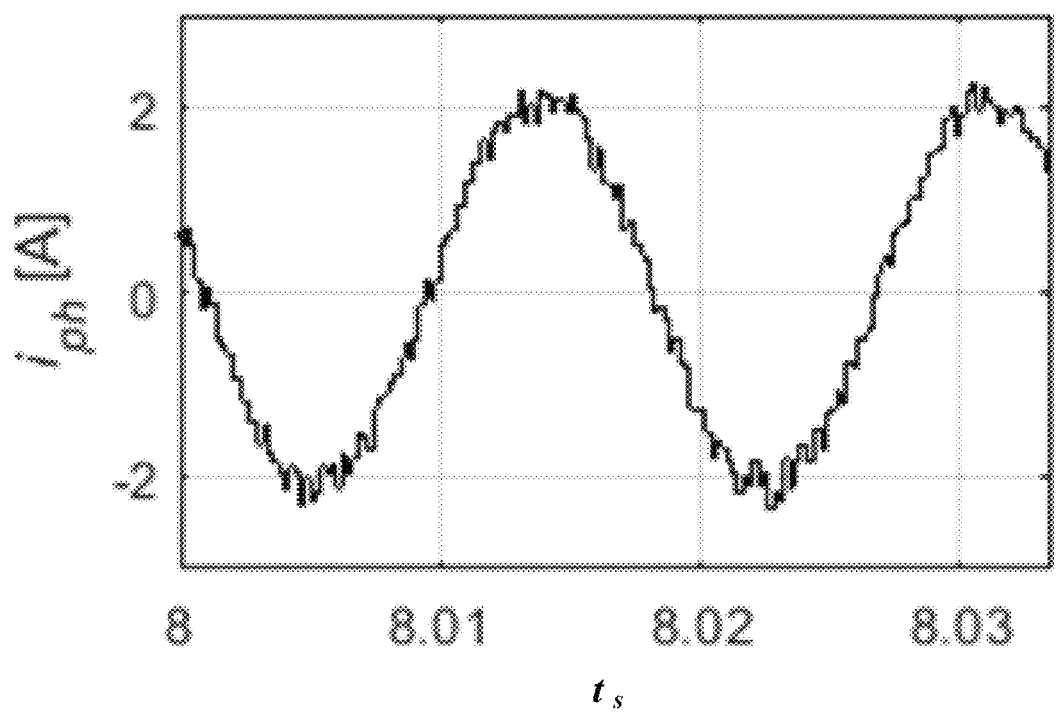
Figure 12D:
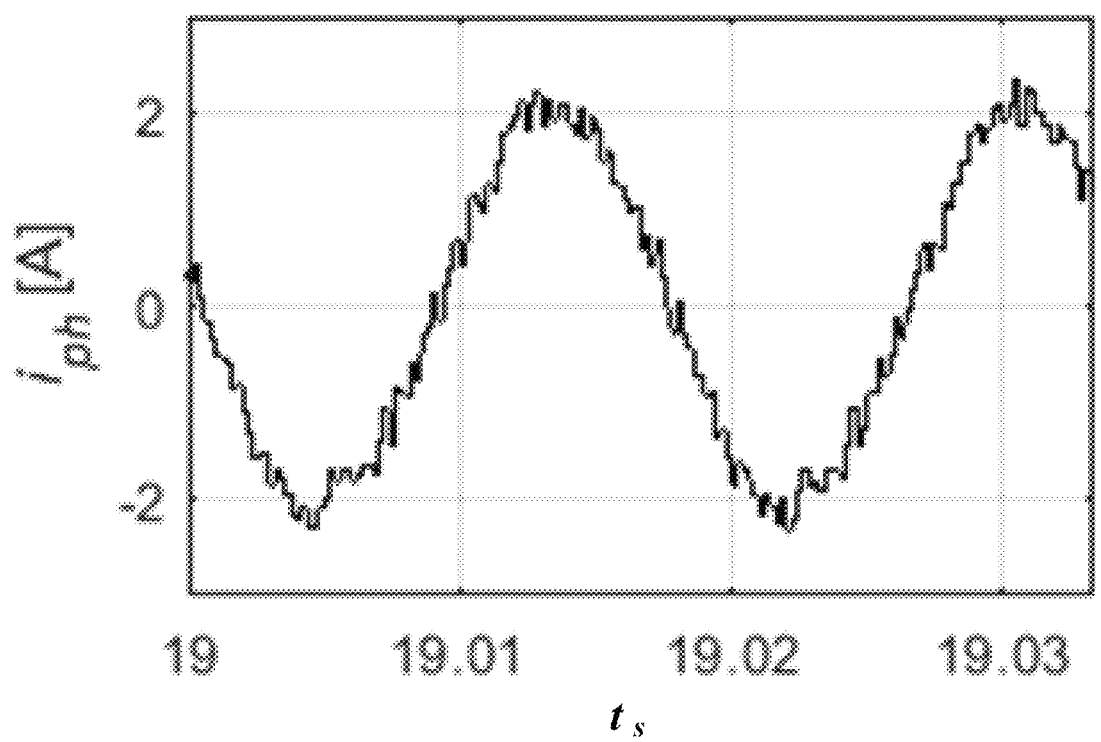
Figure 13A:
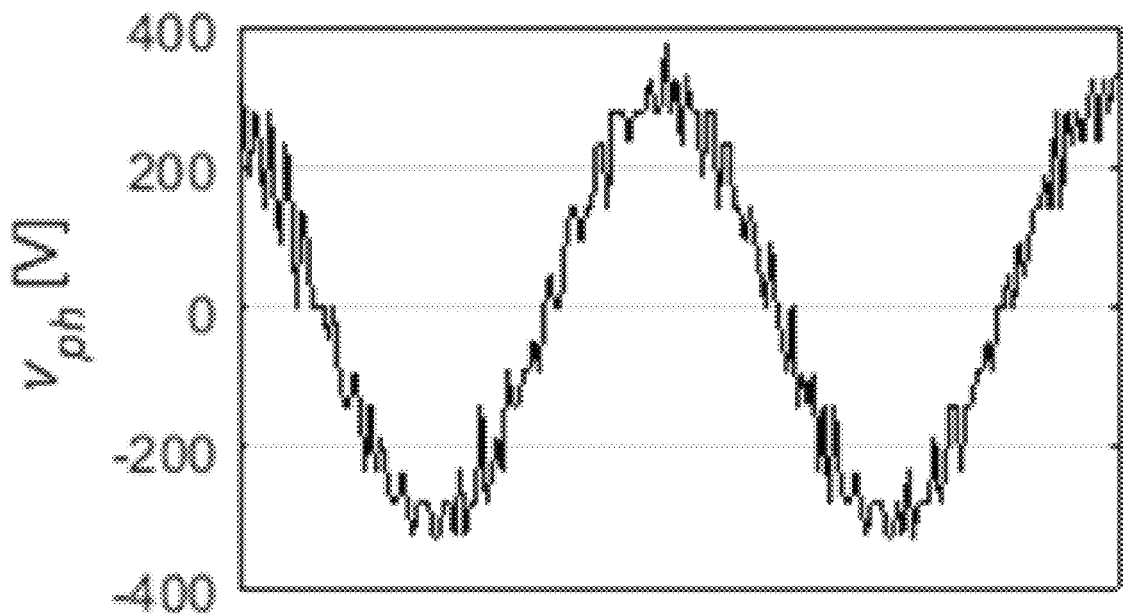
FIGS. 13A-13D illustrate the experimental results for the phase voltage and current for balanced and unbalanced cases.
Figure 13B:
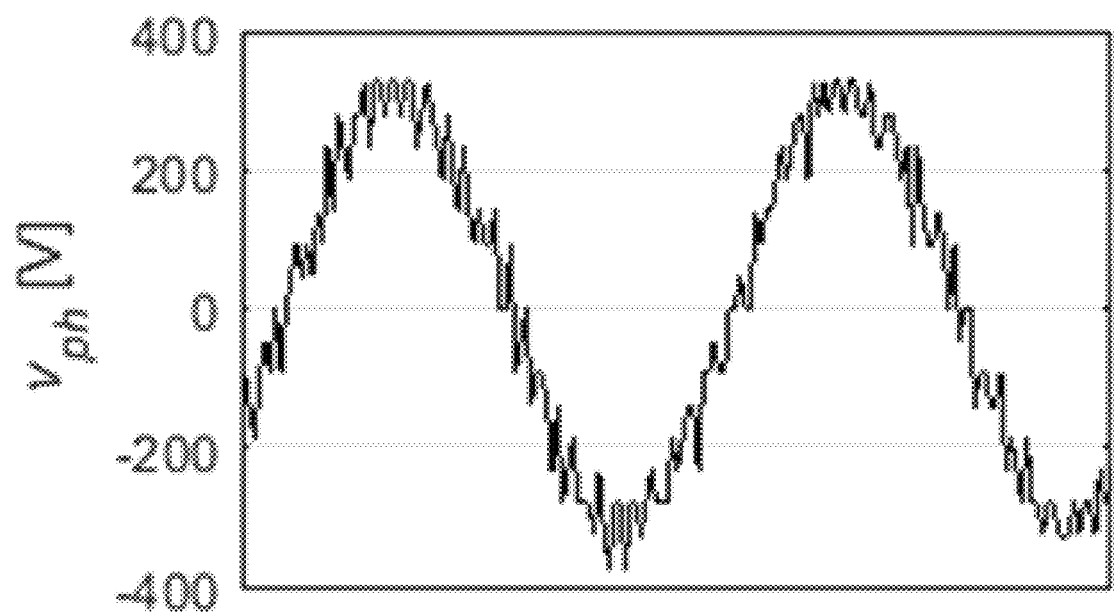
Figure 13C:
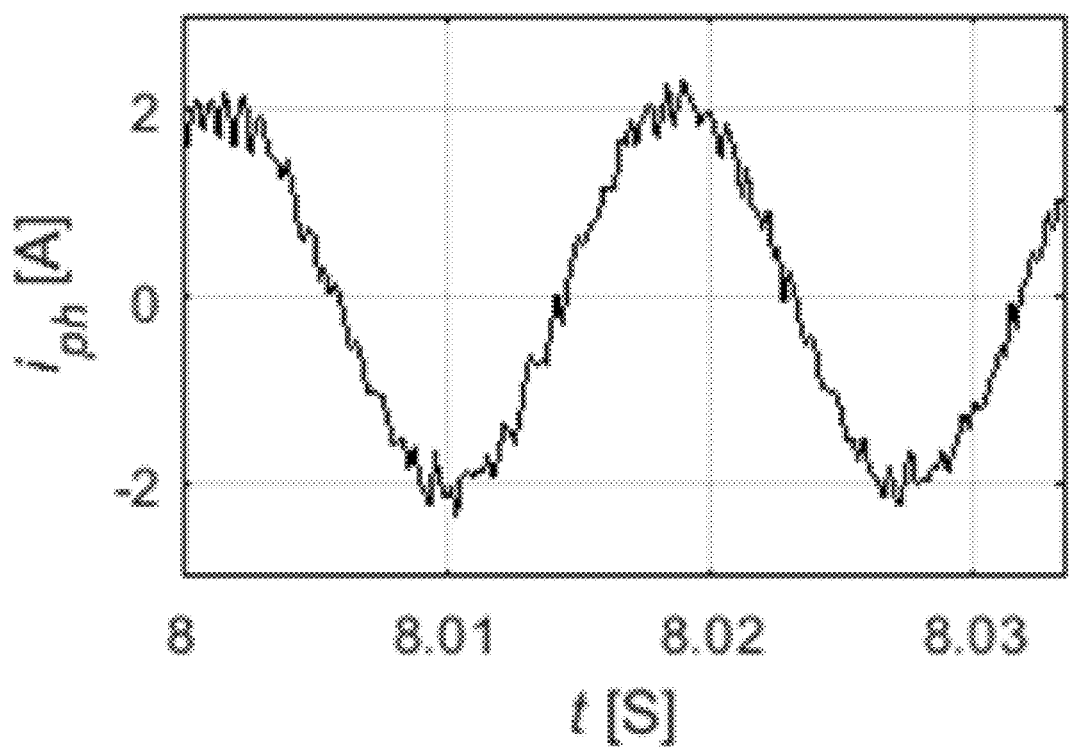
Figure 13D:
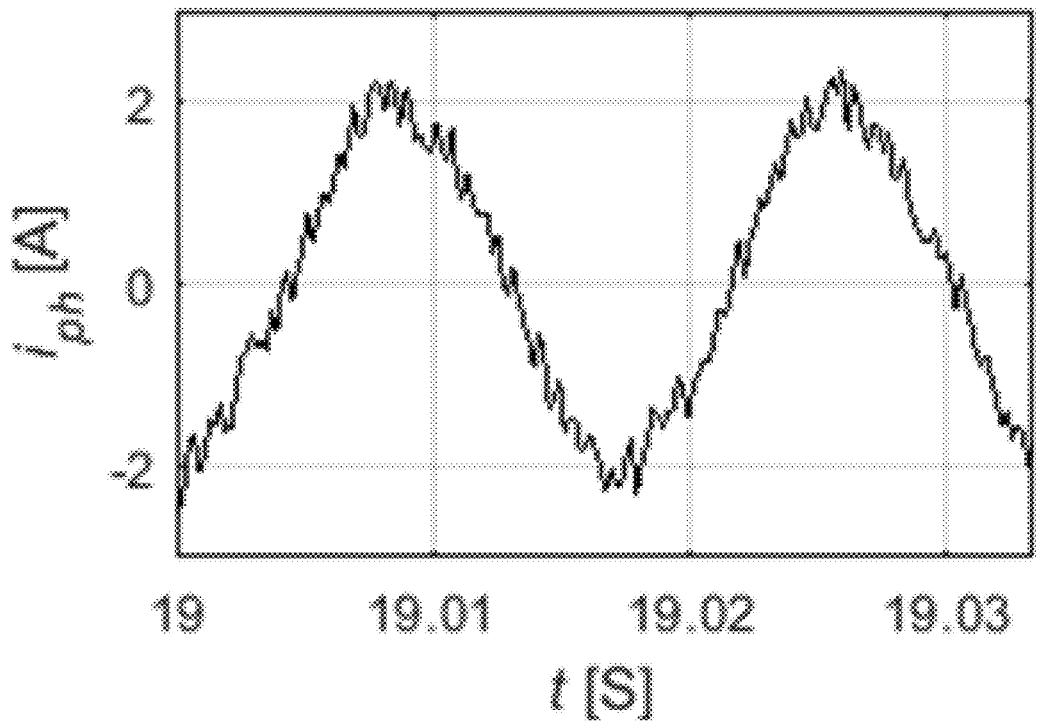

On the other hand, the effect of the capacitor unbalancing compared to normal operation (balanced capacitors case) on the motor voltage and current is observable. FIG. 12A shows the simulated balanced phase voltage graph, and FIG. 12B shows the simulated phase voltage unbalanced graph. FIG. 12C shows the phase current for the simulated balanced case and FIG. 12D shows the phase current for the unbalanced case. FIG. 13A shows the experimental phase voltage waveform for the balanced case and FIG. 13B shows the experimental phase voltage waveform for the unbalanced case. FIG. 13C shows the experimental phase current waveform for balanced case and FIG. 13D shows the experimental phase current waveform for the unbalanced case.

The voltage levels and the current waveforms appear distorted for the unbalanced capacitor case. The total harmonic distortion (THD) values for normal and unbalanced voltage and current are listed in Table VI. Hence, losing capacitor balancing either at steady state operation or at the start of the drive operation have similar effects on the drive system.

TABLE VI

COMPARISON BETWEEN BALANCED AND UNBALANCED THD VALUES FOR BOTH VOLTAGE AND CURRENT

| Case | $THD_I$ [%] | | $THD_v$ [%] | |
|---|---|---|---|---|
| | Sim. | Exp. | Sim. | Exp. |
| Unbalanced case | 10.99 | 12.10 | 25.02 | 26.80 |
| Balanced case | 1.12 | 1.85 | 16.13 | 18.43 |

Figure 14:
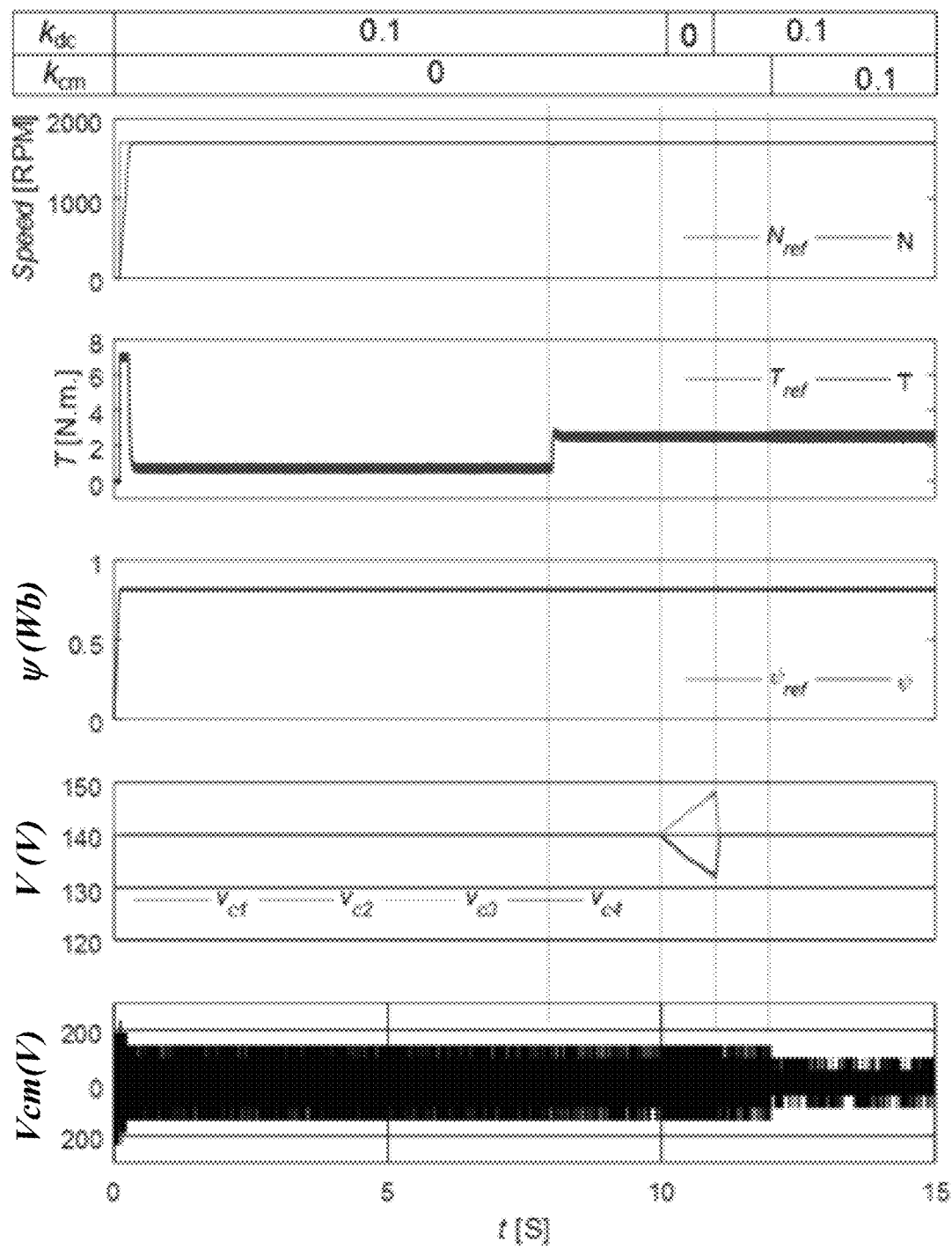
FIG. 14 illustrates a simulated test of the T-type drive system using CMVR, capacitor balancing, and TPC.

In case 2 (considering CMVR and performing capacitor voltage balancing as in Procedure 1), capacitor balancing is performed from the instant t=0. The simulation results for the motor speed, torque, flux, capacitor voltages and CMVR are shown in FIG. 14. The capacitor balancing weighting factor $K_{dc}$ is set to 0.1 from t=0-10 s. This period, in which the capacitor balancing is considered and both CMVR and CMVE are ignored, is referred to as the "normal operation" in the present disclosure. During this period, the torque, flux, speed and capacitor voltages follow their references values closely. The torque ripple is 0.525 N.m. (21% of the reference torque). Correspondingly, the flux ripple is 16 mWb (1.9% of the reference flux). The maximum capacitor voltages ripple is 0.4 V (0.29% of the desired capacitor voltage).

In order to test the capability of the reduced switching state MPC of the present disclosure to restore balancing if the capacitor voltages are disturbed, capacitor balancing was disabled for one second (t=10-11 s). This disabling had a marked effect in the 10-12 s range of the voltage curve of FIG. 14. The reduced switching state MPC quickly rebalanced the capacitors balancing in a short period (0.23 s) after 11 s.

In order to test the CMVR, at the period t=13-15 s, $K_{cm}$ is set to 0.1. The torque and flux ripples are 0.699 N.m. and 18 mWb respectively. These ripples contribute improvements of 33.14% and 12.5% in the normal operation torque and flux respectively as demonstrated by the $V_{cm}(V)$ graph of FIG. 14. In addition, the maximum capacitor voltage deviation increased to 0.5 V, which is 25%, compared to normal operation voltage deviation. In addition, it could be observed that the CMV is limited to 93 V instead of 140 V, which means a reduction of 33.5% in the maximum CMV is achieved.

Figure 15:
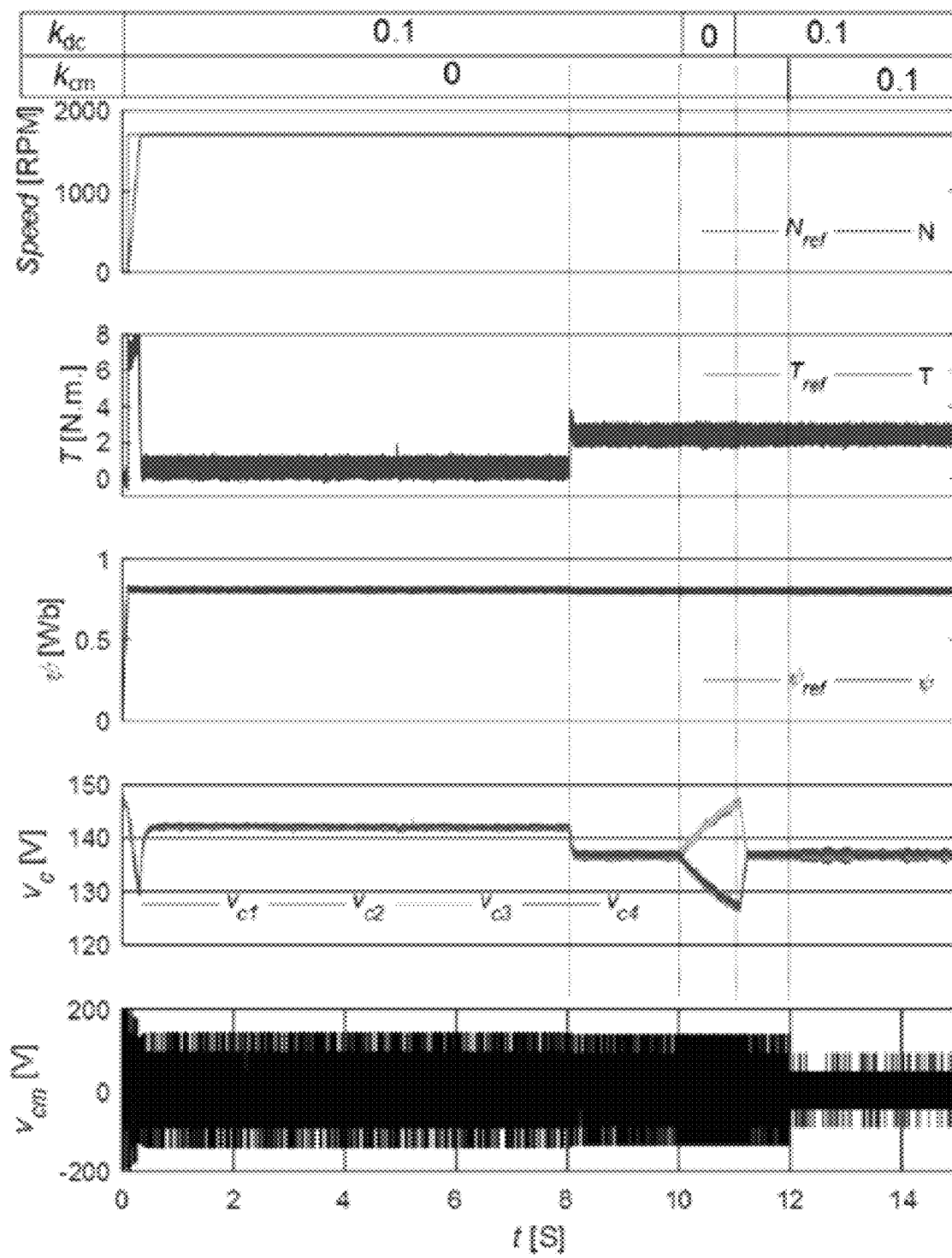
FIG. 15 illustrates an experimental test of the T-type drive system using CMVR, capacitor balancing, and TPC.

Similarly, the experimental test achieved similar impact. FIG. 15 shows the drive system response for the loading condition while CMVR, torque predictive control and capacitor balancing are considered. The torque and flux ripples are 1.534 N.m. and 21 mWb respectively. In addition, the capacitor voltage deviation reached to within 1.5 V of the reference voltage.

In the experimental testing, during the first 0.1 s while the machine is energized, the capacitor voltages drop because of high starting current. This appears only in experiments, as the supply is not regulated. After the startup period, the results are similar to the simulated results.

In Case 2: (considering CMVE and performing capacitor voltage balancing as in Procedure 2), the performance of the T-type drive system is tested with the aim of removing the CMV using the proposed 115 reduced number of switching states that represent 19 voltage vectors. At first, capacitor balancing is considered during the first 10 second interval.

Figure 16:
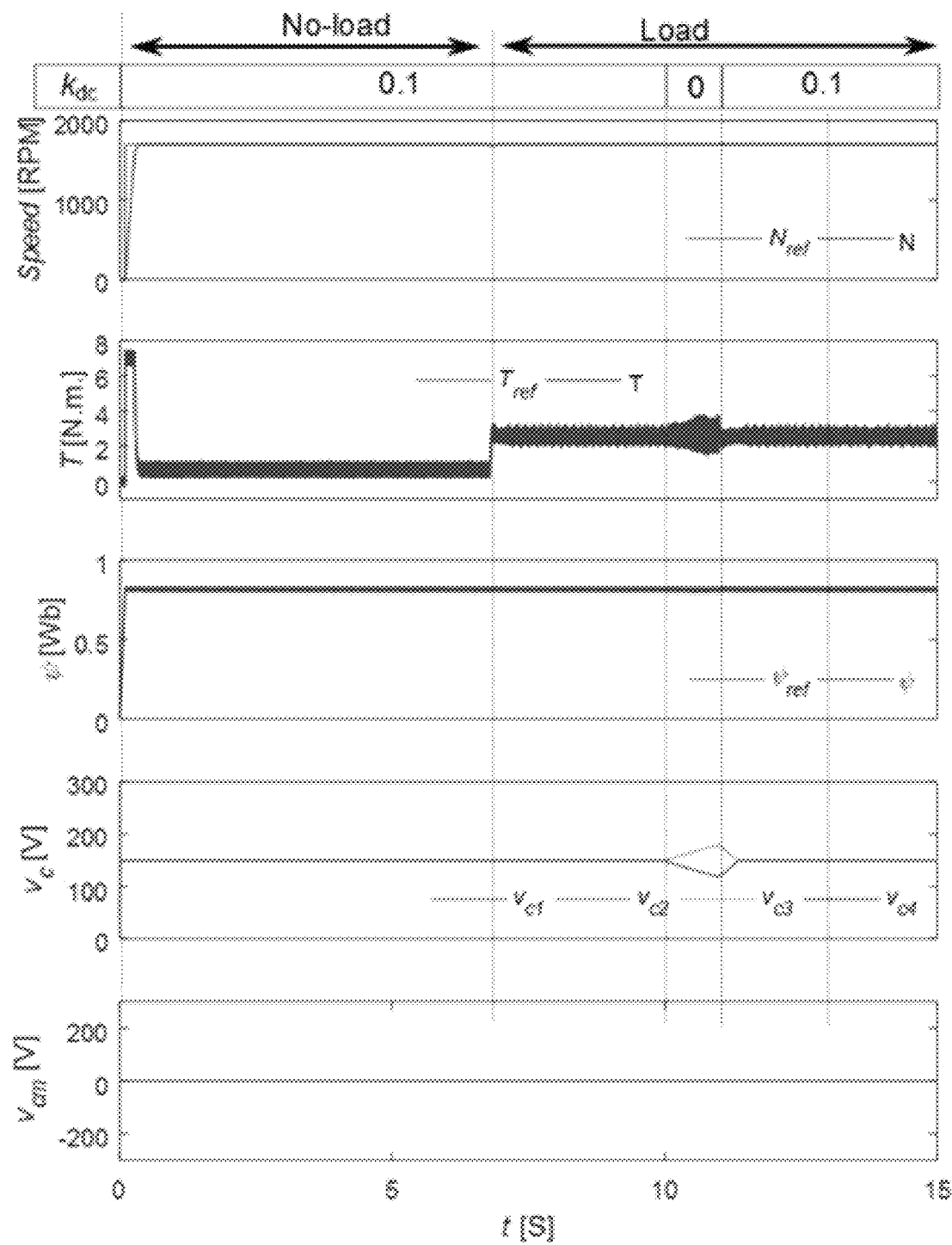
FIG. 16 illustrates a simulated test of the T-type drive system using CMVE, capacitor balancing, and TPC.

From t=10-11 s, $K_{dc}$ is set to zero. During this period, the unbalanced capacitors affect the torque and flux ripples as shown in the simulation of FIG. 16. The corresponding experimental results are shown in FIG. 17.

Figure 17:
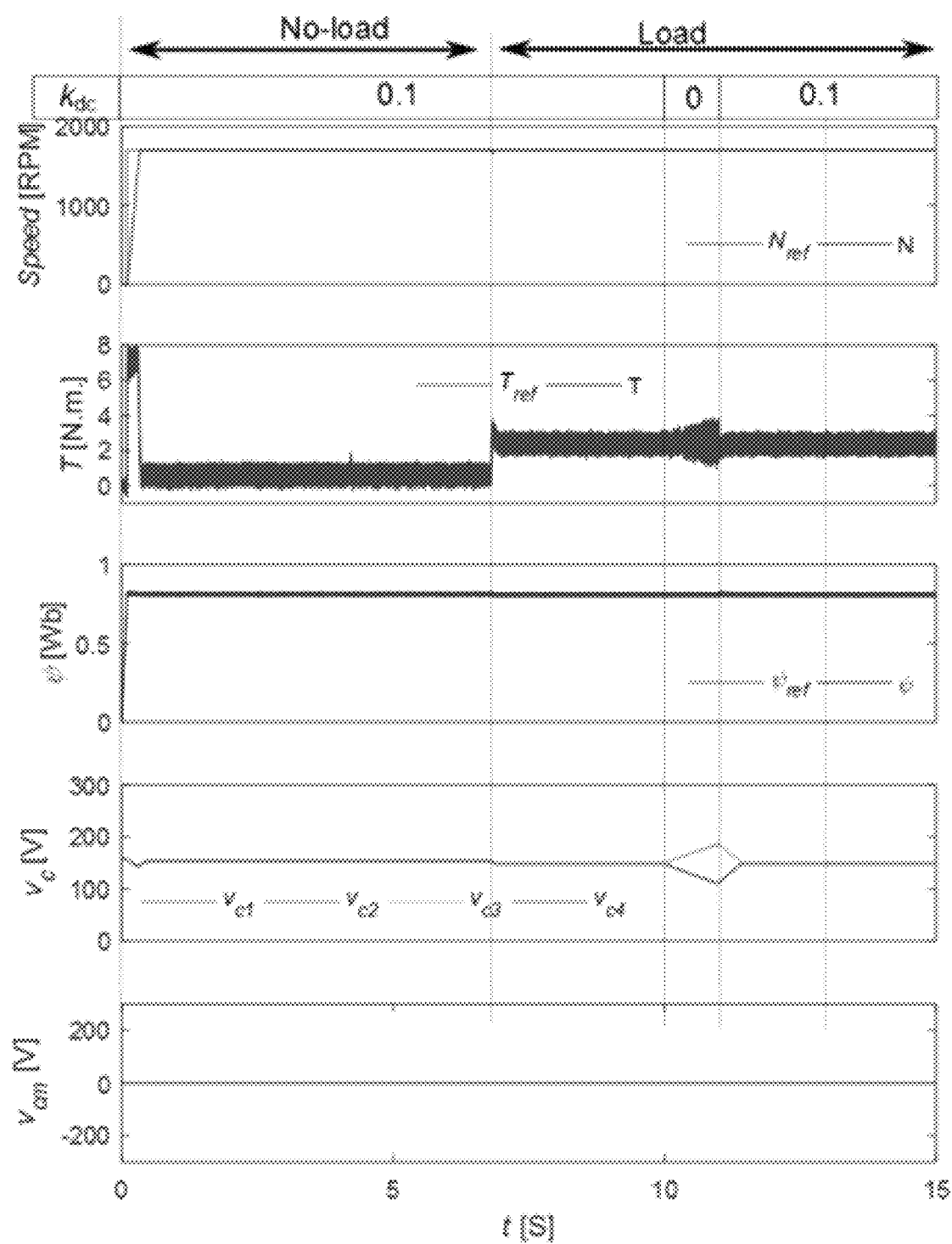
FIG. 17 illustrates an experimental test of the T-type drive system using CMVE, capacitor balancing, and TPC.

In FIG. 17, the capacitor voltage ($V_c$) dips at startup was observed as in the experimental results of FIG. 15. The simulated and experimental tests are in agreement. The CMV value is zero in both tests. The simulated results for torque and flux ripples are 1.017 N.m. and 28 mWb, respectively.

Corresponding experimental results for torque and flux ripples are 1.7 N.m. and 29.3 mWb, respectively. Comparing to the normal operation, the torque and flux ripples increased by 93.7% and 75% for simulated test and increased by 98.8% and 39.5% for experimental test respectively.

A comparison was made between CMVE, CMVR and normal operation (capacitors balanced). Due to the different number of switching states and voltage vectors used in the two procedures and the normal operation, the performance of the T-type drive system differs. A summary for the torque and flux ripples as well as the capacitor voltage deviations is listed in Table VII. The CMVE procedure had higher torque and flux ripples. However, the capacitor voltage deviations of the CMVE case are lower than that of CMVR case.

TABLE VII

SUMMARY FOR THE MACHINE VARIABLES PERFORMANCE FOR THE DIFFERENT EXECUTED TESTS

| Case | $T_{ripples}$ [N.m.] | | $\Psi_{ripples}$ [mWb] | | Cap. deviation [V] | |
|---|---|---|---|---|---|---|
| | Sim | Exp. | Sim | Exp. | Sim | Exp. |
| Normal | 0.525 | 0.861 | 16 | 26 | 0.4 | 1.0 |
| Unbalanced | 1.594 | 1.931 | 44 | 51 | 25.0 | 28.0 |
| CMVR | 0.699 | 1.534 | 18 | 21 | 0.5 | 1.5 |
| CMVE | 1.017 | 1.712 | 28 | 29 | 0.7 | 0.6 |

Figure 18A:
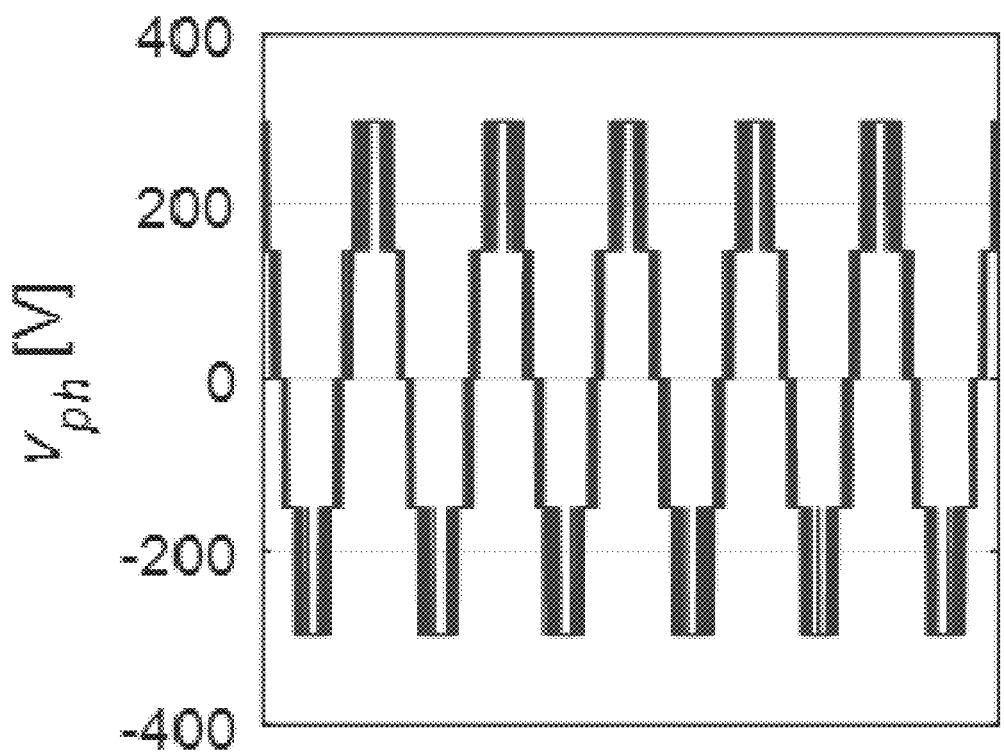
FIGS. 18A-18D illustrate the phase voltage and current during CMVE.
Figure 18B:
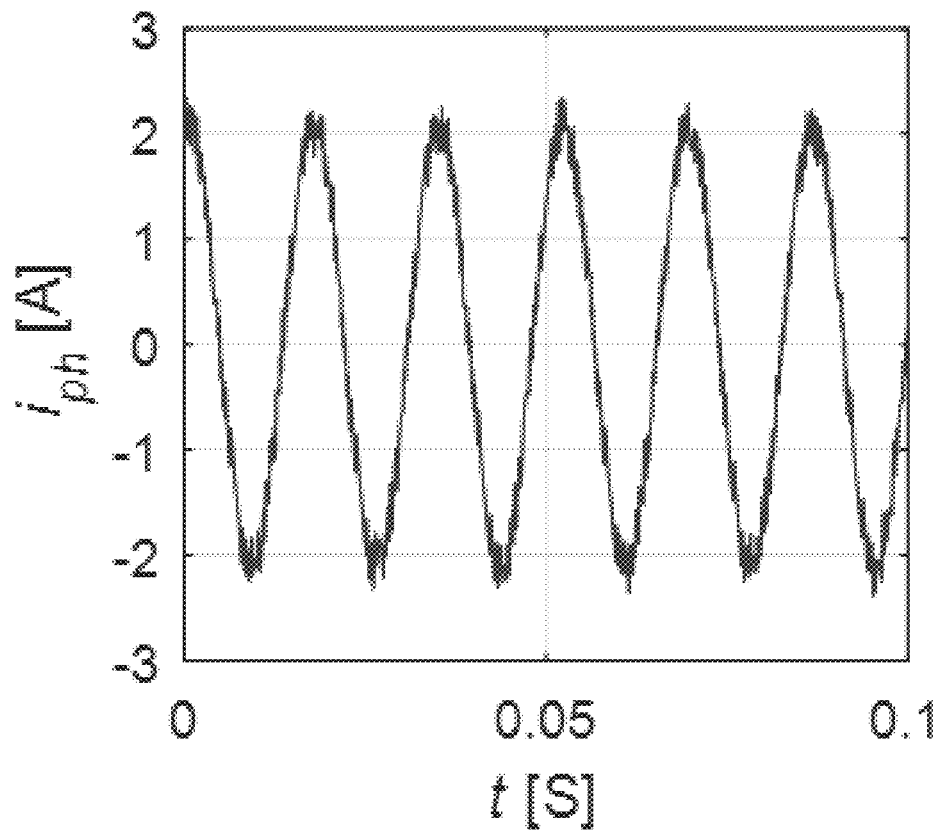
Figure 18C:
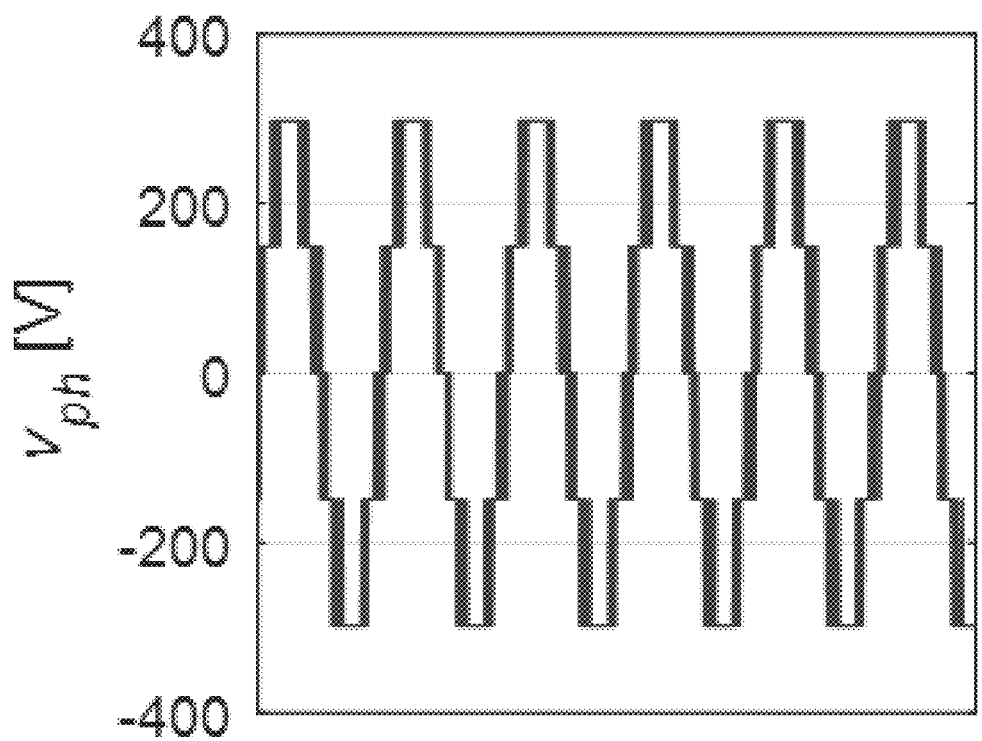
Figure 18D:
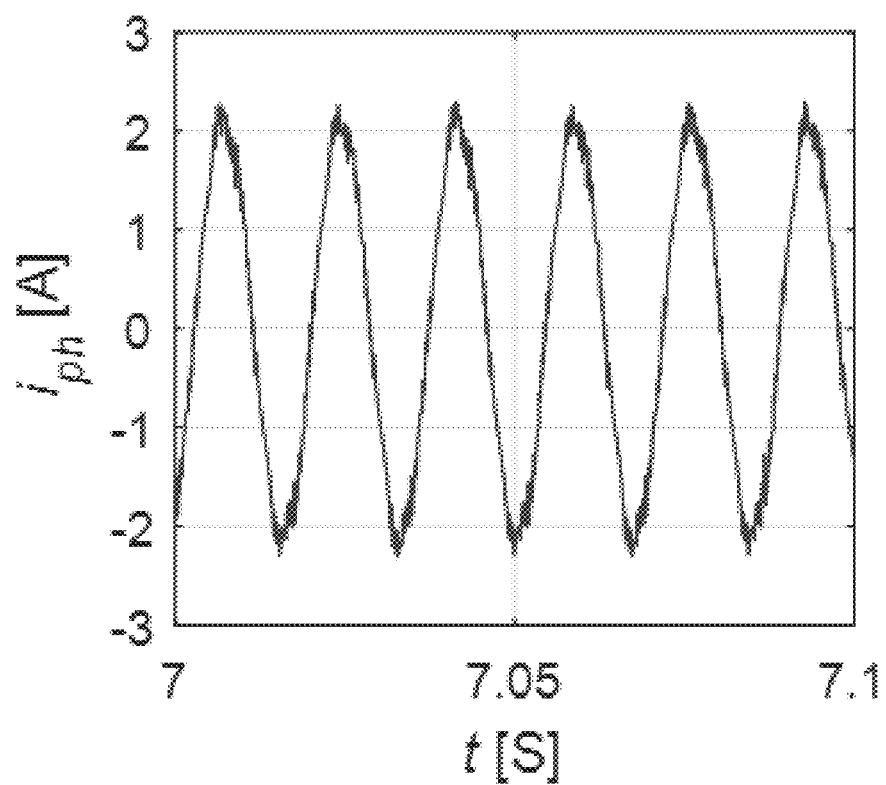
Figure 19A:
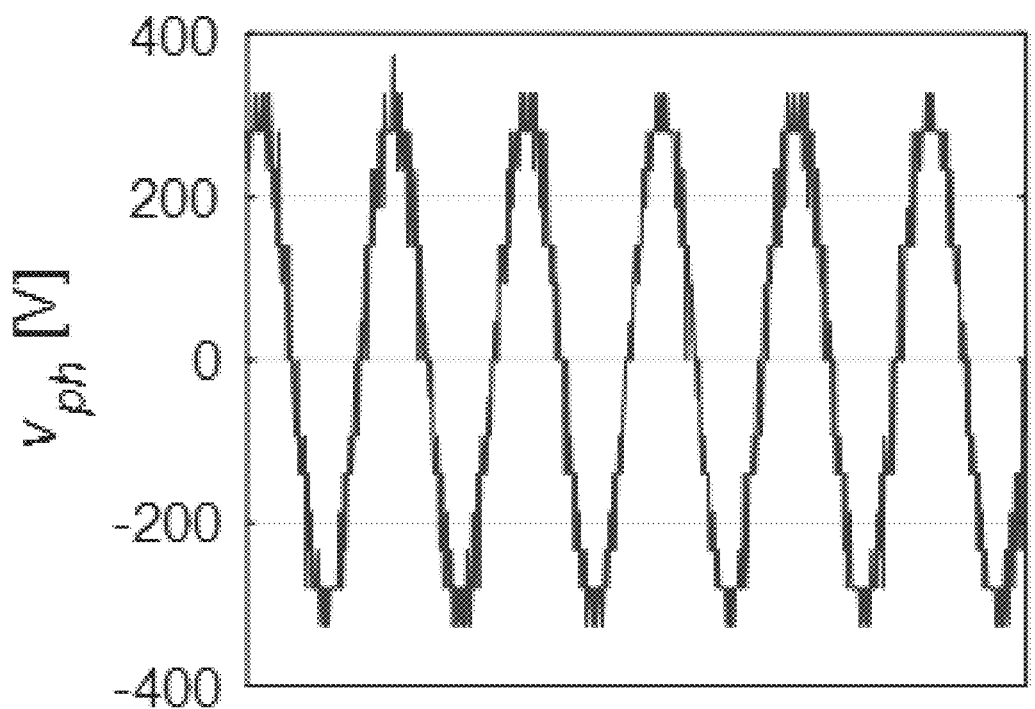
FIGS. 19A-19D illustrate the phase voltage and current during CMVR.
Figure 19B:
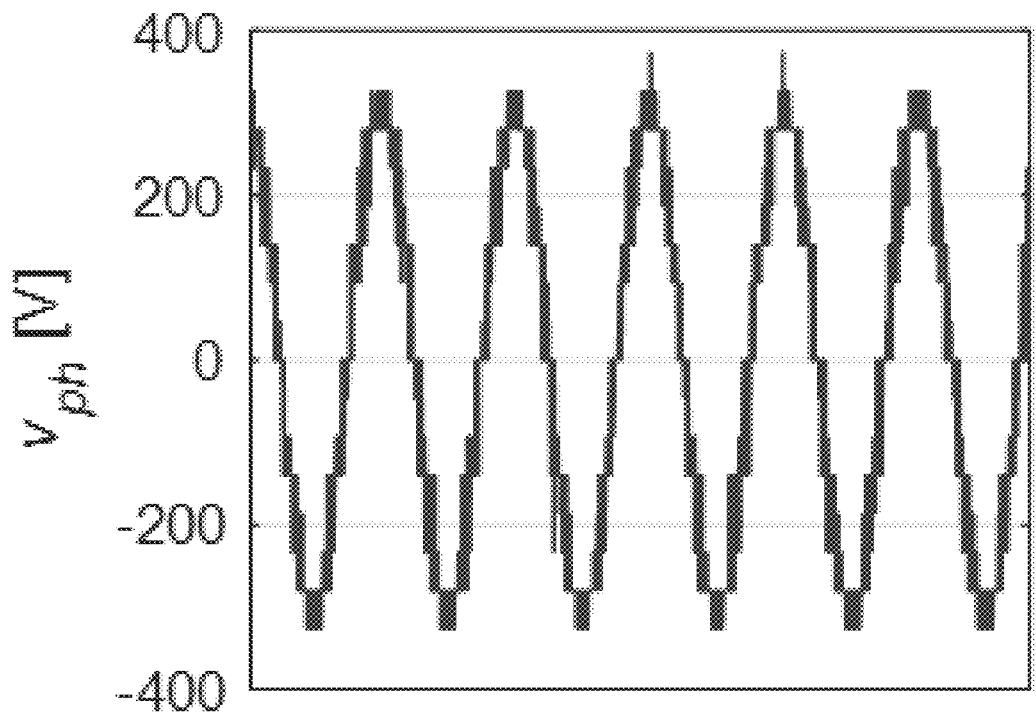
Figure 19C:
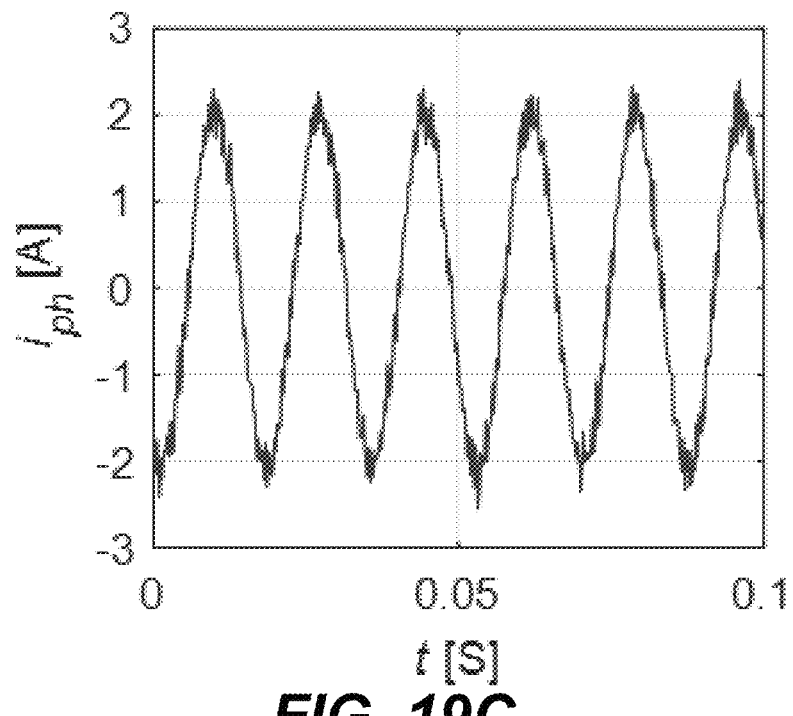
Figure 19D:
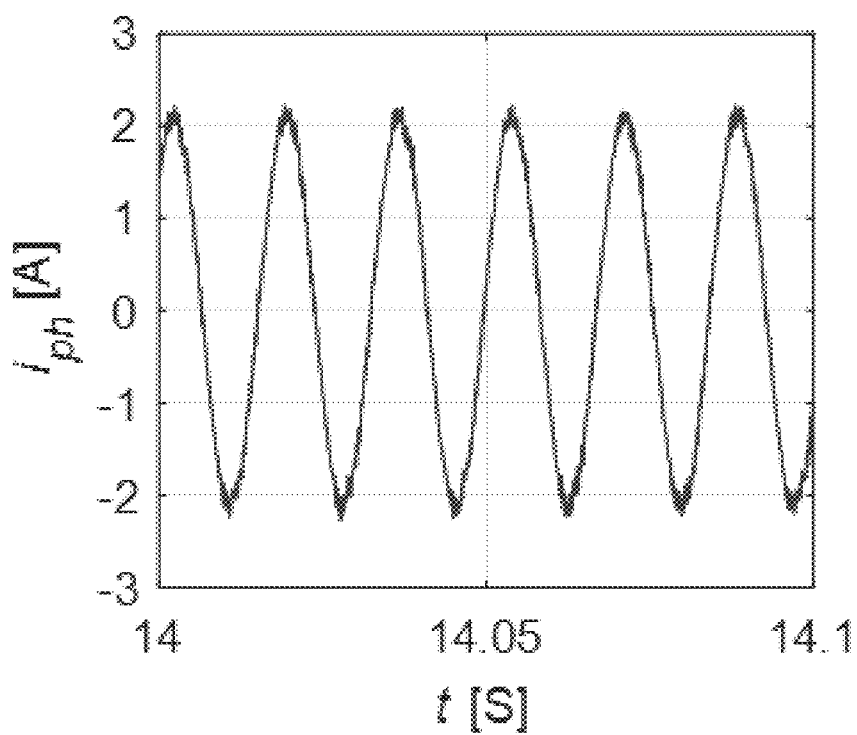
Figure 20A:
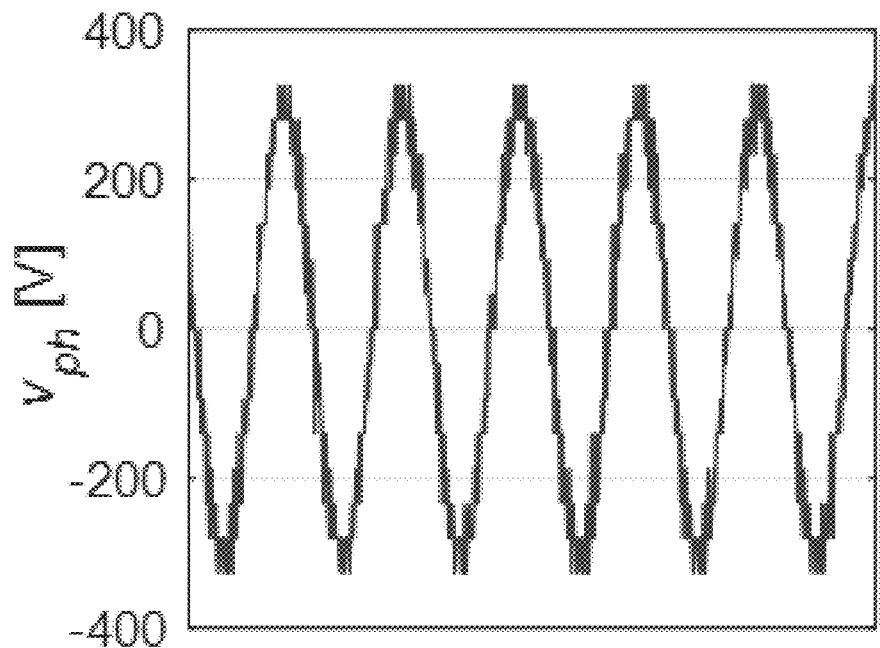
FIGS. 20A-20D illustrate the phase voltage and current during normal operation.
Figure 20B:
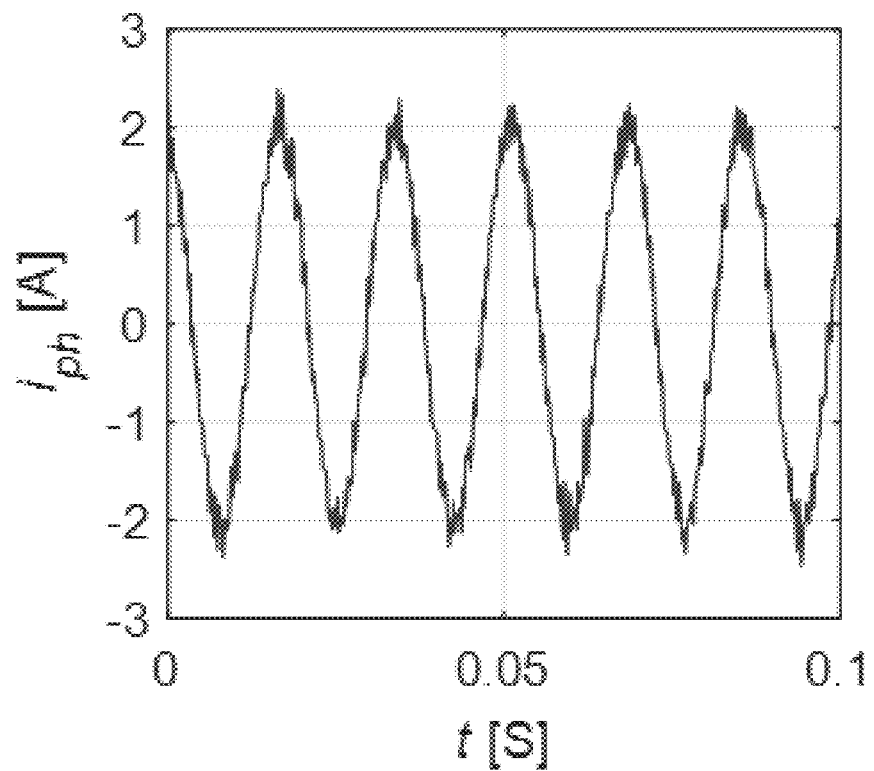
Figure 20C:
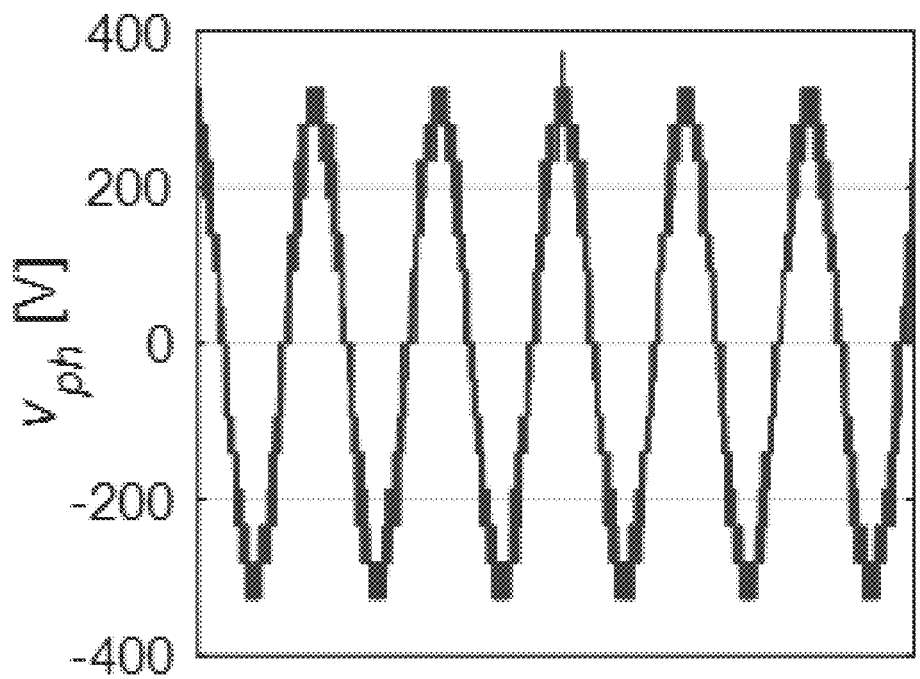
Figure 20D:
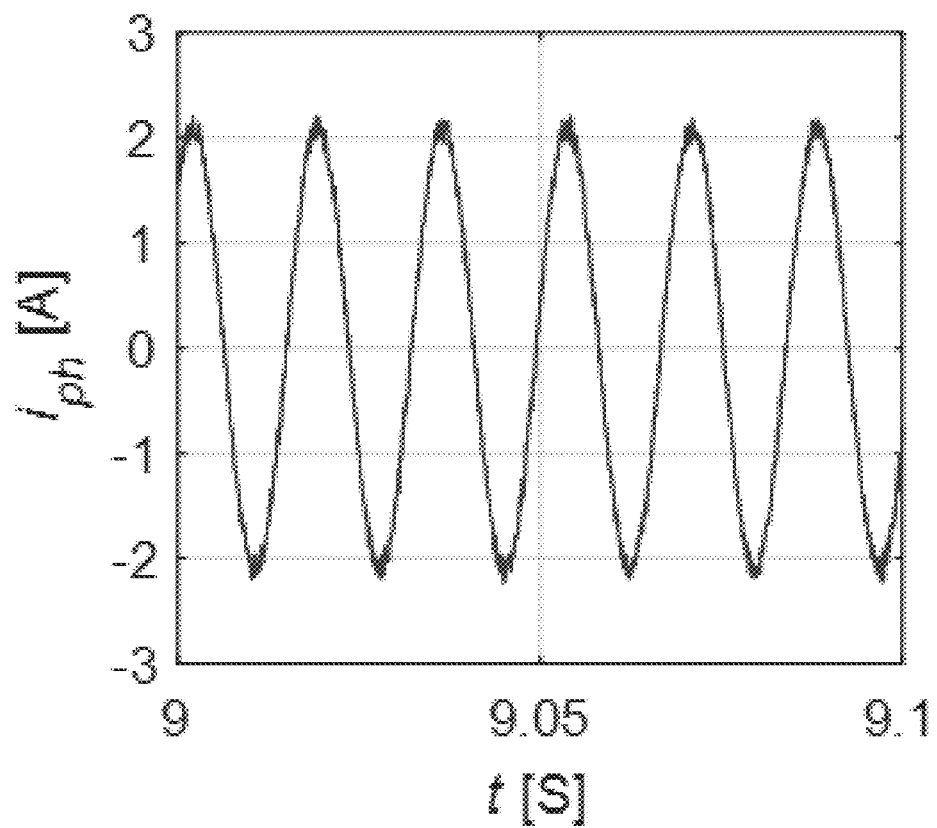

To observe the effect of the CMVR and CMVE on the motor phase voltage and current, a study of the harmonic contents in the phase voltage and current for the two procedures was carried out. The experimental phase voltage and current for procedure 2 (using CMVE) are shown in FIG. 18A and FIG. 18B, and the simulated phase voltage and current for procedure 2 (using CMVE) are shown in FIG. 18C and FIG. 18D. The experimental phase voltage and current for procedure 1 (using CMVR) are shown in FIG. 19A and FIG. 19B, and the simulated phase voltage and current for procedure 2 (using CMVR) are shown in FIG. 19C and FIG. 19D. The experimental phase voltage and current for the normal operation are shown in FIG. 20A and FIG. 20B, and the simulated phase voltage and current for the normal operation are shown in FIG. 20C and FIG. 20D

The voltage shapes for the two procedures are different due to the absence of some voltage vectors in CMVE case. Moreover, the voltage steps are also different due to the higher DC link voltage for the CMVE scenario. Additionally, the absence of the greatest voltage vectors ($d_1$, $d_5$, $d_9$, $d_{13}$, $d_{17}$, and $d_{21}$) decreases the fundamental output voltage in this case. Therefore, an increase in the DC link voltage was required in order to achieve the same loading conditions as the normal and CMVR cases. This is considered one of the drawbacks of the CMVE in AC drive systems.

A summary of the total harmonic distortion factors for phase voltage and current is are listed in Table VIII. It can be concluded that the higher voltage and current harmonic distortions of the CMVE case, compared to other cases, increase the torque and flux ripples. Although the CMVE is preferred in AC drives to reduce the bearing current and increase the machine lifetime, it has the following drawbacks:

1. It utilizes extra DC link voltage that increase the converter switching losses, as the former depends on the DC link voltage level.
2. It delivers extra harmonic contents that increase the machine core losses. (See Salem, Aboubakr, Frederik De Belie, Peter Sergeant, Ahmed Abdallh, and Jan Melkebeek. "Loss evaluation of interior permanent-magnet synchronous Machine drives using T-type multilevel converters." In *Environment and Electrical Engineering (EEEIC)*, 2015 IEEE 15th International Conference on, pp. 101-106. IEEE, 2015; and Rasilo, Paavo, Aboubakr Salem, Ahmed Abdallh, Frederik De Belie, Luc Dupré, and Jan A. Melkebeek. "Effect of multilevel inverter supply on core losses in magnetic materials and electrical machines." *IEEE transactions on Energy Conversion.* Vol. 30, no. 2 (2015):736-744, each incorporated herein by reference in their entirety).
3. It increases the torque and flux ripples.

TABLE VIII

COMPARISON BETWEEN CMVE, CMVR AND NORMAL OPERATION

| | THD$_i$ [%] | | THD$_v$ [%] | |
|---|---|---|---|---|
| Case | Sim | Exp. | Sim. | Exp |
| CMVE | 4.60 | 6.45 | 25.50 | 27.75 |
| CMVR | 2.14 | 2.65 | 18.50 | 19.60 |
| Normal operation | 1.12 | 1.85 | 16.13 | 18.43 |

The reduced switching states MPC of the present disclosure presents a new strategy for capacitor balancing and CMV reduction/elimination for a dual T-type drive system. The reduced switching states MPC controls the machine torque, balances the capacitors and reduces/eliminates the common mode voltage (CMV) of the drive system. Two procedures for CMV reduction/elimination along with balancing the DC link capacitor voltages were presented. The two proposed procedures were based on reduced switching states models of 219 and 115 out of 729 for CMVR and CMVE, respectively. The MPC execution time was reduced to 140 µs and 70 µs, respectively, compared to 5.5 ms for the total of 729 switching states using the 1103-dSPACE digital controller. The results show the effectiveness of both procedures to balance the capacitors. The results of using the CMVR procedure showed lower torque and flux ripples as compared to using the CMVE procedure. In addition, the voltage and current harmonic distortions of the CMVE procedure are higher than that for the CMVR procedure. The higher DC link voltage required for the CMVE procedure increased the converter switching losses as well. Therefore, it can be concluded that the 219 switching states of the CMVR had an overall greater effect on the machine performance, harmonic contents, and switching losses.

The first embodiment is illustrated with respect to FIGS. 1-7 and 21. The first embodiment describes a method for reducing computation time for model predictive control (MPC) generation of drive signals for a 5 level dual T-type multilevel converter 100 connected to a three-phase open ends induction motor (OEIM) 130, each multilevel converter (112, 122) including two DC link capacitors (C$_1$ and C$_2$ or C$_3$ and C$_4$) and a plurality of plurality of silicon carbide (SiC) MOSFET semiconductor switches Q$_{1x}$, Q$_{2x}$, Q$_{3x}$, Q$_{4x}$, or Q$_{1x'}$, Q$_{2x'}$, Q$_{3x'}$, Q$_{4x'}$, x=a, b and c), comprising determining a set of switching states of the plurality of (SiC) MOSFET semiconductor switches, identifying a reduced set of switching states from the set of switching states, storing the reduced set, calculating a first set of cost functions which include motor fluxes, motor torques, common mode voltage and capacitor voltages for each switching state of the reduced set of switching states, summing the first set of cost functions to generate a first set of summed cost functions, minimizing the first set of summed cost functions, identifying a voltage vector which minimizes the first set of summed cost functions, generating a plurality of gating signals for the plurality of silicon carbide semiconductor switches using the voltage vector, applying the plurality of gating signals to the plurality of SiC semiconductor switches to operate the OEIM with decreased motor flux ripples, decreased motor torque ripples and balanced capacitor voltages, wherein calculating the first set of cost functions with the reduced set of switching states reduces the computation time for model predictive control of the converter switches.

As shown in FIG. 5A, a first alternative of the method for selecting the reduced set of switching states includes determining a voltage imbalance between the capacitors of each multilevel converter, determining an effect of each switching state on the voltage imbalance between the capacitors and selecting the reduced set of switching functions from 219 switching states which have the greatest effect on the voltage imbalance.

The first alternative further comprises receiving a rated torque value, T$_{rated}$, a reference torque value, T$^{ref}$, a rated stator flux value, $\|\psi_{s\_rated}\|$, and a reference stator flux value, $\psi_s^{ref}$, receiving a first flux weighting factor K$_\psi$, receiving a first capacitor voltage weighting factor K$_{dc}$, receiving a first CMV weighting factor K$_{cm}|v_{CM}|$, estimating (S543) a first torque value of the OEIM; estimating a first flux value of the OEIM; predicting a first value for flux of the OEIM; predicting a first value for torque of the OEIM; measuring a first set of capacitor voltages; predicting a common mode value (CMV) value based on the capacitor voltages; evaluating (S544) the first set of cost functions for each of the 219 switching states based on:

$$J_1 = \frac{|T^{ref} - T^{k+2}|}{T_{rated}} + K_\psi \frac{|\,\|\psi_s^{ref}\| - \|\psi_s^{k+2}\|\,|}{\|\psi_s\|_{rated}}$$

$$J_2 = K_{dc}(|v_{C1}^{k+1} - v_{C2}^{k+1}| + |v_{C3}^{k+1} - v_{C4}^{k+1}|)$$

$$J_3 = K_{cm}|v_{CM}|$$

where k+1 and k+2 are successive counter indices and v$_{C1}$-v$_{C4}$ are the voltages of the capacitors of the converter. If the value of k is less than or equal to 219, the process returns to S543 to calculate the next set of cost functions. If the value of k is greater than 219, the process proceeds to step S547.

The first alternative of the method further comprises identifying the voltage vector (V$_{opt-1}$) which minimizes the first cost function (Step S547) based on V$_{opt}$=arg min$_{\{V_1 \ldots V_{219}\}}$J(V$_s^{k+1}$), where V$_s^{k+1}$ is the voltage across a stator of the OEIM at a sampling time interval k+1.

The first alternative of the method further comprises monitoring the performance of the converter by estimating a second torque value and a second flux value of the OEIM, predicting a first torque deviation and a first flux deviation, subtracting the second torque value and the second flux value from the reference torque value and the reference stator flux value respectively to generate second torque and second flux deviations, evaluating a second set of cost functions and identifying a switching state which minimizes the second set of cost functions, generating the plurality of gating signals by using the switching state that minimizes the second set of cost functions, and applying the plurality of gating signals to the SiC semiconductor switches to actuate the OEIM, reduce the common mode voltage, balance the capacitor voltages and reduce the torque and flux ripples, measuring a second set of capacitor voltages subsequent to applying the gating signals, determining a capacitor voltage deviation between the first set of voltages and the second set of voltages, comparing the capacitor voltage deviation to a capacitor voltage deviation threshold, applying the capacitor voltage weighting factor $K_{dc}$ and the CMV weighting factor $K_{cm}$ if the capacitor voltage deviation is above the capacitor voltage deviation threshold.

In a second alternative of the method for selecting the reduced set of switching states, the method comprises measuring a first set of capacitor voltages, predicting a common mode value (CMV) value based on the capacitor voltages, determining a first voltage imbalance ($\Delta V_c$) between the capacitors of a first multilevel converter, determining a second voltage imbalance ($\Delta V'_c$) between the capacitors of a second multilevel converter, determining an effect of each switching state on the first and second voltage imbalances, and identifying and storing a reduced set of 115 switching states which have zero effect on a common mode voltage and a large effect on the first and second voltage imbalances, receiving a rated torque value, $T_{rated}$, a reference torque value, $T^{ref}$, a rated stator flux value, $\|\psi_{s\_rated}\|$, and a reference stator flux value, $\psi_s^{ref}$, receiving a flux weighting factor $K_\psi$, receiving a first capacitor voltage weighting factor $K_{dc}$, estimating a first torque value of the OEIM, estimating a first flux value of the OEIM, measuring a first set of capacitor voltages, evaluating the first set of cost functions for each of the 115 switching states based on:

$$J_1 = \frac{|T^{ref} - T^{k+2}|}{T_{rated}} + K_\psi \frac{|\|\psi_s^{ref}\| - \|\psi_s^{k+2}\||}{\|\psi_s\|_{rated}}$$

$$J_2 = K_{dc}(|v_{C1}^{k+1} - v_{C2}^{k+1}| + |v_{C3}^{k+1} - v_{C4}^{k+1}|)$$

where k+1 and k+2 are successive sampling time intervals and $v_{C1}$-$v_{C4}$ are the voltages of the capacitors of the converter, and identifying the voltage vector ($V_{opt-1}$) which minimizes the first cost function based on $V_{opt}$=arg $\min_{\{V_1 \ldots V_{115}\}} J(V_s^{k+1})$ where $V_s^{k+1}$ is the voltage across a stator of the OEIM at a sampling time interval k+1.

The second alternative of the method comprises monitoring the performance of the OEIM by estimating a second torque value and a second flux value of the OEIM, predicting a first torque deviation and a first flux deviation, subtracting the second torque value and the second flux value from the reference torque value and the reference stator flux value respectively to generate a second torque deviation and a second flux deviation, evaluating a second set of cost functions and identifying the switching state that minimizes the second set of cost functions, generating a plurality of gating signals by using the switching state that minimizes the second set of cost functions, and applying the gating signals to the switches to actuate the OEIM, reduce the common mode voltage, balance the capacitor voltages and reduce the torque and flux ripples, measuring a second set of capacitor voltages subsequent to applying the gating signals, determining a capacitor voltage deviation between the first set of voltages and the second set of voltages, comparing the capacitor voltage deviation to a capacitor voltage deviation threshold.

The second embodiment is illustrated with respect to FIG. 1-7 and FIG. 21. The second embodiment describes a system for reducing computation time for model predictive control (MPC) of a 5 level dual T-type multilevel converter 100 connected to a three-phase open ends induction motor (OEIM) 130 having first, second and third parallel phase paths ($130_A$, $130_B$, $130_C$, FIG. 1) connected between a first end and a second end, comprising a first three-level T-type 112 converter connected to the first end of the OEIM and a second three-level T-type converter 122 connected to the second end of the OEIM, a first voltage source block 114 connected to the first converter and a second voltage source block 124 connected to the second converter, each voltage source block including a first capacitor in series with a second capacitor ($C_1$, $C_2$ or $C_3$, $C_4$), wherein each voltage source block has a positive connector (P), a negative connector (N) and a common connector (O), wherein each three-level T-type converter includes first, second and third phase legs (a, b, c, FIG. 1), including first ($Q_{4x}$) and second series connected switches ($Q_{2x}$), wherein the first switch is connected to the common connector and the second switch is connected to a terminal of one of the phase paths (A, for example), a third switch ($Q_{3x}$) connected between the positive connector and the terminal of the one of the phase paths and a fourth switch ($Q_{1x}$) connected to the negative connector and the terminal (A) of the one of the phase paths, wherein each switch is an SiC MOSFET semiconductor switch in parallel with a diode, wherein the diodes of the first and second series connected switches are antiparallel to each other, and wherein the diodes of the third and fourth switches are parallel to each other, a plurality of sensors (M1-M6, FIG. 6) configured for measuring system parameters, and a control system 650 having circuitry connected to the switches of each three-level T-type converter and the plurality of sensors, the control system having circuitry and program instructions stored within that, when executed by one or more processors, cause the one or more processors to determine a reduced set of switching states which lower the computation time for model predictive control of the converter switches.

The program instructions are configured to determine a set of switching states of the plurality of silicon carbide (SiC) semiconductor switches, select the reduced set of switching states from the set of switching states, calculate a set of cost functions which include motor fluxes, motor torques, common mode voltage and capacitor voltages for each switching state of the reduced set of switching states, sum the set of cost functions to generate a first set of summed cost functions, minimize the first set of summed cost functions, identify a voltage vector which minimizes the first set of summed cost functions, generate a plurality of gating signals for the plurality of silicon carbide semiconductor switches using the voltage vector, apply the plurality of gating signals to the plurality of SiC semiconductor switches to operate the OEIM with reduced motor flux ripples, motor torque ripples and balanced capacitor voltages, wherein calculating the set of cost functions with the reduced set of switching states reduces the computation time for model predictive control of the converter switches.

The system further comprises wherein the plurality of sensors include a plurality of voltage transducers configured to measure voltages of the capacitors (M1-M4), an encoder (M6) configured to measure a rotor speed of a shaft of the OEIM, and a plurality of current transducers (M5) configured to measure current in each of the phase paths.

The control system is illustrated in FIG. 4, 7 and FIGS. 21-23 and further comprises an input/output port (2112, FIG. 21) configured for receiving a rated torque value, $T_{rated}$, a rated stator flux value, $\|\psi_{s\_rated}\|$, and a reference stator flux value, $\psi_s^{ref}$, a flux weighting factor $K_\psi$, a capacitor voltage weighting factor $K_{dc}$ and a common mode voltage (CMV) weighting factor $K_{cm}$, an adder 456 operatively connected to the input/output port and the encoder, the adder configured to subtract the rotor speed from the reference stator flux value and generate a difference stator flux value, a proportional integral derivative (PID) controller 454 connected to the adder and configured to receive the difference stator flux value and generate a reference torque value, $T^{ref}$, a computer processing unit (CPU) 452 configured to execute the program instructions to generate the gating signals based on the flux weighting factor ($K_\psi$), the reference torque value, $T^{ref}$, the angular speed, the current in each of the phase paths and the voltages of the capacitors ($C_1$, $C_2$, $C_3$ and $C_4$).

In a first alternative of the system, the CPU further comprises program instructions configured to determine a voltage imbalance between the capacitors of each multilevel converter, determine an effect of each switching state on the voltage imbalance between the capacitors, identify and store the reduced set from a set of 219 switching states which have the greatest effect on the voltage imbalance, estimate a first torque value and a first flux value of the OEIM from the current measurements, predict a first torque value and a first flux value of the OEIM, measure a first set of capacitor voltages, evaluate the set of cost functions ($J_1$, $J_2$ and $J_3$) for each of the 219 switching states based on:

$$J_1 = \frac{|T^{ref} - T^{k+2}|}{T_{rated}} + K_\psi \frac{|\|\psi_s^{ref}\| - \|\psi_s^{k+2}\||}{\|\psi_s\|_{rated}}$$

$$J_2 = K_{dc}(|v_{C1}^{k+1} - v_{C2}^{k+1}| + |v_{C3}^{k+1} - v_{C4}^{k+1}|)$$

$$J_3 = K_{cm}|v_{CM}|$$

where k+1 and k+2 are successive sampling time intervals and $v_{C1}$-$v_{C4}$ are the voltages of the capacitors of the converter, identify the voltage vector ($V_{opt-1}$) which minimizes the first set of summed cost functions based on $V_{opt}$=arg min$_{\{V_1 \ldots V_{219}\}} J(V_s^{k+1})$, where $V_s^{k+1}$ is the voltage across a stator of the OEIM at a sampling time interval k+1.

In the first alternative of the system, the CPU further comprises program instructions configured to determine a first voltage imbalance $\Delta V_c$ between the capacitors of a first multilevel converter, determine a second voltage imbalance $\Delta V'_c$ between the capacitors of a second multilevel converter, determine an effect of each switching state on the voltage imbalances $\Delta V_c$ and $\Delta V'_c$, select the reduced set of switching functions by determining a set of 115 switching states which have zero effect on the common mode voltage, estimate a first torque value of the OEIM, estimate a first flux value of the OEIM, predict a first value for torque of OEIM, predict a first value for flux of OEIM, measure a first set of capacitor voltages, evaluate the set of cost functions for each of the 115 switching states based on:

$$J_1 = \frac{|T^{ref} - T^{k+2}|}{T_{rated}} + K_\psi \frac{|\|\psi_s^{ref}\| - \|\psi_s^{k+2}\||}{\|\psi_s\|_{rated}}$$

$$J_2 = K_{dc}(|v_{C1}^{k+1} - v_{C2}^{k+1}| + |v_{C3}^{k+1} - v_{C4}^{k+1}|)$$

where k+1 and k+2 are successive sampling time intervals and $v_{C1}$-$v_{C4}$ are the voltages of the capacitors of the converter, identify the voltage vector ($V_{opt-1}$) which minimizes the first cost function based on $V_{opt}$=arg min$_{\{V_1 \ldots V_{115}\}} J(V_s^{k+1})$, where $V_s^{k+1}$ is the voltage across a stator of the OEIM at a sampling time interval k+1.

The third embodiment is illustrated with respect to FIG. 1-7. The third embodiment describes a non-transitory computer readable medium having instructions stored therein that, when executed by one or more processors, cause the one or more processors to perform a method for reducing computation time for model predictive control (MPC) of a 5 level dual T-type multilevel converter connected to a three-phase open ends induction motor (OEIM), each multilevel converter including two capacitors and a plurality of plurality of silicon carbide (SiC) MOSFET semiconductor switches, comprising determining a set of switching states of the plurality of switches, selecting a reduced set of switching states from the set of switching states, calculating a set of cost functions which include motor fluxes, motor torques, common mode voltage and capacitor voltages for each switching state of the reduced set of switching states, summing the set of cost functions to generate a first set of summed cost functions, minimizing the first set of summed cost functions, identifying a voltage vector which minimizes the first set of summed cost functions, generating a plurality of gating signals for the plurality of silicon carbide semiconductor switches using the voltage vector, applying the plurality of gating signals to the plurality of SiC semiconductor switches to operate the OEIM with reduced motor flux ripples, motor torque ripples and balanced capacitor voltages, wherein calculating the set of cost functions with the reduced set of switching states decreases the computation time for model predictive control of the converter switches.

The non-transitory computer readable medium method further comprises a first alternative for selecting the reduced set of switching states, including determining a voltage imbalance between the capacitors of each multilevel converter, determining an effect of each switching state on the voltage imbalance between the capacitors, and storing the reduced set of switching functions from 219 switching states which have the highest effect on the voltage imbalance.

The non-transitory computer readable medium method further comprises a second alternative for selecting the reduced set of switching states, including determining a first voltage imbalance between the capacitors of a first multilevel converter, determining a second voltage imbalance between the capacitors of a second multilevel converter, determining an effect of each switching state on the voltage imbalances, and selecting the reduced set from a set of 115 switching states which have zero effect on the common mode voltage and a large effect on the first and second voltage imbalances of the capacitors.

Applications of the methods and system of the present disclosure may be applied to drive an OEIM connected to a motor shaft using battery power, DC power, AC power with a transformer, etc., such as an electric vehicle, or industrial machinery such as punch presses, bulldozers, fans, blowers, pumps and die stamping machines or the like. Induction motors are widely employed in the electrical field and about 90% of industry machines use induction motors. A large decrease in the control time from 5.5 ms to 140 µs for the CMVR procedure and to 70 µs for the CMVE procedure was demonstrated. Stabilization of the torque, flux and capacitor balance may have beneficial effects on the converter and OEIM lifetimes and a decrease in power losses.

Figure 21:
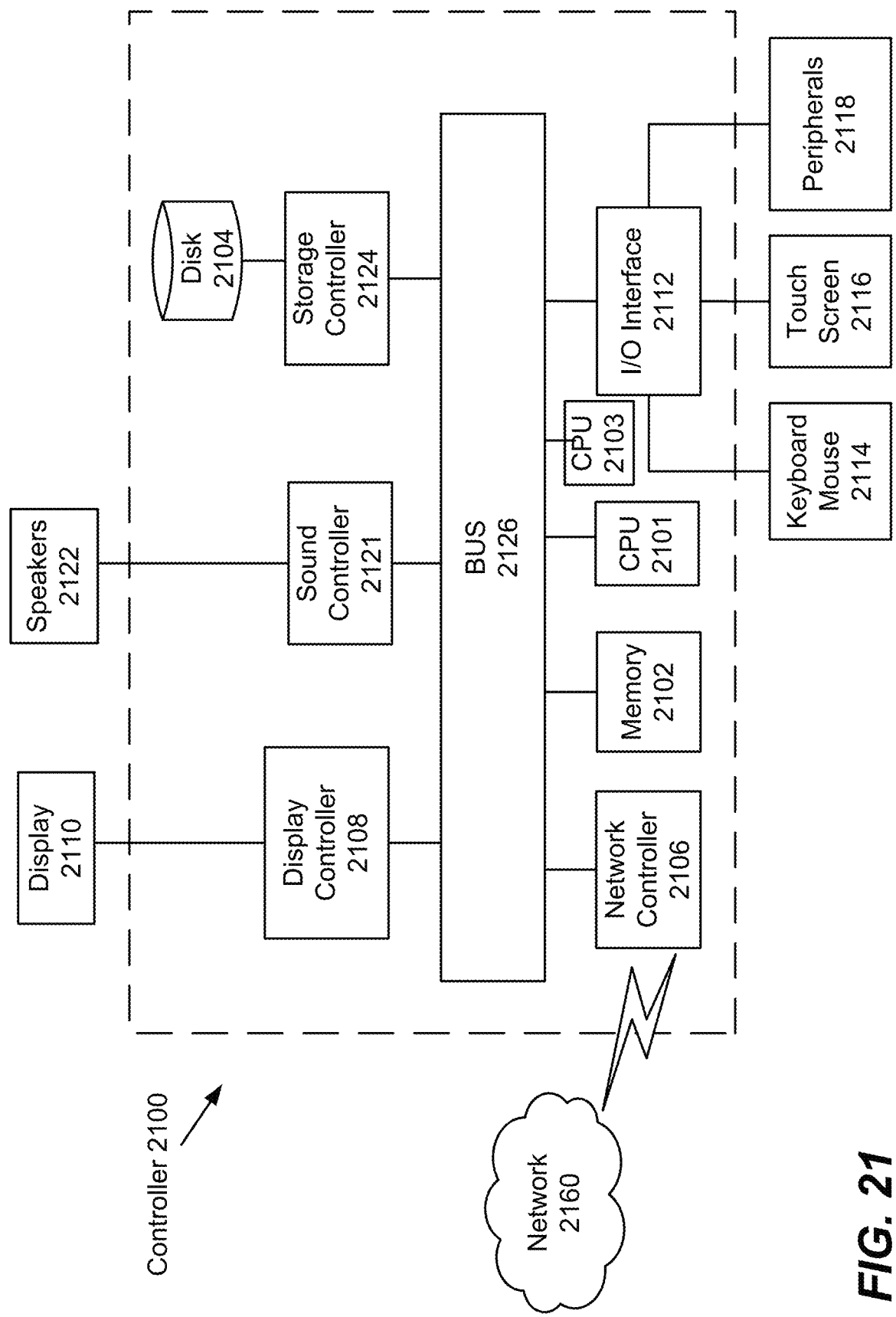
FIG. 21 is an illustration of a non-limiting example of details of computing hardware used in the computing system, according to certain embodiments.

Next, further details of the hardware description of the computing environment of the control system (450, 750) of FIG. 4 and FIG. 7 according to exemplary embodiments is described with reference to FIG. 21-FIG. 24. In FIG. 21, a controller 2100 is described which is representative of the controlling circuits shown in FIGS. 4 and 7 used to implement the simulation and experimental testing of the present disclosure. The controller is a computing device which includes a CPU 2101 which performs the processes described above/below. The process data and instructions may be stored in memory 2102. These processes and instructions may also be stored on a storage medium disk 2104 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 2101, 2103 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 2101 or CPU 2103 may be a Xenon or Core processor from Intel of America or an Opteron processor from AMD of America, or may be other processor types that would be recognized by one of ordinary skill in the art. Alternatively, the CPU 2101, 2103 may be implemented on an FPGA, ASIC, PLD or using discrete logic circuits, as one of ordinary skill in the art would recognize. Further, CPU 2101, 2103 may be implemented as multiple processors cooperatively working in parallel to perform the instructions of the inventive processes described above.

The computing device in FIG. 21 also includes a network controller 2106, such as an Intel Ethernet PRO network interface card from Intel Corporation of America, for interfacing with network 2160. As can be appreciated, the network 2160 can be a public network, such as the Internet, or a private network such as an LAN or WAN network, or any combination thereof and can also include PSTN or ISDN sub-networks. The network 2160 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 2108, such as a NVIDIA GeForce GTX or Quadro graphics adaptor from NVIDIA Corporation of America for interfacing with display 2110, such as a Hewlett Packard HPL2445w LCD monitor. A general purpose I/O interface 2112 interfaces with a keyboard and/or mouse 2114 as well as a touch screen panel 2116 on or separate from display 2110. General purpose I/O interface also connects to a variety of peripherals 2118 including printers and scanners, such as an OfficeJet or DeskJet from Hewlett Packard.

A sound controller 2120 is also provided in the computing device such as Sound Blaster X-Fi Titanium from Creative, to interface with speakers/microphone 2122 thereby providing sounds and/or music.

The general purpose storage controller 2124 connects the storage medium disk 2104 with communication bus 2126, which may be an ISA, EISA, VESA, PCI, or similar, for interconnecting all of the components of the computing device. A description of the general features and functionality of the display 2110, keyboard and/or mouse 2114, as well as the display controller 2108, storage controller 2124, network controller 2106, sound controller 2120, and general purpose I/O interface 2112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 22.

Figure 22:
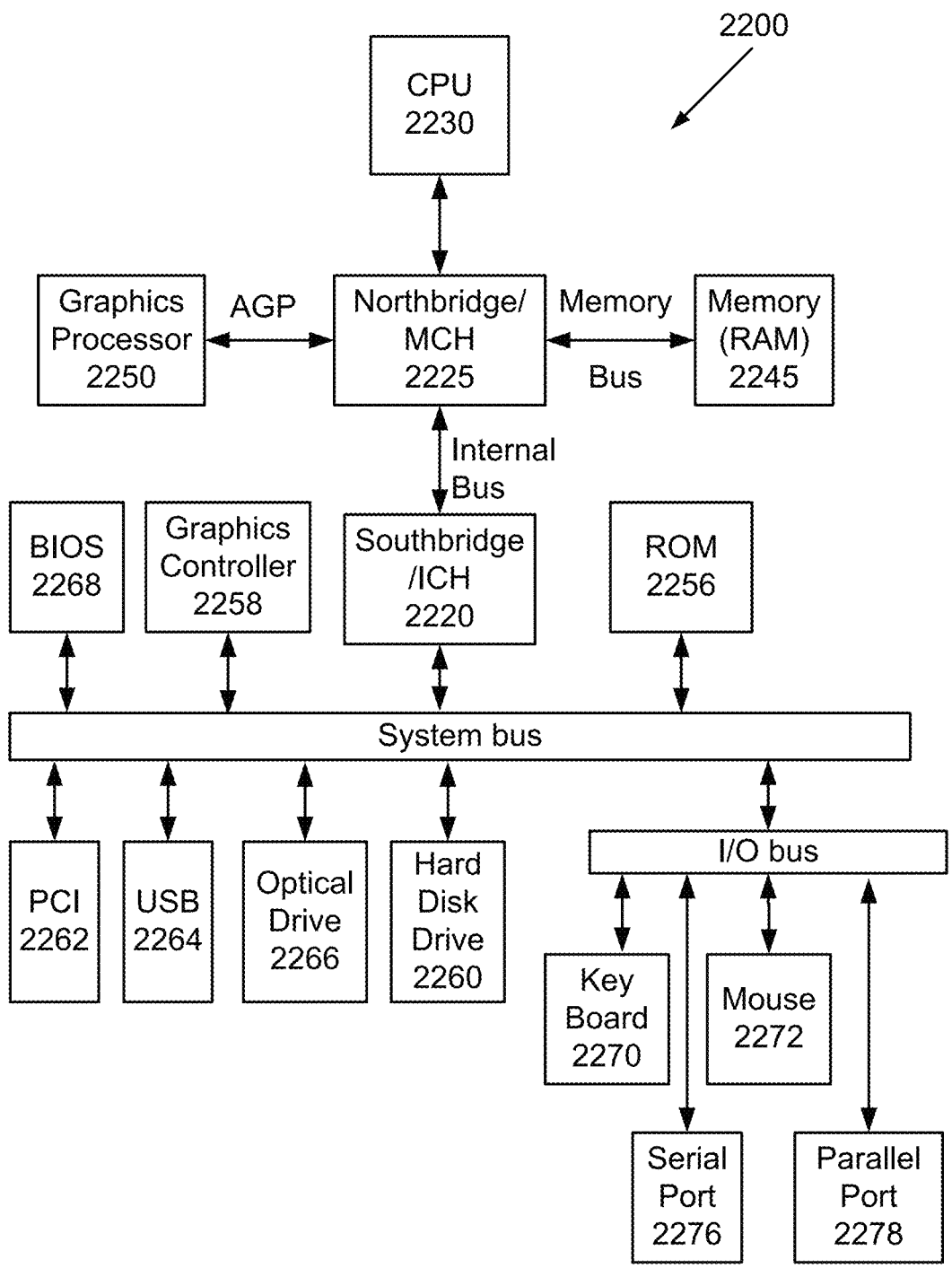
FIG. 22 is an exemplary schematic diagram of a data processing system used within the computing system, according to certain embodiments.

FIG. 22 shows a schematic diagram of a data processing system, according to certain embodiments, for performing the functions of the exemplary embodiments. The data processing system is an example of a computer in which code or instructions implementing the processes of the illustrative embodiments may be located.

In FIG. 22, data processing system 2200 employs a hub architecture including a north bridge and memory controller hub (NB/MCH) 2225 and a south bridge and input/output (I/O) controller hub (SB/ICH) 2220. The central processing unit (CPU) 2230 is connected to NB/MCH 2225. The NB/MCH 2225 also connects to the memory 2245 via a memory bus, and connects to the graphics processor 2250 via an accelerated graphics port (AGP). The NB/MCH 2225 also connects to the SB/ICH 2220 via an internal bus (e.g., a unified media interface or a direct media interface). The CPU Processing unit 2230 may contain one or more processors and even may be implemented using one or more heterogeneous processor systems.

Figure 23:
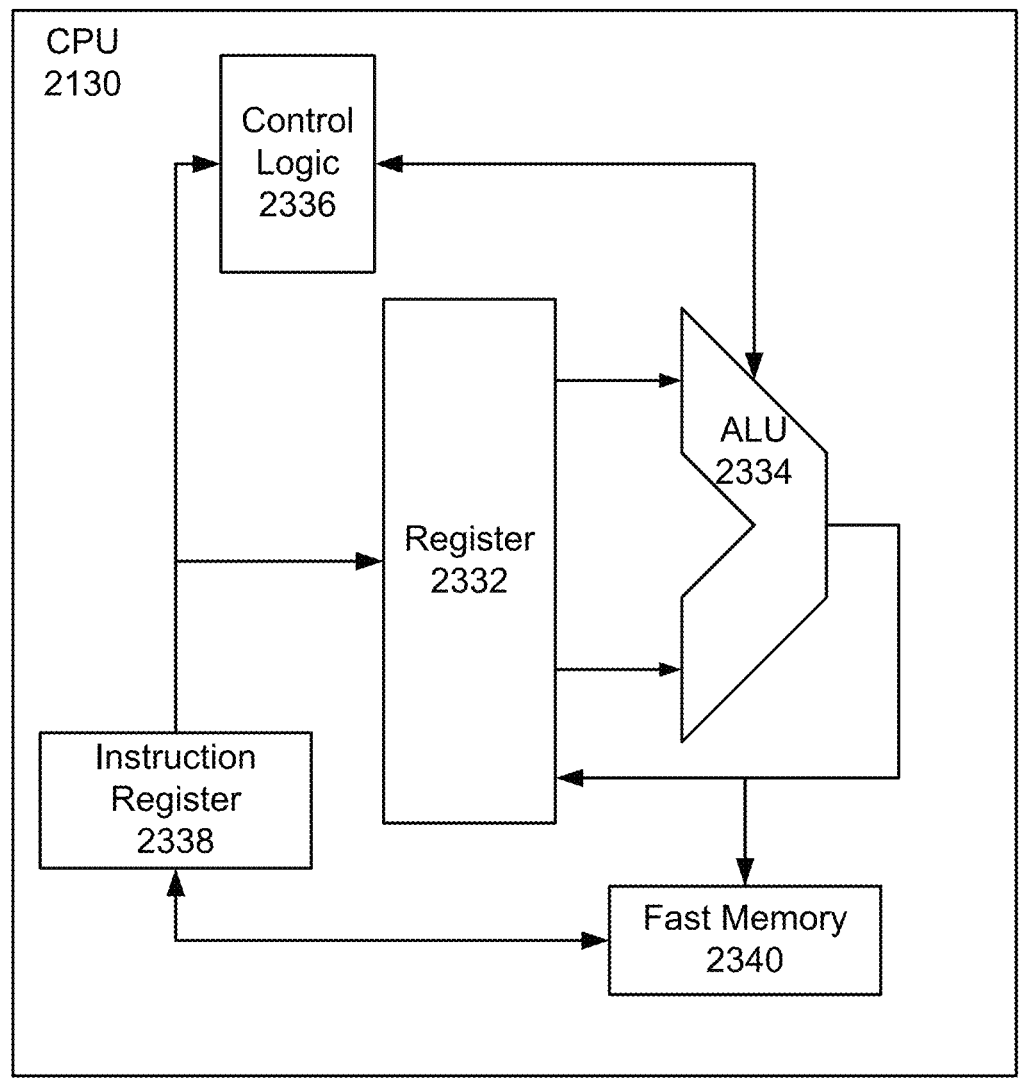
FIG. 23 is an exemplary schematic diagram of a processor used with the computing system, according to certain embodiments.

For example, FIG. 23 shows one implementation of CPU 2230. In one implementation, the instruction register 2338 retrieves instructions from the fast memory 2340. At least part of these instructions are fetched from the instruction register 2338 by the control logic 2336 and interpreted according to the instruction set architecture of the CPU 2230. Part of the instructions can also be directed to the register 2332. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 2334 that loads values from the register 2332 and performs logical and mathematical operations on the loaded values according to the instructions. The results from these operations can be feedback into the register and/or stored in the fast memory 2340. According to certain implementations, the instruction set architecture of the CPU 2230 can use a reduced instruction set architecture, a complex instruction set architecture, a vector processor architecture, a very large instruction word architecture. Furthermore, the CPU 2230 can be based on the Von Neuman model or the Harvard model. The CPU 2230 can be a digital signal processor, an FPGA, an ASIC, a PLA, a PLD, or a CPLD. Further, the CPU 2230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 22, the data processing system 2200 can include that the SB/ICH 2220 is coupled through a system bus to an I/O Bus, a read only memory (ROM) 2256, universal serial bus (USB) port 2264, a flash binary input/output system (BIOS) 2268, and a graphics controller 2258. PCI/PCIe devices can also be coupled to SB/ICH 2288 through a PCI bus 2262.

The PCI devices may include, for example, Ethernet adapters, add-in cards, and PC cards for notebook computers. The Hard disk drive 2260 and CD-ROM 2266 can use, for example, an integrated drive electronics (IDE) or serial advanced technology attachment (SATA) interface. In one implementation, the I/O bus can include a super I/O (SIO) device.

Further, the hard disk drive (HDD) 2260 and optical drive 2266 can also be coupled to the SB/ICH 2220 through a system bus. In one implementation, a keyboard 2270, a mouse 2272, a parallel port 2278, and a serial port 2276 can be connected to the system bus through the I/O bus. Other peripherals and devices that can be connected to the SB/ICH 2220 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 24:
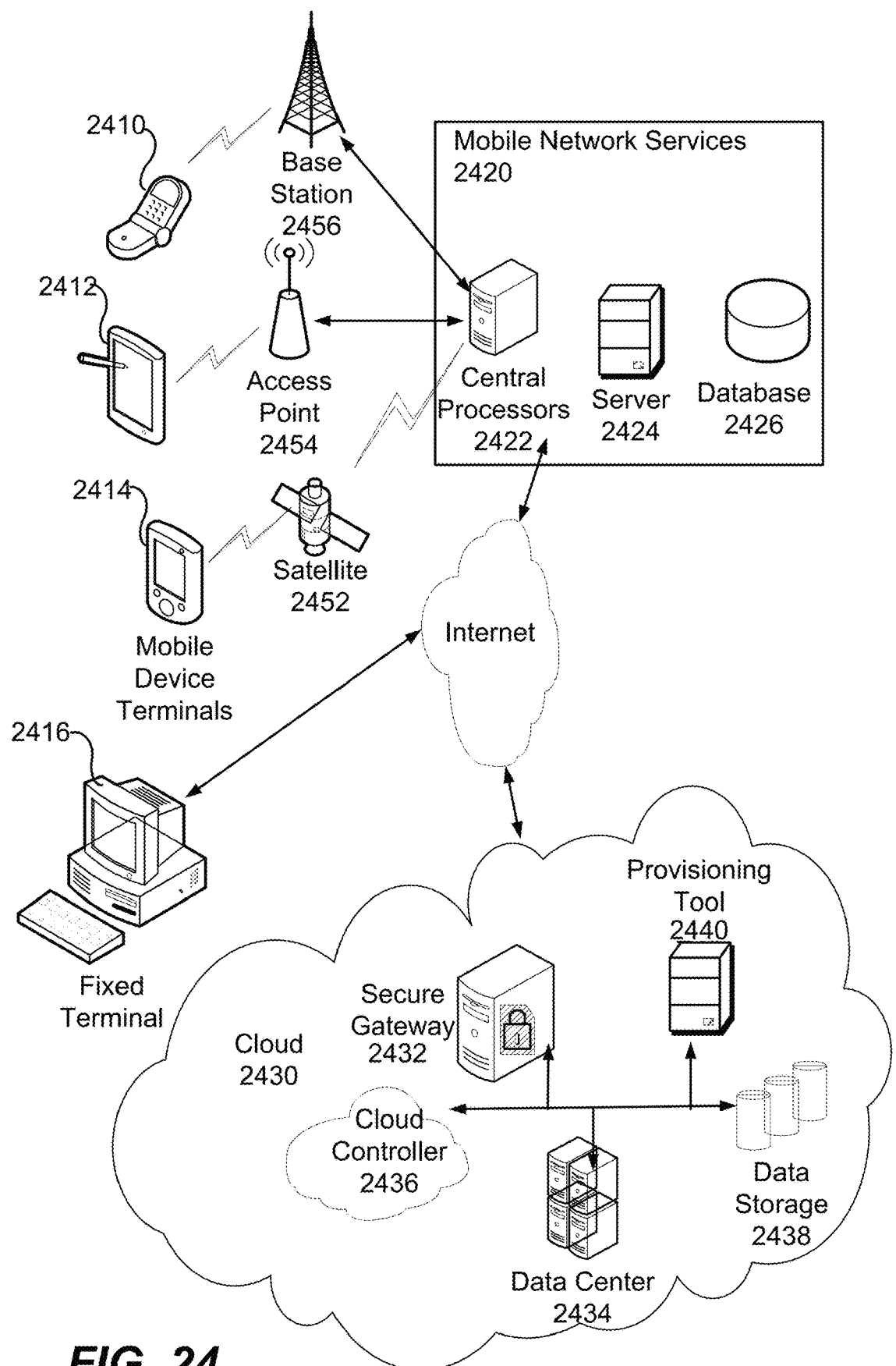
FIG. 24 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 24, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for reducing computation time for model predictive control (MPC) of a 5 level dual T-type multilevel converter connected to a three-phase open ends induction motor (OEIM), each multilevel converter including two DC link capacitors and a plurality of silicon carbide (SiC) MOSFET semiconductor switches, comprising:
   determining a set of switching states of the plurality of (SiC) MOSFET semiconductor switches;
   identifying a reduced set of switching states from the set of switching states;
   storing the reduced set;
   calculating a first set of cost functions which include motor fluxes, motor torques, common mode voltage and capacitor voltages for each switching state of the reduced set of switching states;
   summing the first set of cost functions to generate a first set of summed cost functions;
   minimizing the first set of summed cost functions;
   identifying a voltage vector which minimizes the first set of summed cost functions;
   generating a plurality of gating signals for the plurality of silicon carbide semiconductor switches using the voltage vector;
   applying the plurality of gating signals to the plurality of SiC semiconductor switches to operate the OEIM with decreased motor flux ripples, decreased motor torque ripples and balanced capacitor voltages;
   wherein calculating the first set of cost functions with the reduced set of switching states reduces the computation time for model predictive control of the converter switches.

2. The method of claim 1, further comprising:
   determining a voltage imbalance between the capacitors of each multilevel converter;
   determining an effect of each switching state on the voltage imbalance between the capacitors; and
   identifying the reduced set of switching states by selecting 219 of the switching states which have the greatest effect on the voltage imbalance.

3. The method of claim 2, further comprising:
   receiving a rated torque value, $T_{rated}$, a reference torque value, $T^{ref}$, a rated stator flux value, $\|\psi_{s\_rated}\|$, and a reference stator flux value, $\psi_s^{ref}$, a first weighting factor $K_\psi$, a capacitor voltage weighting factor $K_{dc}$ and a common mode voltage (CMV) weighting factor $K_{cm}|v_{CM}|$;
   estimating a first torque value of the OEIM;
   estimating a first flux value of the OEIM;
   predicting a first value for flux of the OEIM;
   predicting a first value for torque of the OEIM;
   measuring a first set of capacitor voltages;
   predicting a common mode value (CMV) value based on the capacitor voltages;
   evaluating the first set of cost functions for each of the 219 switching states based on:

$$J_1 = \frac{|T^{ref} - T^{k+2}|}{T_{rated}} + K_\psi \frac{|\|\psi_s^{ref}\| - \|\psi_s^{k+2}\||}{\|\psi_s\|_{rated}}$$

$$J_2 = K_{dc}(|v_{C1}^{k+1} - v_{C2}^{k+1}| + |v_{C3}^{k+1} - v_{C4}^{k+1}|)$$

$$J_3 = K_{cm}|v_{CM}|$$

where k+1 and k+2 are successive sampling time intervals and $v_{C1}$-$v_{C4}$ are the voltages of the capacitors of the converter.

4. The method of claim 3, further comprising:
identifying the voltage vector ($V_{opt-1}$) which minimizes the first set of cost functions based on:

$$V_{opt}=\arg\min_{\{V_1 \ldots V_{219}\}} J(V_s^{k+1})$$

where $V_s^{k+1}$ is the voltage across a stator of the OEIM at a sampling time interval k+1.

5. The method of claim 4, further comprising:
monitoring performance of the OEIM by:
estimating a second torque value and a second flux value of the OEIM;
predicting a first torque deviation and a first flux deviation;
subtracting the second torque value and the second flux value from the reference torque value and the reference stator flux value respectively to generate second torque and second flux deviations;
evaluating a second set of cost functions and identifying a switching state which minimizes the second set of cost functions;
generating the plurality of gating signals by using the switching state that minimizes the second set of cost functions; and
applying the plurality of gating signals to the SiC semiconductor switches to actuate the OEIM, reduce the common mode voltage, balance the capacitor voltages and reduce the torque and flux ripples.

6. The method of claim 4, further comprising:
monitoring the capacitor balance of the converter by:
measuring a second set of capacitor voltages subsequent to applying the gating signals;
determining a capacitor voltage deviation between the first set of voltages and the second set of voltages;
comparing the capacitor voltage deviation to a capacitor voltage deviation threshold;
applying the capacitor voltage weighting factor $K_{dc}$ and the CMV weighting factor $K_{cm}$ if the capacitor voltage deviation is above the capacitor voltage deviation threshold.

7. The method of claim 1, further comprising:
measuring a first set of capacitor voltages;
predicting a common mode value (CMV) value based on the capacitor voltages;
determining a first voltage imbalance ($\Delta V_c$) between the capacitors of a first multilevel converter;
determining a second voltage imbalance ($\Delta V'_c$) between the capacitors of a second multilevel converter;
determining an effect of each switching state on the first and second voltage imbalances; and
identifying and storing a reduced set of 115 switching states which have zero effect on a common mode voltage and a large effect on the first and second voltage imbalances.

8. The method of claim 7, further comprising:
receiving a rated torque value, $T_{rated}$, a reference torque value, $T^{ref}$, a rated stator flux value, $\|\psi_{s\_rated}\|$, and a reference stator flux value, $\psi_s^{ref}$;
receiving a flux weighting factor $K_\psi$;
receiving a capacitor voltage weighting factor $K_{dc}$;
estimating a first torque value of the OEIM;
estimating a first flux value of the OEIM;
measuring a first set of capacitor voltages;
evaluating the first set of cost functions for each of the 115 switching states based on:

$$J_1 = \frac{|T^{ref} - T^{k+2}|}{T_{rated}} + K_\psi \frac{|\|\psi_s^{ref}\| - \|\psi_s^{k+2}\||}{\|\psi_s\|_{rated}}$$

$$J_2 = K_{dc}(|v_{C1}^{k+1} - v_{C2}^{k+1}| + |v_{C3}^{k+1} - v_{C4}^{k+1}|)$$

where k+1 and k+2 are successive sampling time intervals and $v_{C1}$-$v_{C4}$ are the voltages of the capacitors of the converter.

9. The method of claim 8, further comprising:
identifying the voltage vector ($V_{opt-1}$) which minimizes the first set of cost functions based on:

$$V_{opt}=\arg\min_{\{V_1 \ldots V_{115}\}} J(V_s^{k+1})$$

where $V_s^{k+1}$ is the voltage across a stator of the OEIM at a sampling time interval k+1.

10. The method of claim 9, further comprising:
monitoring performance of the OEIM by:
estimating a second torque value and a second flux value of the OEIM;
predicting a first torque deviation and a first flux deviation;
subtracting the second torque value and the second flux value from the reference torque value and the reference stator flux value respectively to generate a second torque deviation and a second flux deviation;
evaluating a second set of cost functions and identifying the switching state that minimizes the second set of cost functions;
generating a plurality of gating signals by using the switching state that minimizes the second set of cost functions; and
applying the gating signals to the switches to actuate the OEIM, reduce the common mode voltage, balance the capacitor voltages and reduce the torque and flux ripples.

11. The method of claim 9, further comprising:
measuring a second set of capacitor voltages subsequent to applying the gating signals;
determining a capacitor voltage deviation between the first set of voltages and the second set of voltages;
comparing the capacitor voltage deviation to a capacitor voltage deviation threshold.

12. A system for reducing computation time for model predictive control (MPC) of a 5 level dual T-type multilevel converter connected to a three-phase open ends induction motor (OEIM) having first, second and third parallel phase paths connected between a first end and a second end, comprising:
a first three-level T-type converter connected to the first end of the OEIM and a second three-level T-type converter connected to the second end of the OEIM;
a first voltage source block connected to the first converter and a second voltage source block connected to the second converter, each voltage source block including a first capacitor in series with a second capacitor, wherein each voltage source block has a positive connector, a negative connector and a common connector;
wherein each three-level T-type converter includes:
first, second and third phase legs, each phase leg including:
first and second series connected switches, wherein the first switch is connected to the common connector and the second switch is connected to a terminal of one of the phase paths;
a third switch connected between the positive connector and the terminal of the one of the phase paths and a fourth switch connected to the negative connector and the terminal of the one of the phase paths;
wherein each switch is a SiC MOSFET semiconductor switch in parallel with a diode,
wherein the diodes of the first and second series connected switches are antiparallel to each other;
wherein the diodes of the third and fourth switches are parallel to each other;
a plurality of sensors configured for measuring system parameters; and
a control system having circuitry connected to the switches of each three-level T-type converter and the plurality of sensors, the control system having circuitry and program instructions stored within that, when executed by one or more processors, cause the one or more processors to determine a reduced set of switching states which reduce the computation time for model predictive control oft he converter switches;
wherein the program instructions are configured to:
determine a set of switching states of the plurality of converter switches;
select the reduced set of switching states from the set of switching states;
calculate a set of cost functions which include motor fluxes, motor torques, common mode voltage and capacitor voltages for each switching state of the reduced set of switching states;
sum the set of cost functions to generate a first set of summed cost functions;
minimize the first set of summed cost functions;
identify a voltage vector which minimizes the first set of summed cost functions;
generate a plurality of gating signals for the plurality of silicon carbide semiconductor switches using the voltage vector;
apply the plurality of gating signals to the plurality of switches to operate the OEIM with reduced motor flux ripples, motor torque ripples and balanced capacitor voltages;
wherein calculating the set of cost functions with the reduced set of switching states reduces the computation time for model predictive control of the converter switches.

13. The system of claim 12, wherein the plurality of sensors include:
a plurality of voltage transducers configured to measure voltages of the capacitors;
an encoder configured to measure a rotor speed of a shaft of the OEIM; and
a plurality of current transducers configured to measure current in each of the phase paths.

14. The system of claim 13, wherein the circuitry of the control system further comprises:
an input/output port configured for receiving a rated torque value, $T_{rated}$, a rated stator flux value, $\|\psi_{s\_rated}\|$, and a reference stator flux value, $\psi_s^{ref}$, a flux weighting factor $K_\psi$, a capacitor voltage weighting factor $K_{dc}$ and a common mode voltage (CMV) weighting factor $K_{cm}$;
an adder operatively connected to the input/output port and the encoder, the adder configured to subtract the rotor speed from the reference stator flux value and generate a difference stator flux value;
a proportional integral derivative (PID) controller connected to the adder and configured to receive the difference stator flux value and generate a reference torque value, $T^{ref}$;
a computer processing unit (CPU) configured to execute the program instructions to generate the gating signals based on the flux weighting factor ($K_\psi$), the reference torque value, $T^{ref}$, the rotor speed, the current in each of the phase paths and the voltages of the capacitors ($C_1$, $C_2$, $C_3$ and $C_4$).

15. The system of claim 14, wherein the CPU further comprises program instructions configured to:
determine a voltage imbalance between the capacitors of each multilevel converter;
determine an effect of each switching state on the voltage imbalance between the capacitors;
identify and store the reduced set from a set of 219 switching states which have the greatest effect on the voltage imbalance;
estimate a first torque value and a first flux value of the OEIM from the current measurements;
predict a first torque value and a first flux value of the OEIM;
measure a first set of capacitor voltages;
evaluate the set of cost functions ($J_1$, $J_2$ and $J_3$) for each of the 219 switching states based on:

$$J_1 = \frac{|T^{ref} - T^{k+2}|}{T_{rated}} + K_\psi \frac{|\|\psi_s^{ref}\| - \|\psi_s^{k+2}\||}{\|\psi_s\|_{rated}}$$

$$J_2 = K_{dc}(|v_{C1}^{k+1} - v_{C2}^{k+1}| + |v_{C3}^{k+1} - v_{C4}^{k+1}|)$$

$$J_3 = K_{cm}|v_{CM}|$$

where k+1 and k+2 are successive sampling time intervals and $v_{C1}$-$v_{C4}$ are the voltages of the capacitors of the converter;
identify the voltage vector ($V_{opt-1}$) which minimizes the first set of summed cost functions based on:

$$V_{opt} = \arg\min_{\{V_1 \ldots V_{219}\}} J(V_s^{k+1})$$

where $V_s^{k+1}$ is the voltage across a stator of the OEIM at a sampling time interval k+1.

16. The system of claim 14, wherein the CPU further comprises program instructions configured to:
determine a first voltage imbalance $\Delta V_c$ between the capacitors of a first multilevel converter;
determine a second voltage imbalance $\Delta V'_c$ between the capacitors of a second multilevel converter;
determine an effect of each switching state on the voltage imbalances $\Delta V_c$ and $\Delta V'_c$;
select the reduced set of switching functions by determining a set of 115 switching states which have zero effect on the common mode voltage;
estimate a first torque value of the OEIM;
estimate a first flux value of the OEIM;
predict a first value for torque of OEIM;
predict a first value for flux of OEIM;
measure a first set of capacitor voltages;
evaluate the set of cost functions for each of the 115 switching states based on:

$$J_1 = \frac{|T^{ref} - T^{k+2}|}{T_{rated}} + K_\psi \frac{|\|\psi_s^{ref}\| - \|\psi_s^{k+2}\||}{\|\psi_s\|_{rated}}$$

$$J_2 = K_{dc}(|v_{C1}^{k+1} - v_{C2}^{k+1}| + |v_{C3}^{k+1} - v_{C4}^{k+1}|)$$

where k+1 and k+2 are successive sampling time intervals and $v_{C1}$-$v_{C4}$ are the voltages of the capacitors of the converter;
    identify the voltage vector ($V_{opt-1}$) which minimizes the set of cost functions based on:

$$V_{opt} = \arg\min_{\{V_1 \ldots V_{115}\}} J(V_s^{k+1})$$

where $V_s^{k+1}$ is the voltage across a stator of the OEIM at a sampling time interval k+1.

17. A non-transitory computer readable medium having instructions stored therein that, when executed by one or more processors, cause the one or more processors to perform a method for reducing computation time for model predictive control (MPC) of a 5 level dual T-type multilevel converter connected to a three-phase open ends induction motor (OEIM), each multilevel converter including two capacitors and a plurality of plurality of silicon carbide (SiC) MOSFET semiconductor switches, comprising:
    determining a set of switching states of the plurality of silicon carbide (SiC) semiconductor switches;
    selecting a reduced set of switching states from the set of switching states;
    calculating a set of cost functions which include motor fluxes, motor torques, common mode voltage and capacitor voltages for each switching state of the reduced set of switching states;
    summing the set of cost functions to generate a first set of summed cost functions;
    minimizing the first set of summed cost functions;
    identifying a voltage vector which minimizes the first set of summed cost functions;
    generating a plurality of gating signals for the plurality of silicon carbide semiconductor switches using the voltage vector;
    applying the plurality of gating signals to the plurality of SiC semiconductor switches to operate the OEIM with reduced motor flux ripples, motor torque ripples and balanced capacitor voltages;
    wherein calculating the set of cost functions with the reduced set of switching states reduces the computation time for model predictive control of the converter switches.

18. The non-transitory computer readable medium method of claim 17, further comprising:
    determining a voltage imbalance between the capacitors of each multilevel converter;
    determining an effect of each switching state on the voltage imbalance between the capacitors;
    selecting, identifying and storing the reduced set of switching functions from a set of 219 switching states which have the greatest effect on the voltage imbalance.

19. The non-transitory computer readable medium method of claim 17, further comprising:
    determining a first voltage imbalance between the capacitors of a first multilevel converter;
    determining a second voltage imbalance between the capacitors of a second multilevel converter;
    determining an effect of each switching state on the voltage imbalances; and
    selecting the reduced set from a set of 115 switching states which have zero effect on the common mode voltage and a large effect on the first and second voltage imbalances of the capacitors.

* * * * *